(12) United States Patent
Lawrence

(10) Patent No.: US 11,803,849 B1
(45) Date of Patent: Oct. 31, 2023

(54) METHOD AND APPARATUS FOR DECENTRALIZED MICRO BUSINESSES

(71) Applicant: Mark Lawrence, Monrovia, CA (US)

(72) Inventor: Mark Lawrence, Monrovia, CA (US)

( * ) Notice: Subject to any disclaimer, the term of this patent is extended or adjusted under 35 U.S.C. 154(b) by 89 days.

(21) Appl. No.: 17/359,610

(22) Filed: Jun. 27, 2021

Related U.S. Application Data

(60) Provisional application No. 63/058,704, filed on Jul. 30, 2020.

(51) Int. Cl.
| | |
|---|---|
| *G06Q 20/40* | (2012.01) |
| *G06Q 20/10* | (2012.01) |
| *G06Q 40/02* | (2023.01) |
| *G06Q 20/38* | (2012.01) |

(52) U.S. Cl.
CPC ..... *G06Q 20/40145* (2013.01); *G06Q 20/102* (2013.01); *G06Q 20/3829* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 4,670,848 A | 6/1987 | Schramm | |
| 4,796,194 A | 1/1989 | Atherton | |
| 8,156,090 B1 | 4/2012 | Curles | |
| 8,271,545 B2 | 9/2012 | Butcher et al. | |
| 8,374,354 B2 | 2/2013 | Berggren | |
| 10,044,756 B2 | 8/2018 | Overby, Jr. et al. | |
| 10,366,204 B2 * | 7/2019 | Tanner, Jr. | ............. G06Q 40/08 |
| 10,521,780 B1 * | 12/2019 | Hopkins, III | .......... G06Q 20/12 |
| 2008/0195433 A1 | 8/2008 | Glenn et al. | |
| 2015/0170112 A1 | 6/2015 | DeCastro | |

(Continued)

FOREIGN PATENT DOCUMENTS

| | | |
|---|---|---|
| AU | 711699 B2 | 10/1999 |
| EP | 1072967 A2 | 1/2001 |

OTHER PUBLICATIONS

Norta, Designing a smart-contract application layer for transacting decentralized autonomous organizations. In International Conference on Advances in Computing and Data Sciences (pp. 595-604). Springer, Singapore. (Year: 2016).*

(Continued)

*Primary Examiner* — Daniel S Felten
*Assistant Examiner* — Claire A Rutiser

(57) ABSTRACT

The invention teaches a decentralized autonomous organization ("DAO") that manages a network of micro home businesses via a secure communication environment. A service provider curates active and passive income opportunities and provides training courses for worker users. A worker user selects a home configured to enable their preferred income opportunities then applies for a mortgage. The mortgage is pre-approved then a bridge loan is provided for construction. After construction is completed, the mortgage retires the bridge loan. Then the worker user occupies the home business and generates active and passive income to pay off the mortgage. Each micro home business is a node in the DAO. The DAO is maintained through competitive bids from service provider users. Disputes are resolved by arbitrator users. The internet of things is used to enable proactive maintenance.

20 Claims, 19 Drawing Sheets

(56) References Cited

U.S. PATENT DOCUMENTS

| | | | | |
|---|---|---|---|---|
| 2016/0294562 A1* | 10/2016 | Oberheide | ............ | H04L 9/0863 |
| 2016/0335533 A1* | 11/2016 | Davis | ..................... | G06Q 40/08 |
| 2017/0262807 A1* | 9/2017 | Kolls | ................... | G06Q 10/101 |
| 2018/0005186 A1 | 1/2018 | Geoffrey et al. | | |
| 2018/0089758 A1 | 3/2018 | Stradling et al. | | |
| 2018/0322597 A1* | 11/2018 | Sher | ..................... | G06Q 50/163 |
| 2019/0013931 A1 | 1/2019 | Benini | | |
| 2019/0101903 A1 | 4/2019 | Katti et al. | | |
| 2019/0182254 A1* | 6/2019 | Christidis | .............. | H04L 9/3239 |
| 2019/0251527 A1* | 8/2019 | Surdak | ............... | G06Q 20/3674 |
| 2020/0038932 A1* | 2/2020 | Kato | ...................... | B21D 37/10 |
| 2020/0389321 A1* | 12/2020 | Fletcher | ............... | G06Q 20/389 |
| 2021/0390549 A1* | 12/2021 | Rule | ..................... | H04L 9/0637 |
| 2021/0391991 A1* | 12/2021 | Aschauer | .............. | H04L 9/3236 |

OTHER PUBLICATIONS

Norta, A. (2017). Designing a Smart-Contract Application Layer for Transacting Decentralized Autonomous Organizations. In: Singh et al. (eds) Advances in Computing and Data Sciences. ICACDS 2016. Communications in Computer and Information Science (Year: 2017).*

\* cited by examiner

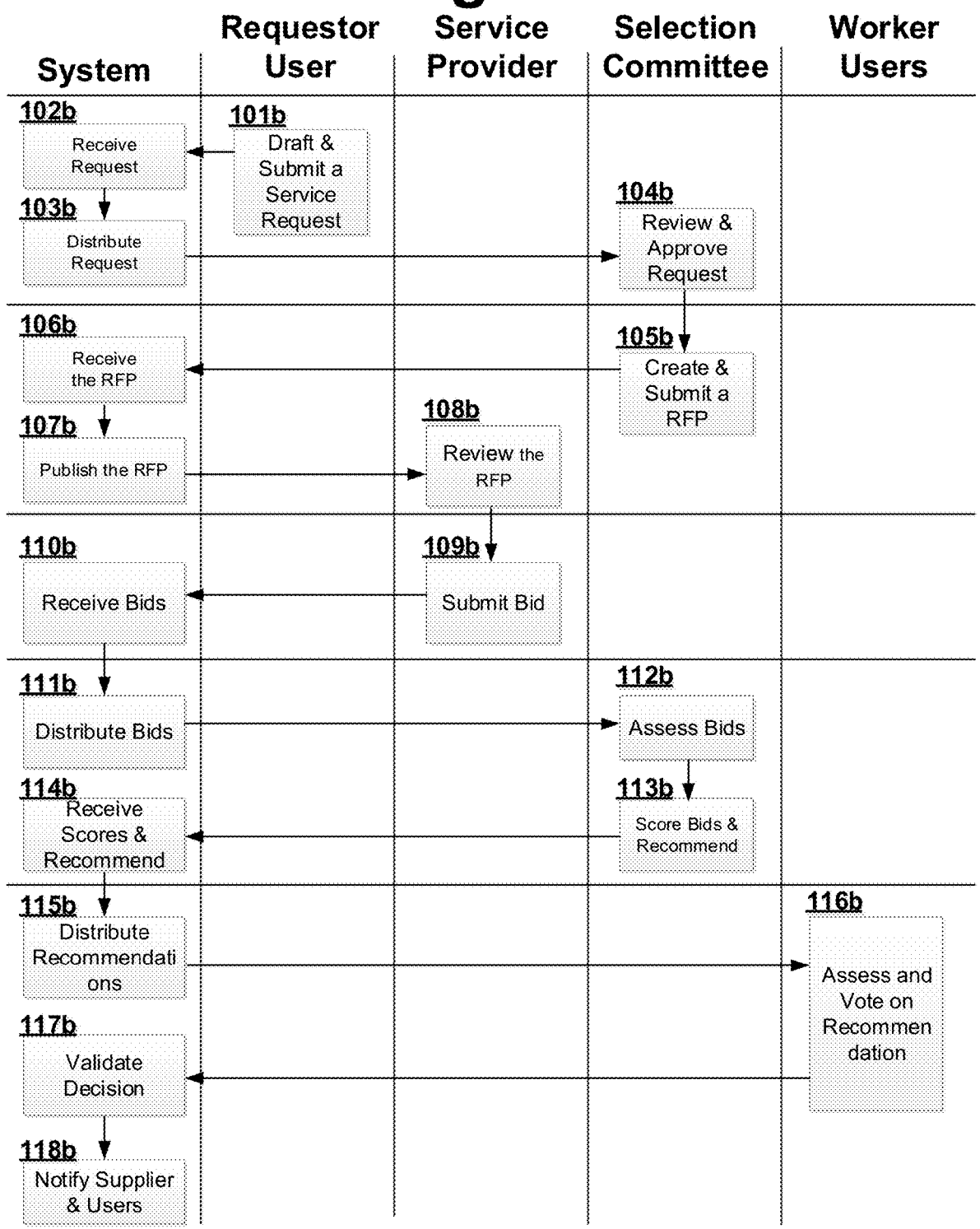

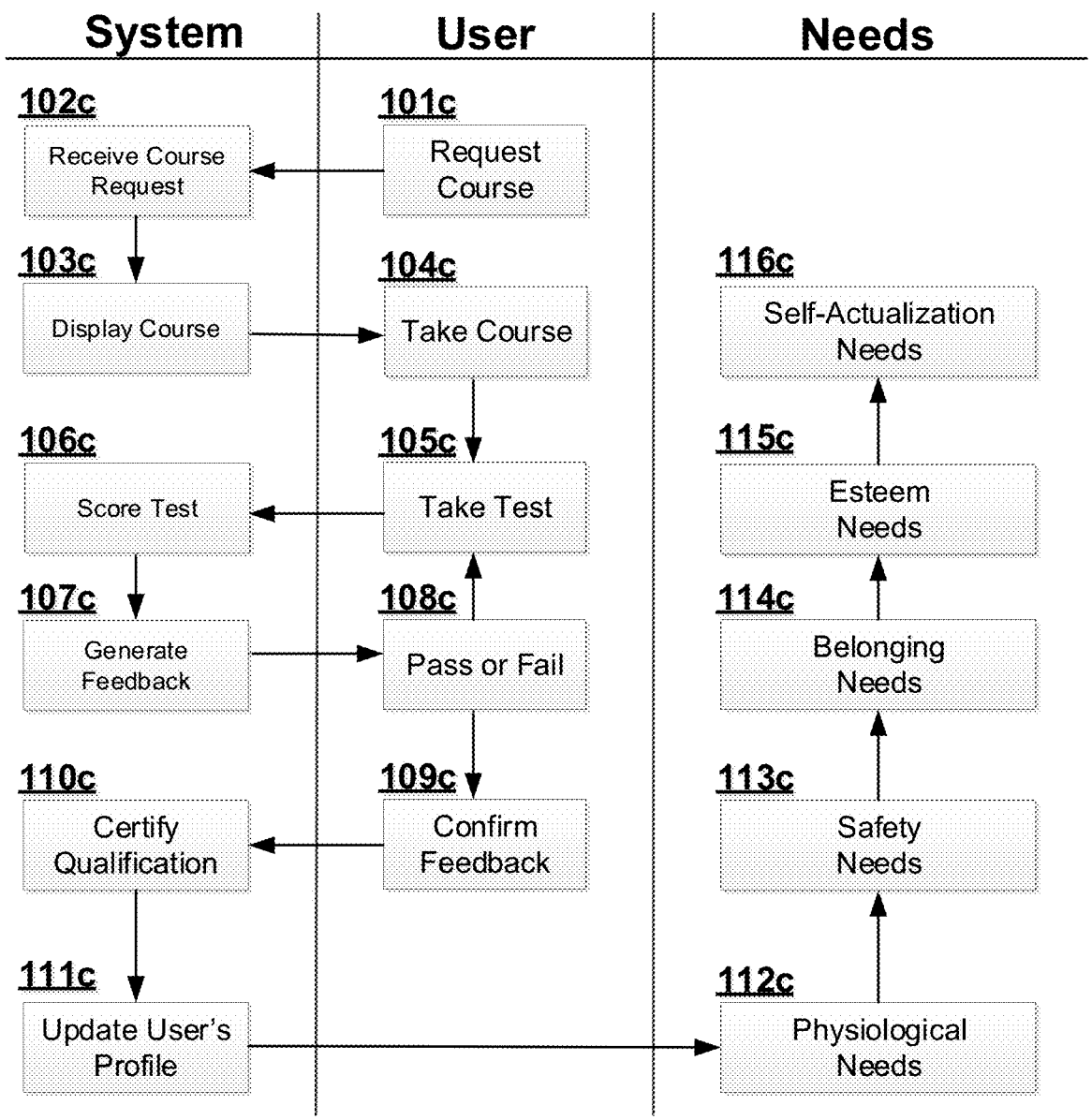

Business Intelligence System

- 706 Presentation Layer Module
- 705 Reporting Tools Module
- 704 Data Mining Tools Module
- 703 Analytic Tools Module
- 702 Data Warehouse Module
- 701 ETL Module — Extract, Transform, Load Data

Fig. 7

METHOD AND APPARATUS FOR DECENTRALIZED MICRO BUSINESSES

CROSS REFERENCE TO RELATED APPLICATION

This application claims the benefit of provisional patent application Ser. No. 63/058,704 filed 2020 Aug. 4 by the present inventor.

FEDERALLY SPONSORED RESEARCH

None.

SEQUENCE LISTING

None.

BACKGROUND OF THE PRESENT INVENTION 1.1) Field of the Invention

This invention relates generally to the field of decentralized autonomous organizations for micro home businesses.

1.2) Background

The First Industrial Revolution marked a period of socio-economic development in the latter half of the 18th century that transformed largely rural, agrarian societies in Europe and America into industrialized, urban ones.

Goods that had once been painstakingly crafted by hand, started to be produced in mass quantities by machines in factories, thanks to the introduction of new machines and techniques in textiles, iron-making and other industries.

Though many people had already begun moving to the cities from rural areas before the Industrial Revolution, this process accelerated dramatically with industrialization, as the rise of large factories turned smaller towns into major cities over the span of decades.

The second period of industrialization took place from the late 19th to early 20th centuries and saw rapid advances in the steel, electric and automobile industries. The great companies from this period—railroads, steel, oil, banking, and automotive manufacturing—all leveraged economies of scale. After a certain level of production, or scale, was achieved, significant cost savings or additional profits were realized. These economies of scale acted as a barrier to entry for competition or as a profit buffer.

However, today, the Internet acts as a great equalizer. It empowers businesses of all sizes to compete with large multinational corporations. In fact, the internet gives small companies access to business resources that previously were only available to large companies. The Internet allows businesses to:

Reach customers all around the world without the expense of a physical store.

Market products very inexpensively.

Attack previously unprofitable, tiny niche markets.

Access vendors and talent from around the world.

Operate virtual offices that eliminate the need for expensive overhead.

Teleconference and videoconference at low cost which eliminates the need for collocation and expensive business travel.

By leveraging the Internet, companies of all sizes can circumvent the competitive barriers caused by economies of scale. In particular, the internet enables businesses to have distributed production footprints if their production process is comprised of digital hand-offs between workers. For businesses that have a digital work product, or offer a peer-to-peer service, the unit cost of a distributed production footprint can scale down just like the unit cost of a centralized production footprint. Leveraging the internet to equalize the benefits of economies of scale between distributed and centralized production footprints, leaves trust as the remaining barrier to competitive decentralized knowledge factories.

In a factory that has a centralized footprint, managers oversee collocated workers to enforce trust. Conversely, the blockchain is a distributed ledger technology that provides distributed trust in the form of information transparency, information integrity and information validation. Distributed businesses, that have a digital work product, can therefore leverage the blockchain to enforce distributed trust. This enables, digital and peer-to-peer businesses, to realize distributed trust for a knowledge factory that has a distributed production footprint. For example, knowledge businesses, personal service providers and boutique industries, can leverage the internet, the blockchain and smartphone end points to enable a decentralized knowledge factory comprised of distributed but inter-connected micro home businesses.

The concept of a decentralized knowledge factory creates the opportunity for a decentralized autonomous organization that has a distributed production footprint, where the individual units of production are networked to gain competitive economies of scope, irrespective of the geographic location of each unit of production. Where competitive advantage is no longer driven by massive centralization of organizations and massive centralization of workers in large scale factories. Rather, economies of scope supplant economies of scale as the decisive competitive advantage. Where mass customization is enabled by a network of distributed local service providers, who better understand individual customer needs, and can deliver a standardized, high-quality, decentralized, cost-effective personal service. Further, authentication of confidential information is an important task. The confidential information may be subjected to various attacks, such as phishing attacks, social engineering attacks, dictionary attacks and the like. The confidential information may be hacked by a hacker using several hacking techniques. In addition, confidential information may be leaked due to inappropriate encryption and decryption of authentication information. Conventional methods of encryption and decryption may be hacked without much effort. Moreover, physical loss of authentication information may occur in several instances. The recovery of authentication information during physical loss of authentication information is also an important aspect. Hence, there exists a need for a system which provides secure authentication information, recovery of the authentication information, and storing the authentication information securely. Further, authentication of confidential information is an important task. The confidential information may be subjected to various attacks, such as phishing attacks, social engineering attacks, dictionary attacks and the like. The confidential information may be hacked by a hacker using several hacking techniques. In addition, confidential information may be leaked due to inappropriate encryption and decryption of authentication information. Conventional methods of encryption and decryption may be hacked without much effort. Moreover, physical loss of authentication information may occur in several instances. The recovery of authentication information during physical loss of authentication information is also an important aspect. Hence, there exists a

1.3) Background Art

In the prior art, AU711699B2 teaches a demand/response negotiation protocol system for a factory network having a plurality of factories in a manufacturing chain, each factory having a separate planning system, EP1072967A2 teaches a computer integrated manufacturing system for a distributed factory, U.S. Pat. No. 4,796,194A teaches a modeling and control process for distributed factories that have fabrication sequences, US20190101903A1 teaches a process of transfer of production control in proximity to production site for enabling decentralized manufacturing. None of these prior art refences alone, or in combination, teach a decentralized autonomous organization that has a distributed production footprint that can mass customize personal services, where the individual units of production can be networked to gain competitive economies of scale, irrespective of the geographic location of each unit of production.

None of the prior art individually, or in combination, teach a decentralized autonomous organization that has a distributed production footprint, where the individual units of production are networked to gain competitive economies of scope, irrespective of the geographic location of each unit of production. Where mass customization is enabled by a network of distributed local service providers, who better understand individual customer needs, and can deliver a standardized, high-quality, decentralized, cost-effective personal service.

Specifically, the present invention teaches a single unit of production comprised of a micro home business, that forms a node in a blockchain, where each node is networked with other micro home businesses to form a virtual business that has dynamic scale. Business opportunities that are effective in a decentralized and distributed production model are built into each micro home business for the unit worker to operate and maintain. Worker users receive education and training to operate the micro home business opportunities profitably. In addition, service providers curate new revenue opportunities for micro home businesses, service providers bid to maintain the decentralized micro home business and arbitrators resolve disputes. Service providers, and other decentralized autonomous organizations, gain access to critical resources via self-expiring service accounts that are stored in a decentralized, distributed, encrypted, decomposed database.

This enables workers of varying skills sets, including disenfranchised youth and parolees, to select and operate a single unit micro home business comprised of business opportunities for active and passive income that match their particular skill set. As they master one level of skills, for one type of micro home business, they can take courses to elevate their skill set in order to qualify for a higher-level micro home business that offers more attractive income opportunities. Examples of business opportunities include passive revenue generating technologies such as solar panels on the roof of a micro home business where the worker sells excess power capacity to the grid. An example of a more active revenue generating technology includes systems that convert waste to energy and systems that deliver clean water. Other business opportunities include knowledge tasks that are not conducive to automation or machine learning, such as labeling images and graphics for corporate clients. These bespoke micro home business opportunities that require various skill sets, give all workers new hope in the form of a home, a business in which they can thrive, and access to funding in the form of a home mortgage for their micro home business. The value of the business is the value of the home plus the value of the micro home business.

BRIEF SUMMARY OF THE PRESENT INVENTION

The present invention provides a computer implemented method for managing a micro business in a decentralized autonomous organization configured to use a secure communication environment, said method comprising: receiving, in the secure communication environment, a design for said micro business that includes a plurality of facilities and equipment to operate at least one opportunity for passive and active income, an estimated construction cost and an estimated construction timeframe for said micro business; receiving, in the secure communication environment, from said worker user, a loan application to purchase said micro business based on said design where said loan application includes a profile of said worker user and a plurality of loan terms and conditions; receiving, in the secure communication environment, from a lender, an approval of said loan application based on said design and said loan application; transferring, in the secure communication environment, a bridge loan for a construction of said micro business, from a loan account to a construction account based on the loan approval; receiving, in the secure communication environment, from a construction user, a confirmation that a construction of said micro business is complete based on said design and said bridge loan; receiving, from said worker user, an acceptance of said micro business based on said confirmation; receiving, from said worker user, a record of completion of at least one deliverable associated with said at least one opportunity, based on the micro business acceptance; receiving, from a client user, an acceptance of said at least one deliverable; transferring automatically, and periodically, from a client account associated with said client user to a worker account associated with said worker user, a revenue payment associated with said at least one opportunity, based on said deliverable acceptance and a plurality of opportunity terms and conditions; transferring automatically, and periodically, from said worker account to said loan account, an interest and principal payment associated with said loan application, based on said plurality of loan terms and conditions; and closing a loan associated with said loan application automatically, after transferring a final interest payment and a final principal payment, from said worker account to said loan account, based on said plurality of loan terms and conditions.

In a preferred embodiment, the present invention provides a method and apparatus for managing a micro business in a decentralized autonomous organization ("DAO") configured to use a secure communication environment. This DAO receives a secure authorization from any eligible user as an access request. The DAO encrypts this secure authorization then decomposes it into a plurality of linked subcomponents. The DAO makes a plurality of copies of the linked subcomponents. For each copy, each subcomponent is written to a different member computer selected randomly from a plurality of member computers. For each copy, the present invention selects the first member computer randomly from the plurality of member computers. The first member computer, which stores the first subcomponent, selects the second member computer randomly, which stores the second subcomponent. Each member computer selects the successive member computer that stores the successive subcomponent. Periodically, the present invention uses this same process to create a new copy of the subcomponents then delete the oldest copy. This enables the subcomponents of each copy of the encrypted secure authorization to move randomly and dynamically among the plurality of member computers.

When a user wants to access their secure authorization information, for example to log into the DAO, that user makes a request that initiates the reconstruction and decryption process. The DAO knows the first computer, in each block of computers, that stores the first subcomponent of the newest copy of the decomposed, encrypted secure authorization. The user has access to an authorization identifier, which the DAO uses as a filename for each subcomponent on each computer. The DAO uses the authorization identifier to recover the first subcomponent from that first computer. That first computer knows the second computer which enables the DAO to use the same authorization identifier (e.g., filename) to recover the second subcomponent from that second computer. The present invention repeats this process to retrieve the remaining subcomponents. The present invention then combines the subcomponents into the encrypted version of the secure authorization then decrypts the secure authorization. This enables the DAO to receive the secure authorization then grant the user access to the present invention.

The DAO receives, from a first user (curator service provider), a first plurality of information comprised of a first plurality of opportunities for passive and active income, a first list of facilities and equipment required to operate each of said first plurality of opportunities and a plurality of predetermined qualifications to operate each of said first plurality of opportunities. The DAO then receives, from a second user (worker user), a second plurality of information comprised of a profile of said second user and a second plurality of opportunities for passive and active income to include in said micro business, wherein said second plurality of opportunities is based on said first plurality of opportunities. Then the DAO receives from a third user (builder), a design for said micro business that includes a second plurality of facilities and equipment required to operate said second plurality of opportunities and an estimated construction cost and timeframe for said micro business. Then the DAO receives from said second user, said profile and a loan application to purchase said micro business based on said design, wherein said loan application includes a plurality of terms and conditions and said profile includes a second plurality of predetermined qualifications that qualify said second user to operate said second plurality of opportunities. Then the DAO receives from a fourth user (lender), a pre-approval of said loan application for a loan amount based on said profile, said design and said plurality of terms and conditions. Then the DAO transfers a bridge loan amount for a construction of said micro business, from a fifth account (bridge account) associated with a fifth user (bridge lender) to a third account (builder's account) associated with said third user (builder) based on said pre-approval. Then the DAO receives from said third user (builder), a confirmation that a construction of said micro business is complete based on said design and said bridge loan. Then the DAO receives from said second user (worker), an acceptance of said micro business based on said confirmation. Subsequently, the DAO receives from said second user (worker), a record of completion of at least one deliverable associated with said second plurality of opportunities for passive and active income, based on said plurality of terms and conditions. Then the DAO transfers automatically, based on said acceptance, a first percentage of said loan amount to a first account (curator service provider account) associated with said first user (curator service provider), from a fourth account (loan account) associated with said fourth user (lender), based on said plurality of terms and conditions. Then the DAO transfers automatically a second percentage of said loan amount as a bridge repayment, from said fourth account (loan account) to said fifth account (bridge lender) based on said plurality of terms and conditions. For example, 10% of the loan may got to the curator user and 90% may go to the builder. This first and second percentage varies with each home business scenario. The worker user completes at least one deliverable for a sixth user (client) based on said second plurality of opportunities. The sixth user (client) accepts the deliverable. Then the DAO receives from said sixth user, said acceptance of said at least one deliverable associated with said second plurality of opportunities for passive and active income, based on said plurality of terms and conditions. Then the DAO transfers automatically, and periodically, from a sixth account (client account) associated with a sixth user (client) to a second account (worker's account) associated with said second user (worker), a plurality of revenue payments associated with said second plurality of opportunities, based on said plurality of terms and conditions. Then the DAO transfers automatically, and periodically, from said second account (worker's account) to said fourth account (loan account), an interest and principle payment associated with said loan, based on said plurality of revenue payments and further based on said plurality of terms and conditions. Then the DAO transfers automatically, from said second account (worker's account) to said fourth account (loan account), a final interest and principle payment associated with said loan based on said plurality of revenue payments and further based on said plurality of terms and conditions.

The present invention also enables a user to use a biometric signature to store and retrieve said secure authorization. A user can use the same biometric signature to store and retrieve the secure authorization or use a different biometric signature to retrieve the secure authorization. The present invention also enables one user to store the secure authorization and a different user to retrieve the secure authorization. In this case, the present invention, on the storer user's computer, encrypts the secure authorization with a combination of a symmetric encryption key and the public encryption key of the retriever user. The present invention, on the retriever user's computer, then decrypts the secure authorization using a combination of the same symmetric encryption key and the private encryption key of the retriever user. In this case, the present invention, on the storer user's computer, uses the public encryption key of the retriever user to encrypt the authorization identifier then transfers the encrypted authorization identifier to the retriever user. The present invention, on the retriever user's computer, uses the private encryption key of the retriever user to decrypt the authorization identifier then uses the authorization identifier to locate, recombine and decrypt the secure authorization. If the storer user is the retriever user, as in the case of using a password to log into the DAO, the present invention can be configured to bypass the public and private encryption keys. However, if the storer user wants to transfers a blockchain address, for example, to the retriever user then the present invention will use the public and private encryption keys of the retriever user in the encryption process.

The present invention enables a second user to submit an arbitration request for the DAO, for example to resolve a dispute between the users and a service provider or a dispute among users. This arbitration request may require a change to an agreement, such as a service contract or the terms and conditions. The present invention receives a summary adjudication from a seventh user (e.g., arbitrator) that includes a recommended arbitration amendment. The present invention enables the plurality of eligible second users to vote to approve, or reject, the recommended arbitration amendment. If the percentage of approval votes exceed a first predetermined threshold then the present invention will automatically approve the recommended arbitration amendment which updates the agreement.

The present invention enables a second user to submit a service request for the DAO, for example to maintain technical components of the DAO, to perform a service activity on the DAO or to provide an educational or training course to certify a second user (worker) to complete a task or provide a service for a sixth user (client). The present invention then receives an RFP from an eighth user (e.g., service consultant). The present invention then receives a bid on the RFP from at least one ninth user (e.g., service vendor). The present invention then receives, from the eighth user, a recommendation based on the bids. The present invention enables the plurality of second users to vote to approve, or reject, the recommended service request. If the percentage of approval votes exceed a second predetermined threshold then the present invention will automatically approve the recommended service request.

The present invention enables a second user to request and take a test associated with said course to certify said second user. The second user provides a plurality of responses to the plurality of questions that comprise the test. The DAO receives these responses then calculates a score for said second user. If the score exceeds a third predetermined threshold, such as 75% correct for the multiple-choice questions that comprise the test, then the DAO automatically adds a certification for that test to the profile of said second user.

The DAO, provided by the present invention, uses a first smart contract to transfer a bridge loan from said fifth account to said third account. The DAO, provided by the present invention, uses a second smart contract to transfer a first percentage of said loan amount from said fourth account to said first account and to transfer said second percentage of said loan amount from said fourth account to said fifth account. The DAO, provided by the present invention, uses a third smart contract to transfer said revenue payment from said sixth account to said second account. The DAO, provided by the present invention, uses a fourth smart contract to transfer said interest payment and principle payment from said second account to said fourth account. The DAO, provided by the present invention, also uses said fourth smart contract to transfer said final interest and principle payment from said second account to said fourth account then close the loan.

The DAO, provided by the present invention, receives a plurality of diagnostic data from at least one sensor configured to monitor at least one performance parameter of at least one infrastructure component that comprises said DAO. It then uses this diagnostic data to predict a service need for said at least one infrastructure component when the measured value moves out of a predetermined acceptable range. The DAO then generates a notification event based on said prediction, whereby a notification is sent to a supplier user to perform said service need before said service need causes a system failure within said decentralized autonomous organization.

In another embodiment of the present invention, a DAO is comprised of a local group of home businesses that form a home owner's association (HOA). Each HOA DAO interoperates with other HOA DAOs to increase scale thereby increasing negotiating power with service providers. Multiple HOA DAOs interoperate with a parent DAO to integrate the voting consensus mechanism and service provider policies. As a HOA DAO grows, it can create a plurality of child DAOs each comprised of a subset of the DAOs in said HOA DAO. In this case, the HOA DAO performs like a parent DAO for its child DAOs.

In yet another embodiment of the present invention, each user earns DAO tokens based on his or her activities in the DAO in accordance with predetermined business rules. For example, the DAO uses a smart contract to transfer a percentage of income received by each worker user to a treasury account. The worker user receives DAO tokens in return for this treasury tax. In another embodiment of the present invention, service providers receive DAO tokens in lieu of a portion of their compensation. Also, users in special roles, such as arbitrators and users who submit an approved service request, also receive DAO tokens in compliance with predetermined business rules, such as tokens for each accepted service request, 15 tokens for each arbitration case and 10% of service provider fees are paid in DAO tokens. These are examples. The actual business rules are determined by each DAO using their voting consensus mechanism. This enables users who generate revenues and users who contribute to the operation of the DAO to earn DAO tokens. These DAO tokens represent shares in the DAO. Each DAO uses its consensus mechanism to determine the percentage of the DAO that is represented by the DAO tokens, the number of DAO tokens in circulation and the number of DAO tokens that are available in the DAO treasury.

The present invention enables users to store and retrieve the blockchain address for their DAO tokens in the warm storage distributed database taught herein.

A decentralized autonomous organization ("DAO") is an organization represented by rules encoded as a computer program that is transparent, controlled by users (or shareholders), and not influenced by a central governance entity.

A smart contract is a computer program or a transaction protocol which is intended to automatically execute, control or document legally relevant events and actions according to the terms of a contract or an agreement.

Warm storage is defined as a decentralized storage system that enables a user to control their confidential information independent of a third-party target system. For example, a user can store and control confidential information, such as a password or a blockchain address, in the decentralized storage system rather than relying on a centralized third-party system to store and control said user's confidential information. The user retains access control over the confidential information that is stored online in a decentralized database.

An encrypted decomposed dynamic decentralized distributed database (e.g., warm storage distributed database) is defined as a database that is distributed across a plurality of independent vetted member computers, so has no centralized control, wherein stored confidential information is encrypted then decomposed into a block of linked subcomponents that are randomly located among the plurality of independent vetted member computers, and wherein periodically a new copy of said block is created and an oldest copy of said block is deleted to continuously relocate said confidential information dynamically and randomly among the plurality of independent vetted member computers.

A DAO token is a unit of value issued by a DAO that represents an ownership right in that DAO. Each DAO token is a registry entry in a blockchain.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1b illustrates a first embodiment of a service request method for the present invention.

FIG. 1c illustrates a first embodiment of a qualification method for the present invention.

FIG. 7 illustrates a first embodiment of the business intelligence system ("BIS") of the present invention.

DETAILED DESCRIPTION OF THE INVENTION

The detailed description set forth below is intended as a description of various configurations of the present invention and is not intended to represent the only configurations in which the present invention may be practiced. The appended drawings are incorporated herein and constitute a part of the detailed description. The detailed description includes specific details for the purpose of providing a thorough understanding of the present invention. However, it will be apparent to those skilled in the art that the present invention may be practiced without these specific details. Like or similar components are labeled with identical element numbers for ease of understanding.

System Overview

Figure 1:
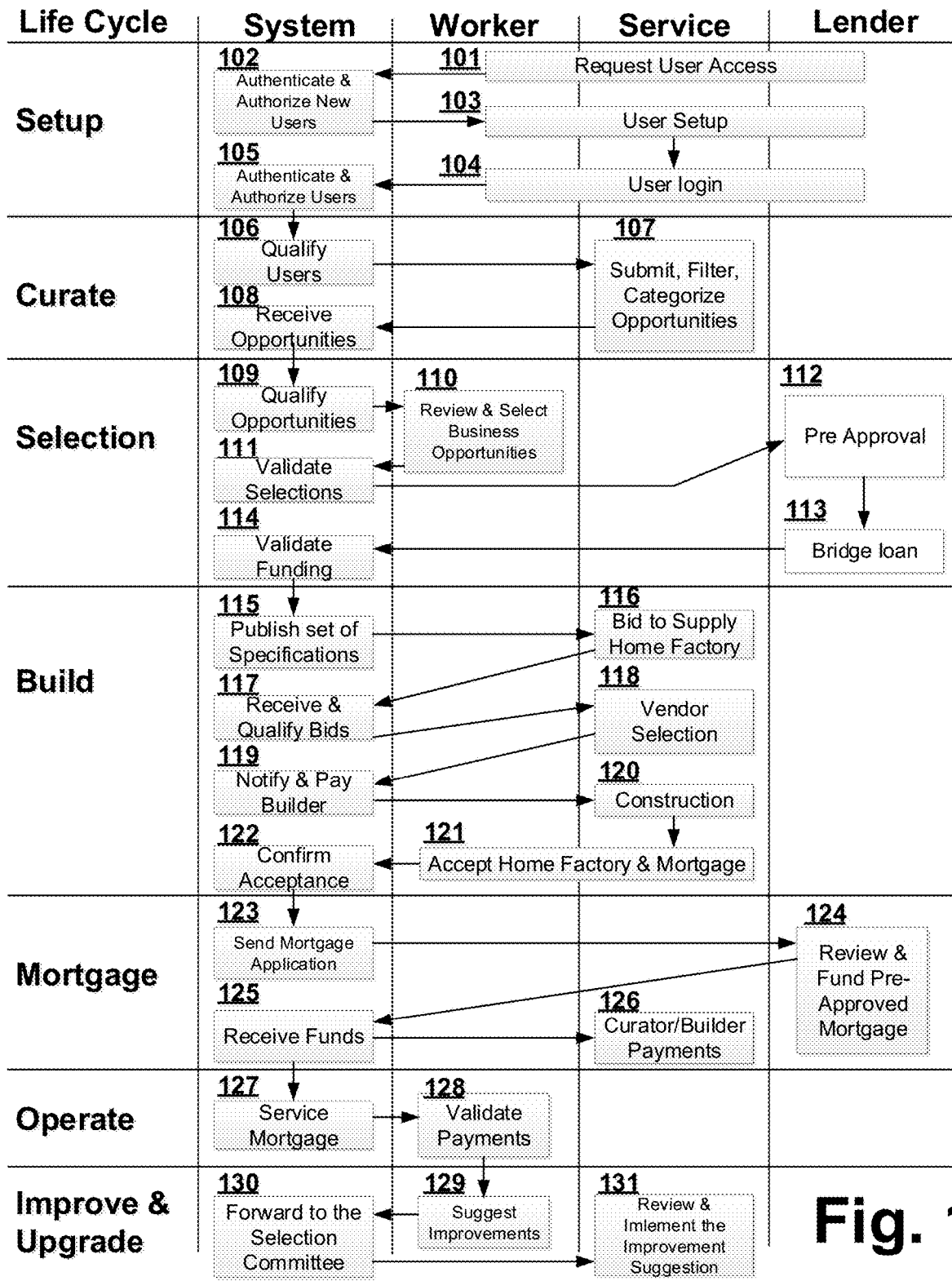
FIG. 1 illustrates a first embodiment of an overview of the present invention.

In an overview of a first embodiment of the present invention illustrated in FIG. 1, the present invention provides a method and apparatus for a decentralized autonomous organization to manage micro businesses. Each micro home business includes at least one node in a decentralized autonomous organization. Each decentralized autonomous organization comprises a node in a parent decentralized autonomous organization.

The present invention comprises a system whose lifecycle includes system setup, curate business opportunities, select curated business opportunities, build a decentralize micro home business, arrange a mortgage, operate the decentralized micro home business, improve the decentralized micro home business, upgrade to a different decentralized micro home business, close. The main actors in this process are the system and the users. Each user can assume multiple roles, one at a time, or concurrently. For example, a user can be the worker user who operates the decentralized micro home business, the lender or mortgage provider user or a service provider user. Service provider users include business curator users, building architect users, selection committee users, arbitrator users, financial advisor users, training users and maintenance and support users.

The present invention is comprised of a system whose workflow is described in FIG. 1. It also includes a pool of funds that is an initial investment to finance the decentralized micro home business and a plurality of validated default designs and specifications for each decentralized micro home business. The initial system also includes a plurality of default mortgage application templates, at least one for each type of micro home business. The initial setup also includes an initial selection committee, an initial group of arbitrator users and an initial set of business opportunities. Overtime, the initial members of the selection committee and the initial group of arbitrators will be replaced by users who acquire the skills, knowledge and community standing to receive sufficient votes from existing committee members and arbitrators to be elected to the selection committee or group of arbitrators. This enables the system to be managed by its users with a self-sustaining organizational structure.

Each default specification for a decentralized micro home business also has a plurality of requirements that a worker user must meet in order to qualify for a mortgage and to operate that micro home business. When a user signs up, they can create a profile that they can update. This profile includes information that the system uses to determine if that user qualifies for a specific type of micro home business and mortgage, such as level of training, experience, skills and personality traits. The specification for each type of micro home business, also includes a plurality of laws, regulations and other restrictions that may exclude a specific micro home business from being allowed to operate in a specific jurisdiction. Also, the system administrator configures a plurality of jurisdictions into the system. For each jurisdiction, the system administrator includes a list of micro home businesses and business opportunities that are not permitted for legal, regulatory, moral or policy reasons. These jurisdictions include continents, countries, states, counties, cities, towns, villages and other municipalities as well as other supranational, national, regional and local jurisdictions. The system administrator also setups a number of default contracts, such as a contract to build a micro home business and contracts for other types of services that will be required from different types of service provider. For example, the list of default contracts includes the default mortgage contract and the corresponding qualification criteria for each type of mortgage. This information is maintained by the system administrator who is a service provider user.

When the system is setup, at least one user is authorized to play the role of the initial system administrator. Any service provider can submit a request to be a system administrator. The initial system administrator will review then approve, or reject, other applications to be a system administrator. Each approved system administrator participates in the approval process for subsequent system administrators. Eventually, a predetermined quorum of system administrators will be approved. The next approved system administrator will replace the initial system administrator. Each decentralized autonomous organization has a quorum of system administrators.

The present invention enables a prospective user to request access 101 to the system. The system authenticates that new user 102. The system offers many techniques to authenticate a user, such as user validation on an independent system, for example by sending a message to the user's email address or phone. The system also permits single sign-on with other well-known commercial applications.

Users can use cold storage solutions to store their confidential information, including confidential user and payment information for authentication and authorization. This includes users writing their authentication information, such as passwords and blockchain address information for their cryptocurrency accounts, on a sheet of paper which is offline. This prevents online hacking but creates other user risks, such as the risk of physical loss by the user or physical theft from the user. Alternatively, users can use hot storage solutions where the operator of the centralized application knows and controls the user's authentication information, such as passwords and blockchain address information. This eliminates user risk due to physical loss by the user and physical theft from the user, but hot storage solutions increase the system risk of online hacking due to careless or corrupt behavior of the employees of a centralized system operator. Conversely, the encrypted decomposed dynamic decentralized distributed database described herein offers a warm storage solution for a user's confidential information. Warm storage is defined above. This gives each user sole control of the storage and retrieval of their confidential information. It offers the user the control benefits of cold storage and the online access benefits of hot storage. However, it does not have the user risk of careless or unfortunate loss associated with cold storage and does not have the hacking risk associated with careless and corrupt behavior of employees that plagues hot storage solutions offered by centralized applications. This warm storage solution is comprised of encrypting the user's authentication information then decomposing it into linked subcomponents that are distributed randomly across a plurality of member computers. These linked subcomponents are also moved dynamically among the network of member computers. Storage and retrieval of this encrypted and decomposed authentication information can be invoked via user biometrics. This minimizes the risk of online hacking while enabling users to retain control of their authentication information. This warm storage solution is described in more detail below.

After the system authenticates a user, the system allows that user to setup their account 103. This includes setting up or changing a password, specifying challenge questions and answers and completing a user profile. The content of the user profile will enable the system to determine if that user is qualified for a specific type of micro home business and whether that user is qualified for specific tasks and roles. For example, a user can bid for a contract to perform a specific task, such as build a micro home business. Similarly, a user can apply for key roles, such as being on the selection committee or being an arbitrator for the decentralized autonomous organization. After completing the setup process, if a user loses his or her password, then the system will ask one or more of the challenge questions to enable the user to regain access or recover the password, so long as the user enters the correct answers to the challenge questions. To reduce spam and prevent automated hacking techniques, the system supports captchas to distinguish between human and machine input. The system also enables the user to setup multiple biometric signatures to facilitate user log in. The system supports a number of biometric options including finger print (capacitive and ultrasonic), finger veins, palm print, hand geometry, iris scan, retina scan, facial recognition, and voice recognition. Users can choose from a plurality of access methods, including traditional user name and password access or biometric driven warm storage of user access credentials. During the setup stage or after login, a worker user will specify the type of micro home business he or she would like and also specifies their qualifications that match the required profile for that micro home business. The user can edit his or her user profile information during subsequent logins.

After the user has been setup on the system, the system allows the user to login at will 104. The system supports multi factor authentication. For example, to access selected features available on the system, the system may force the user to implement single factor authentication, such as entering a user name and password directly or via warm storage. To access higher security features available on the system, the system may force the user to implement two-factor authentication such as entering a password and receiving then confirming a message on a separate device, such as a smartphone. To access even higher security features available on the system, the system may force the user to implement three-factor authentication such as entering a password, receiving then confirming a one-time passcode on a phone and submitting a biometric signature, such as finger print recognition. The system administrator can configure these options.

After the user logs in, the system authenticates that user then determines the features that the user is authorized to access 105. After authenticating and authorizing a user, the system then qualifies a user 106. This qualification step comprises applying business rules to determine which users are authorized to submit business opportunities, which users are authorized to filter these business opportunities to eliminate business opportunities that are not a good fit, and which users are authorized to categorize these business opportunities for each type of decentralized micro home business. The system analyses information in the user's profile to make these decisions. For example, a first service provider user may submit a business opportunity to label photographs, such as adding the label "lion" to a photograph of a lion. A second service provider user may tag this business opportunity as a good fit for a decentralized micro home business. A third service provider user may assign this business opportunity to the entry level model for a decentralized micro home business 107. At each step in this process, the system will analyze the profile of the user who is performing the action to ensure that user is qualified to perform that service for the decentralized autonomous organization. In one embodiment of the present invention, there are a plurality of models for a decentralized micro home business.

Each model is designed to address the needs of a different target market. For example, these target markets may include high school drop outs, ex-convicts, high school graduates, students, volunteers, college graduates, entry level workers, experienced workers, business managers, business executives, retirees, crop farmers and animal farmers.

In one embodiment of the present invention, service provider users who submit, filter and categorize business opportunities 107 for the decentralized micro home businesses are volunteers. In another, embodiment of the present invention, the service provider users are paid for their services rendered. In yet another, embodiment of the present invention, the service provider users are incentivized by a share of the proceeds from business opportunity. In a further embodiment of the present invention, this revenue, profit or value share is implemented as a crypto currency token (e.g., curator tokens). Each service provider user receives a pre-determined number of curator tokens for each business opportunity that is accepted by the system. Those curator tokens entitle the service provider user to a share of the future value generated from that curated business opportunity. For a business opportunity to be accepted by the system, it must include training materials and a business case that details the expected financial benefits for the worker user. The value of the curator tokens increases with the size of the value created by the corresponding business opportunity and also with the size of the expected future value for the corresponding business opportunity. This potential value appreciation for the curator tokens further incentivizes the service provider to continually add new business opportunities and continually improve existing business opportunities. Each service provider is also incentivized to improve the training materials for each business opportunity to increase the actual value generated by worker users and therefore the profit share allocated to current holders of the corresponding curator tokens. In one embodiment of the present invention a specific curator token is dedicated to a single business opportunity. In another embodiment of the present invention a specific curator token is diversified across a plurality of business opportunities. In yet another embodiment of the present invention a specific curator token is diversified across all business opportunities within a single decentralized autonomous organization.

The system receives 108 and qualifies the curated business opportunities 109. Qualification of a curated business opportunity comprises ensuring that each business opportunity complies with legal and regulatory guidelines for each jurisdiction as well as moral and policy guidelines for the jurisdiction and the system operator. The system has a predetermined list of legal, regulatory, moral and policy guidelines that is created during the setup stage and maintained by authorized worker users on a selection committee. Qualification of a curated business opportunity also includes comparing the compensation plan, requested by the service provider user who is credited with submitting each curated business opportunity, with the predetermined limit set by the selection committee for that work. One of the plurality of qualification criteria for each curated business opportunity, is that the requested compensation must fall within the predetermined limits. The system uses a smart contract to automatically direct the agreed percentage of revenues from client payments to the credited service provider user. The final steps in the qualification process for curated business opportunities include the system displaying the curated business opportunity in the curated business opportunity store. When the service provider user submits the curated business opportunity, that service provider user also submits a plurality of meta data. Some of that meta data is displayed with the curated business opportunity in the curated business opportunity store. This information helps worker users decide which business opportunities they want to operate in their micro home business. This meta data includes sales, marketing, operational and technical information.

Worker users can view curated business opportunities, and their meta data, in the curated business opportunity store then select and subscribe to their preferred curated business opportunities 110. The system only allows a worker user to select business opportunities that match that worker user's skill set, match the micro home business, and comply with the laws, regulations, moral guidelines and policies of the local jurisdiction.

When the decentralized autonomous organization is setup, the system administrator negotiates a default mortgage for each type of micro home business. This is included with the home specification. When the worker user accepts a micro home business, the system enters that worker user's information into the mortgage application after the system validates the worker user's selections 111. The system forwards, to the lender user, the home mortgage requested by the worker user for pre-approval 112. This mortgage application covers the requested micro home business and the requested business opportunities. The lender user pre-approves the home mortgage or requests changes from the worker user until the lender can pre-approve the requested home unit. The lender user enters the pre-approval for the home mortgage into the system 112. A second lender user provides a bridge loan 113 to construct the micro home business based on the pre-approval. The second lender can be the same as the first lender user who provides the pre-approval.

The system validates funding by validating the worker user, the micro home business, the business opportunities and the pre-approved mortgage 114. This validation process includes applying a plurality of pre-determined rules, such as ensuring the worker user is qualified for the selected business opportunity, ensuring that the business opportunities are allowed in the worker user's jurisdiction and ensuring the selected business opportunity complies with the restrictions of the worker user's type of decentralized micro home business. The system enforces these rules in step 109 by filtering out the selections that are not available to each worker user.

The system collates the specification for the worker user's micro home business. This includes collecting the specification for the type of micro home business and the specification for each of the plurality of business opportunities selected by the worker user. The system publishes the set of specifications for the selected micro home business and the selected business opportunities in the curated business opportunity store 115. A plurality of service providers can review the set of specifications then decide whether to submit a bid to supply the micro home business 116. The system receives and qualifies the bids 117. The system ensures that each service provider is qualified to submit their bid based on the service provider's profile. The system also ensures that each bid complies with the specifications. This includes the specifications for the micro home business, business opportunities, the worker user's timeline and pricing specifications. The system then forwards the qualified bids to the selection committee for vendor selection 118.

When a new decentralized autonomous organization is setup on the system, a plurality of service providers are assigned to the selection committee. During this committee initiation process, the service providers chosen to sit on the initial selection committee are verified for their assessment skills and knowledge and also for their impartial ability to select a worthy bidder based on the user's profile. Each member of this initial selection committee must be free of any possible conflicts of interest for any possible vendor selection process. As worker users buy each model of micro home business, those worker users become eligible to apply to be elected to the selection committee for their micro home business. Each type of micro home business has its own selection committee. The members of each selection committee vote on each membership application to determine which membership applications are approved. This membership application process is used to enable the worker users who buy a micro home business to replace the initial members of the selection committee for their micro home business in their decentralized autonomous organization. However, any new member of the selection committee must also meet the predetermined qualification and knowledge requirements and must also be free of any potential conflicts of interest. This replacement process for members of the selection committee is also used to replace active members of the selection committee even after all of the initial committee members have been replaced by active worker users who currently own a micro home business. If a member of the selection committee sells their micro home business then they must resign their seat on the selection committee unless they have another micro home business of the same type.

After the selection committee selects a vendor 118, the system receives the vendor selection then notifies the winning vendor that they have been selected as the service provider builder user 119. The system also transfers a payment to the builder from the bridge loan to construct the micro home business. In one embodiment of the present invention, this payment is all paid in advance, in another embodiment this payment is based on the completion of a sequence of deliverables and in yet another embodiment this whole payment is based on final acceptance of the micro home business. The service provider builder user then constructs the micro home business 120. Then the selection committee, selected service providers and the worker user collaborate to accept the micro home business 121. This bidding, construction and acceptance process typically occurs simultaneously for a plurality of micro home businesses, for one or more worker users, in order to leverage economies of scale. Enabling worker users to customize their micro home business, by selecting business opportunities for passive and active income, enables a diversity of micro home businesses within each type of micro home business. This diversity enables the decentralized autonomous organization to realize economies of scope. It does this by meeting the diverse needs of more worker users who are better able to meet the diverse needs of their customers. This increases volume through customized offerings while maintaining standardized production costs, which drives economies of scope.

After the worker user accepts the micro home business, the system applies the worker user's electronic signature to the mortgage application. The system then receives and confirms the acceptance and the final signed mortgage application from the home worker 122, the system sends the fully executed mortgage application to the lender user 123.

The lender user receives and funds the pre-approved mortgage 124. The system receives the funds 125 from the lender and distributes any compensation payments, such as fees to the curator service provider and bridge loan repayments, to the relevant service provider users 126. For example, the fees for curating the business opportunities may represent 10% of the loan amount and the home business construction costs may represent 90% of the loan amount as specified in the plurality of terms and conditions.

The system services the mortgage by extracting interest and principle payments from the worker user 127. The worker user validates the interest and principle payments 128. This continues until the mortgage is paid off. The system use an arbitration process to handle exceptions, such as defaults or a sale of the micro home business during the term of the mortgage.

The worker user can also suggest improvements 129, such as improvements to the micro home business, improvements to the business opportunities, improvements to the process, and improvements to the system. In another embodiment of the present invention, any active service provider can also suggest one or more improvements. The system receives the improvement suggestions and forwards them to the vendor selection committee 130. The selection committee reviews and implements the improvement suggestions that they approve 131.

Payments can be transferred using a plurality of methods, including fiat currency, wire transfer, crypto currency, digital cash, cash equivalents, credit card, debit card, prepaid card, direct debit, mobile payments, barter, debt, financing, automated buying, ACH, letter of credit, check, money orders, crowd buying and also by using a smart contract to automate crypto currency transfers between blockchain addresses.

The value of the micro home business and the mortgage both exceed the cost of construction. The surplus is retained by the worker user but in one embodiment of the present invention the system has a carried interest in each micro home business. When a worker user sells a micro home business, the system receives a cut equal to the system's carried interest. This makes the decentralized micro home business self-sustaining so long as value of micro home businesses is increasing. The system also receives a cut from each interest payment. The system's income from interest payments and micro home business sales is used to pay for improvements that are approved by the selection committee.

Figure 1A:
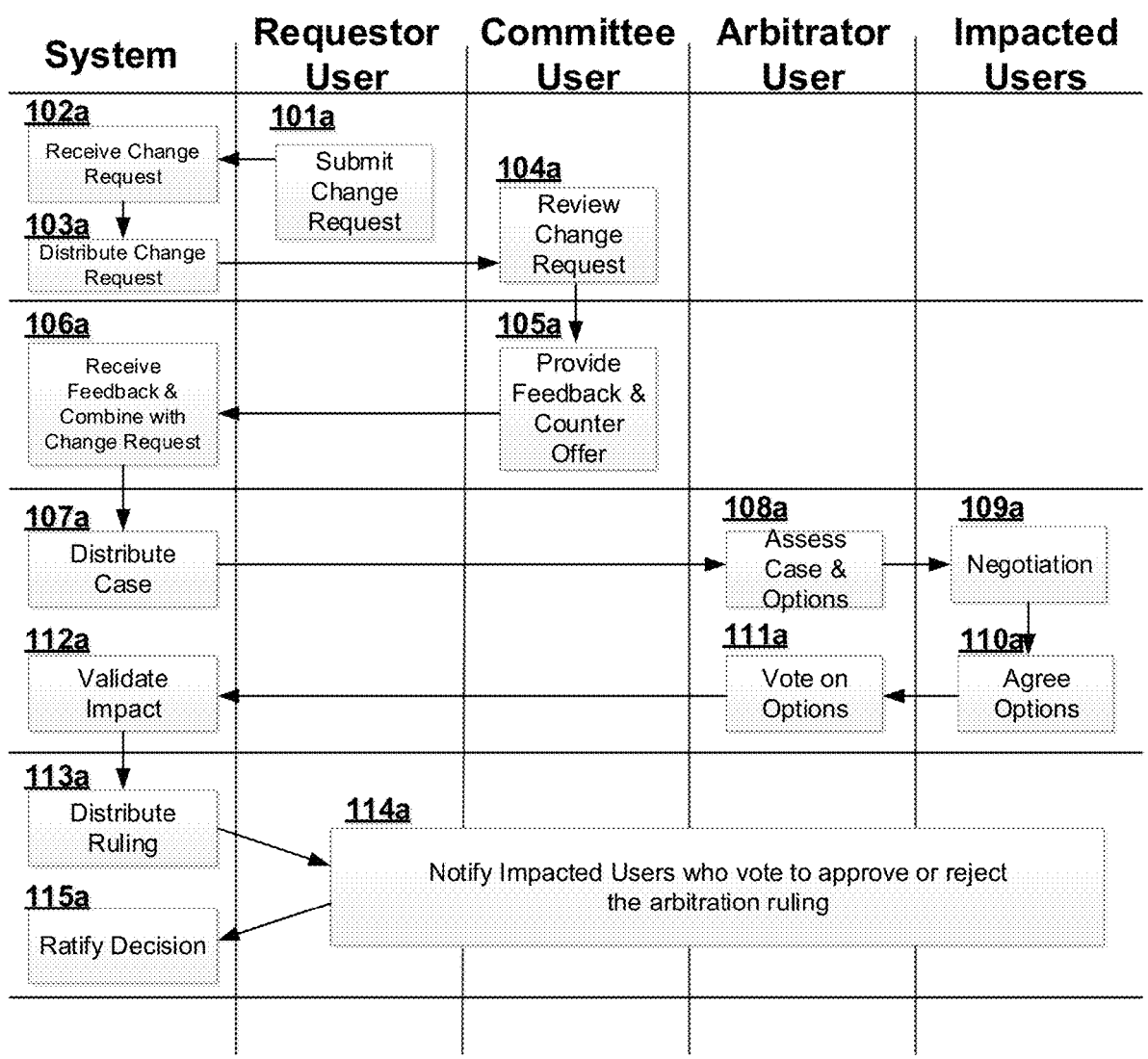
FIG. 1a illustrates a first embodiment of an arbitrator method for the present invention.

In another embodiment of the present invention illustrated in FIG. 1a, exceptions are handled by an arbitration process. A user can submit a change request 101a that is optionally initiated by a dispute that requires a ruling by an arbitrator. For example, a worker user may want to extend the term of his or her loan, adjust the interest rate or adjust the loan balance. Or a lender user may want to repossess the micro home business due to default. Or a worker user may want to change ownership of a micro home business. This list is exemplary and should not be considered to be exhaustive or in any way limiting. Typically, the outcome of a change request is to change the mortgage balance, change the mortgage interest rate, change the mortgage term, change the owner of the micro home business or make a monetary award from one user to another.

The system receives the change request 102a from the requestor user. For example, the requestor user could be a lender user requesting a change in ownership of the micro home business due to default through repossession. Alternatively, the requestor user may be a service provider requesting a monetary award from a worker user or a worker user requesting a monetary award from a service provider. Alternatively, the requestor user may be the worker user requesting a change to the mortgage, such as a change to the outstanding balance, the interest rate or the term. This list is exemplary not exhaustive and should not be treated as limiting.

The system sends the change request to the selection committee users 103a. The selection committee users review and approve the change request 104a then provide feedback that can include a counter-offer that they will support 105a. The system receives the feedback and combines it with the change request 106a. The system distributes this information as a case to the predetermined arbitrator users 107a. These arbitrator users are regular users who have sufficient standing in the community of users to be granted arbitration authority. The system will exclude from the distribution list any arbitrator users who are involved in the case as a requestor or member of the selection committee. The arbitrator users will assess the case and determine viable options 108a. The lead arbitrator user then negotiates the viable options 109a with the impacted users, which may be the lender, a service provider user or the worker user. The impacted users then agree a list of acceptable options from the list of viable options 110a. The arbitrator users then vote on the list of acceptable options 111a. The system receives the votes from the arbitrator users and validates that the proposed change is consistent with the rules that include laws, regulations, moral obligations and system policies 112a. The system then distributes the arbitration ruling to all eligible users as a notification 113a. The system notifies the users 114a who vote to approve or reject the arbitration ruling. The system ratifies the decision after the predetermined notification period 115a. The system then implements the decision by making the changes specified in the validated version of the change request. When each user registers to use the system, they must agree to be bound by the system's arbitration rulings otherwise they are not authorized to use any features that can lead to arbitration. Steps 103a, 107a and 113a include displaying the relevant information. If the voters reject a significant percentage of arbitration rulings then the system will alert the users to consider changing one or more arbitrators or committee users.

In another embodiment of the present invention illustrated in FIG. 1b, a process is implemented to service the system. A requestor user can draft and submit a service request 101b. The requestor user can be any authorized user who has identified a need for the system to be serviced. For example, a requestor user may see a need for an online voting form to be changed, or for another option to be added to a list, or for the system response time to be improved. This list is exemplary and should not be considered as exhaustive or limiting in any way. The system receives the service request 102b. The system distributes this service request to the selection committee 103b. The selection committee is comprised of regular users who have sufficient standing in the community of users to be granted this authority. The selection committee reviews the service request 104b. Either they reject the service request or they approve the service request and convert it into a service proposal 105b. The lead member of the selection committee submits the service proposal into the system. This service proposal is comprised of a plurality of information, including an overview, the objective of the work, a list of deliverables, the acceptance criteria for each deliverable and a schedule. The selection committee user also submits an estimated budget with the service proposal. The system receives the service proposal and budget 106b and ensures sufficient funding is available to cover the estimated budget. The system then publishes the service proposal for review by service provider users 107b. A plurality of service provider users review the service proposal 108b. Any authorized service provider user can submit a bid to provide the service specified in the service proposal 109b. The system receives the bids 110b. The system then distributes the bids to the selection committee 111b. The selection committee users assess the bids 112b then they score the bids and submit a recommendation 113b. Scoring entails assigning a score between 1 and 100 to each key component of a bid. This score reflects how each deliverable proposed by the supplier meets the need specified in the proposal. The lead selection committee user then submits their scores and the recommendation to the system. The reviewer user includes a summary of the pros and cons of each proposal. The system receives the scores from each member of the selection committee then determines the average weighted score for each bid 114b. The system then distributes the scores, summaries and recommendations to all impacted worker users for a vote 115b. This distribution includes the worker users who own an impacted micro home business within an impacted decentralized autonomous organization within an impacted jurisdiction. The impacted worker users assess the recommendation then vote to approve or reject the service proposal 116b. The system checks the number of votes against the predetermined approval threshold and validates the decision 117b. The system validates the decision by validating the voters and the number of votes. The system then implements the decision by doing nothing if the proposal is rejected or by notifying the users and supplier if the service request is approved 118b. For approved service requests, the work is conducted by the selected service provider user and the selection committee is responsible for accepting this work.

FIG. 1c illustrates the certification process for the present invention. Service providers can submit educational, learning and training materials under the procedure illustrated previously in FIG. 1b. Any courses that are approved by the service provider process, are made available in the business opportunity store for consumption by users.

Any user can submit a request to take a course 101c. The system receives the request from that user to take that course 102c. The system also displays all courses that are available to the user in the business opportunity store 103c. The user takes the course 104c then takes a test 105c. The system scores the test 106c then generates feedback 107c. This feedback includes scores, automated statements about incorrect answers and a pass or fail result 108c. If the user fails the test then that user can choose to retake the test 105c. If the user passes the test then that user can choose to confirm the feedback 109c and accept the certification. The system certifies the user's qualification 110c then updates the user's profile 111c.

When a user applies for a micro home business they have to explain the purpose of that micro home business. The user also has to explain the user's need that the micro home business will address. The general needs are physiological, safety, belonging, esteem and self-actualization. Physiological needs 112c include access to basic essentials, such as air, water, food, shelter, sleep and clothing. These needs focus on survival rather than poverty alleviation. Safety needs 113c include personal security, work, resources, health and property. Satisfying these needs help alleviate poverty. Belonging needs 114c include friendship, family and connection. Satisfying these needs help strengthen the community. Esteem needs 115c include respect, self-esteem, status, recognition, strength and freedom. Satisfying these needs help create leadership and wealth. Self-actualization needs 116c include the user's desire to fulfill their potential completely. Satisfying these needs help realize contentment.

System Context

Figure 2:
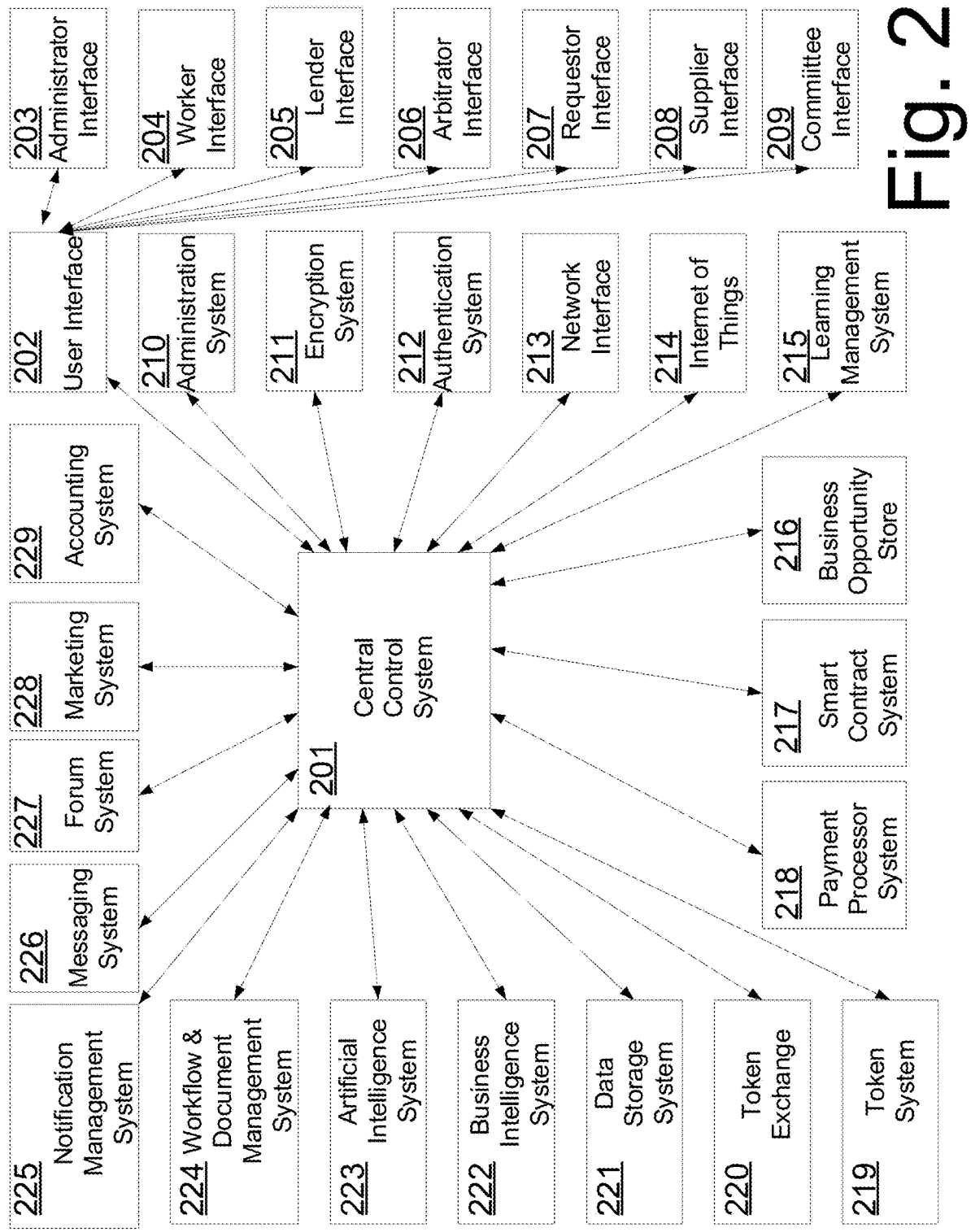
FIG. 2 illustrates a first embodiment of the system architecture of the present invention.

FIG. 2 illustrates the system context of a first embodiment of the apparatus and process for the present invention.

The central control system ("CCS") 201 is operatively coupled to a plurality of other systems and user interfaces. Operative coupling is the preferred procedure to exchange information between systems. In the present invention, the systems are inter-connected via a combination of wide area networks including the public switched telephone network, local area networks, such as an Ethernet network, token ring networks, wireless networks, the internet, the internet of things and at least one blockchain. Most systems, such as modern computers, include a built-in interface to a local network, such as an Ethernet or 802.11b wireless network. The communications protocol used by these networks follow an international standard, such as 802.11b, that enables these systems to exchange data using a pre-determined method. However, local area network connectivity only ensures the integrity of data transfer. It is also necessary to specify the information to transfer, its source location and its intended location in the destination system. Each system has its key information stored in pre-determined locations in its database. When the installation engineers configure the interface between two systems, they specify the pre-determined location of the required information in the source system's database and the pre-determined location for that information in the destination system's database. The engineers also specify the pre-determined frequency of information transfer (e.g., continuous, every day at 10:00 PM PT), the pre-determined format to use (e.g., synchronous, flat file Extract Transform Load "ETL") and the pre-determined error checking protocol to use. The combination of network connectivity and the configuration of the communication method by installation engineers enable systems to be operatively coupled to the CCS.

The CCS 201 is operatively coupled to the user interfaces. The different types of users access the CCS through a plurality of user interfaces. The user interfaces include the system administrator interface 203, the worker interface 204, the lender interface 205, the arbitrator interface 206, the requestor interface 207, the supplier interface 208, and the committee member user interface 209, collectively "the user interfaces". The user interfaces are the input and output gateways for communications with the CCS 201. Note that this layout for user interfaces illustrates the key roles. The present invention enables a single user to play many roles from a common terminal.

The administration system 210 is operatively coupled to the CCS 201. The administration system enables an administrator user to administer the CCS. For example, the system administrator can use the administration system to update the look, feel and content of the web and mobile interfaces. The administration function also provides customer service features that handle customer enquiries, support community discussions and also enable technical support and maintenance functions for the present invention.

The encryption system 211 is operatively coupled to the CCS 201. The encryption system enables a symmetric encryption key, public encryption key and private encryption key to be generated for each user or transaction. It also provides an algorithm that is used to encrypt and decrypt information. It supports a multitude of encryption techniques including symmetric encryption that uses the same key to encrypt and decrypt information as well as asymmetric encryption that uses a public encryption key to encrypt information and a matching private encryption key to decrypt the same information.

The authentication system 212 is operatively coupled to the CCS 201. The authentication system encrypts authentication information, decomposes it into subcomponents, distributes those subcomponents dynamically across randomly selected member computers and uses biometrics to secure and recover the authentication information. This includes securing authentication information for users, systems, payments, transactions and devices, such as IoT devices.

The network interface 213 is operatively coupled to the CCS 201. The networks available to the CCS through the network interface include, the internet, the internet of things (IoT) and at least one blockchain in addition to standard computer networks that include local area networks, WIFI networks, wide area networks, ethernet networks, token ring networks, wireless networks, cable networks, broadband networks, satellite networks and the public switched telephone network.

The Internet of Things platform 214 is operatively coupled to the CCS 201. It is comprised of a number of sensors that capture data from their surroundings, such as equipment, and IoT actuators the give out data to their surroundings, such as control devices for autonomous equipment. The internet of things platform processes this data into useful information then analyzes and transforms it into knowledge that supports decision making. The objective is to deliver the right data, at the right time, to the right people to drive the right business outcomes. The Internet of Things platform is detailed below.

The learning management system 215 manages courses that are available to borrower/worker users that help them qualify for higher level micro home businesses. It is operatively coupled to the CCS 201. The learning management system administers, documents, tracks, reports, and delivers educational courses, training programs, learning programs and development programs. The learning management system delivers and manages a variety of content, including video, courses, virtual reality and documents. In one embodiment of the present invention, all of the courses are self-directed and all of the tests are multiple choice. This automates teaching and test scoring, which eliminates the need for human supervision or human intervention. The present invention uses a specific learning management system. However, a number of commercial off-the-shelf learning management systems are available that can meet the needs of the present invention including LearnUpon, Docebo and MindFlash LMS. These systems all include mobile learning, social learning, gamification, and video conferencing.

The business opportunity store 216 is operatively coupled to the CCS 201. The business opportunity store gives users access to a plurality of passive and active revenue opportunities. The present invention enables supplier users, who curate business opportunities, to add, edit and delete business opportunities in the business opportunity store. The service request process described in FIG. 1b enables curator supplier users to add business opportunities as a new service. These curator supplier users also provide educational and training materials for worker users to self-certify so they can qualify to operate these business opportunities. See FIG. 1c.

The smart contract system 217 is operatively coupled to the CCS 201. The smart contract system manages the smart contracts used by the present invention. Smart contracts are computer programs designed to automate the execution of the terms of a machine-readable contract or agreement. Each smart contract is implemented as a machine executable program which comprises rules that can process inputs in order to produce results, which can then cause actions to be performed dependent upon those results. In a first embodiment of the present invention, the smart contracts receive input conditions, such as loan terms and account information, then the smart contract initiates the payment transfer from the source account to the destination account in accordance with the predetermined terms and conditions. US20180005186A1 teaches a smart contract management system that is consistent with the needs of the present invention. US20180089758A1 teaches an example smart contract that meets the basic needs of the present invention.

The payment processor system 218 is operatively coupled to the CCS. The payment processor system enables payments to be transferred from a first user to a second user. A number of service providers offer payment processor systems that meet the needs of the present invention, such as Paypal, Google, WePay and Stripe.

The token system 219 is operatively coupled to the CCS 201. It enables crypto currency tokens to be created, transferred and stored on a blockchain. A token is a cryptographic string of numbers and letters that is stored on a distributed ledger, or blockchain, as a transaction. A first user creates a message, such as transfer 10 of my cryptocurrency tokens to another user whose address is 0x7e5f4552091a69125d5dfcb7b8c2659029395bef (for example). The first user then signs (e.g., encrypts) that message using their private key. The first user then submits the encrypted message to the blockchain. A second user can access that message then use the first user's public key to decrypt the message. The encrypted message can describe a crypto currency token and its transactions. In one embodiment, the present invention uses its own crypto currency DAO tokens instead of cash for financial transactions. Users can exchange these tokens on a token exchange. Also, a token is not a physical object or even a digital representation of a physical object. Rather, it is a string characters that represent a transaction that creates, transfers or destroys virtual tokens. The following contract is exemplary and is not intended to represent the script that the present invention uses to mint a token (or coin). It will be apparent to those skilled in the art that the present invention can be practiced with a comparable alternative to this specific contract.

```
pragma solidity ^0.5.0;
contract Coin {
    //The keyword "public" makes those variables
    //easily readable from outside.
    address public minter;
    mapping (address=>unit) public balances;
    //Events allow light clients to react to
    //changes efficiently.
    event Sent(address from, address to, unit amount);
    //This is the constructor whose code is
    //run only when the contract is created.
    constructor( ) public {
        minter=msg.sender;
    }
    function mint(address receiver, unit amount) public {
        require(msg.sender==minter);
        require(amount<1e60);
        balances[receiver]+=amount;
    }
    function send(address receiver, unit amount) public {
        require(amount<=balances[msg.sender], "Insufficient balance.");
        balances[msg.sender]-=amount;
        balances[receiver]+=amount;
        emit Sent(msg.sender, receiver, amount);
    }
}
```

The token exchange, or crypto currency exchange, 220 is operatively coupled to the CCS 201. According to Wikipedia a cryptocurrency exchange or a digital currency exchange (DCE) is a business that allows customers to trade cryptocurrencies or digital currencies for other assets, such as conventional fiat money or other digital currencies. A cryptocurrency exchange can be a market maker that typically takes the bid-ask spreads as a transaction commission or, as a matching platform, simply charges fees. A crypto currency exchange is taught by US 2015/O170112 A1. The present invention uses the crypto currency exchange to sell, buy, and exchange its DAO tokens. The present invention can use a plurality of third-party exchanges for its transactions, including LA Token, Bittrex and Binance.

The data storage system 221 is operatively coupled to the CCS 201. The data storage system stores the plurality of data used by the present invention.

The business intelligence system 222 is operatively coupled to the CCS 201. The business intelligence system calculates and stores a plurality of information about trends, patterns and relationships in the databases used by the present invention.

The artificial intelligence ("AI") system 223 is operatively coupled to the CCS 201. AI systems are machines that appear to have human intelligence. They ingest volumes of data, adapt to their environment, react to changing conditions, search through possible scenarios handle multiple people and systems concurrently and can even act on their own recommendations. A first embodiment of the present invention uses a commercial off the shelf artificial intelligence system. It leverages standard AI methodologies including time series prediction and reinforcement learning systems to guide user demand for micro home businesses. The time series prediction model estimates demand over time. It leverages long short-term memory (lstm)/recurrent neural network (rnn) models with sliding windows and traditional logistic regression techniques with a few adaptations. These models receive a plurality of inputs, including external data, such as the local exchange rate, which has a significant correlationship with demand for micro home businesses in certain regions. The reinforcement learning system has simulation models that make predictions, or classifications, then acts on those predictions autonomously without human intervention. Whenever demand falls toward the minimum target or increases toward a maximum target for any given location, the CCS provides feedback to the model to help it improve its predictive capabilities for micro home businesses. Although a commercial off the shelf system is used, a number of artificial intelligence systems are available that can meet the needs of the present invention, such as the one taught in patent U.S. Pat. No. 4,670,848A.

The workflow and document management system 224 is operatively coupled to the CCS 201. The workflow and document management system enables users to create and evolve workflows that guide users through the best practice to complete an activity. A first embodiment of the present invention uses a modified version of the WMS taught in co-owned application Ser. No. 10/716,747 (11/18/2003). However, a number of commercial workflow management systems are available that can meet the needs of the present invention, including ProcessMaker and Integrify.

The notification management system 225 is operatively coupled to the CCS 201. The CCS sends an alert to the notification management system whenever an event occurs that requires the attention of a user or other entity. For example, after bids are received and processed and a vendor is selected to build a micro home business the CCS will instruct the notification management system to alert the service provider builder user by sending an email, text message or alternative notification. The present invention uses a specific notification management system. However, Google and web hosts such as GoDaddy and Host Gator provide tools that support alerts that can be used by the present invention.

The messaging system 226 is operatively coupled to the CCS 201. The messaging system enables users to exchange communication messages in real time. For example, a worker user can send a question to a service provider user and that service provider user can respond immediately. In addition, multiple stakeholders can participate in a group conversation using real time messaging where they can exchange communications in multiple formats including text and files. The present invention uses a specific messaging system. However, Google and web hosts such as GoDaddy and Host Gator provide messaging system that can be used by the present invention.

The forum system 227 is operatively coupled to the CCS 201. The forum system enables users to create a bulletin board where multiple users can exchange communication messages about a topic specified by the user who created and manages the forum. For example, a worker user may be facing an issue related to a micro home business. That worker user can create a forum to explain the issue. Other stakeholders with the relevant expertise can respond with information to help resolve the issue. Forums allow users to exchange information in multiple formats including text and files. The present invention uses a specific forum system. However, web hosts such as GoDaddy and Host Gator provide forum solutions that can be used by the present invention. For example, GoDaddy's Website Builder solution supports forums. Other forum software solutions that can be used by the present invention include MyBB, pphbb and punbb.

The marketing system 228 is operatively coupled to the CCS 201. Marketing software is generally categorized into three groups: advanced workflow automation, marketing intelligence, and marketing automation. The marketing system allows the management of marketing campaigns, optimization of resources, and has features for data collection, analytics, team collaboration, branding, phone call tracking, social media marketing, content distribution, SEO, lead scoring and nurturing, and email marketing. The present invention's marketing system enables users to market their offerings to other users. For example, supplier users can market their offerings to reviewers. In a first embodiment of the present invention, a commercial off the shelf marketing system is operatively coupled to the CCS. However, a number of commercial off the shelf marketing systems can be used with the present invention including, Salesforce and Hubspot.

The accounting system 229 is operatively coupled to the CCS 201. In general, businesses use accounting systems for financial close, revenue management, fixed assets, order management, billing, inventory management, expense management and management of its other financial activities. Modules include billing and payroll, accounts receivable, accounts payable, budget and forecast, fixed assets, inventory and general ledger. The present invention uses a specific accounting system. For example, a service provider can bid for the contract to complete the accounts for the system. If that service provider is awarded the contract then he or she will be granted access to the accounting system. However, a number of commercial accounting systems are available that can meet the needs of the present invention, including Workday, NetSuite ERP, Quickbooks Enterprise snd Microsoft Dynamics GP.

Figure 3:
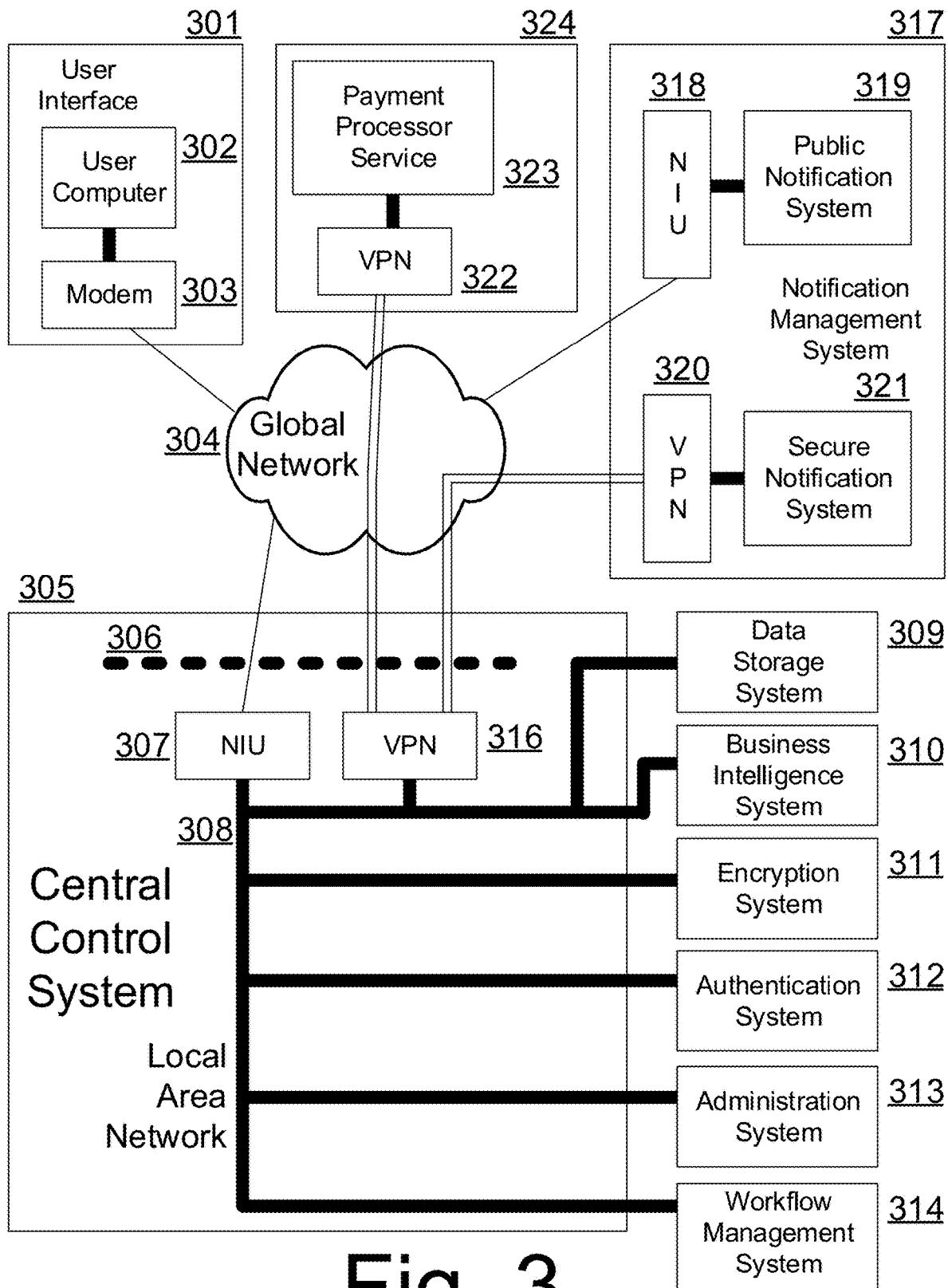
FIG. 3 illustrates a first embodiment of the integration among the central control system and selected components of the present invention.

FIG. 3 illustrates the network connectivity of a first embodiment of the apparatus and method of the present invention.

The user interfaces 301 include a computer 302 and a modem 303. Many companies make mobile and desktop computers that a user can use to access the CCS including Apple, Samsung, Hewlett Packard, and Toshiba. In addition, many companies make modems that can connect to the CCS including 3Com Corp., D-Link Systems, Inc., and US Robotics. The user's computer is connected to the CCS via the modem and a Global Network 304, such as the Internet. The user's modem can be connected to the Global Network using at least one of a plurality of services including public or private networks such as the public switched telephone network, dedicated data line, cable service, cellular service, WiFi service, personal communication system ("PCS"), satellite network, and a microwave connection. These types of connections are provided by a plurality of organizations including local and regional telephone operating companies, cable TV companies and other providers of private and public networks.

The CCS 305 includes a local area network 308 that is connected to the global network 304 via a network interface unit ("NIU") 307 and a firewall 306. The CCS is also connected to other systems via the local area network 308 including the Data Storage System 309, Business Intelligence System 310, Encryption System 311, Authentication System 312, Administration System 313, and the Workflow Management System 314.

The CCS 305 also includes a Virtual Private Network ("VPN") modem 316 that is connected to the Secure Notification System 321 and the Payment Processor System 323. Many companies make VPN modems that can be used with the present invention including Netgear, Linksys and Cisco. The Secure Notification System 321 is connected to the CCS via the Global Network using a Virtual Private Network modem 320. In addition to the Secure Notification System 321, the Notification Management System 317 includes a Public Notification System 319. The Public Notification System 319 is connected to the Global Network using a Network Interface Unit 318. The preferred embodiment of the present invention can use a plurality of Public Notification Systems including email services and mobile services. The present invention can operate with many such email services including Yahoo, Hotmail and Gmail. Many organizations provide such email services including Yahoo, Microsoft and Google. The Payment Processor System 324 includes a Payment Processor Service 323 that is connected to the Global Network via a VPN modem 322. Many organizations provide such Payment Processor Services that can be used with the present invention including Paypal, Western Union, WePay, Stripe and Verisign.

Figure 4:
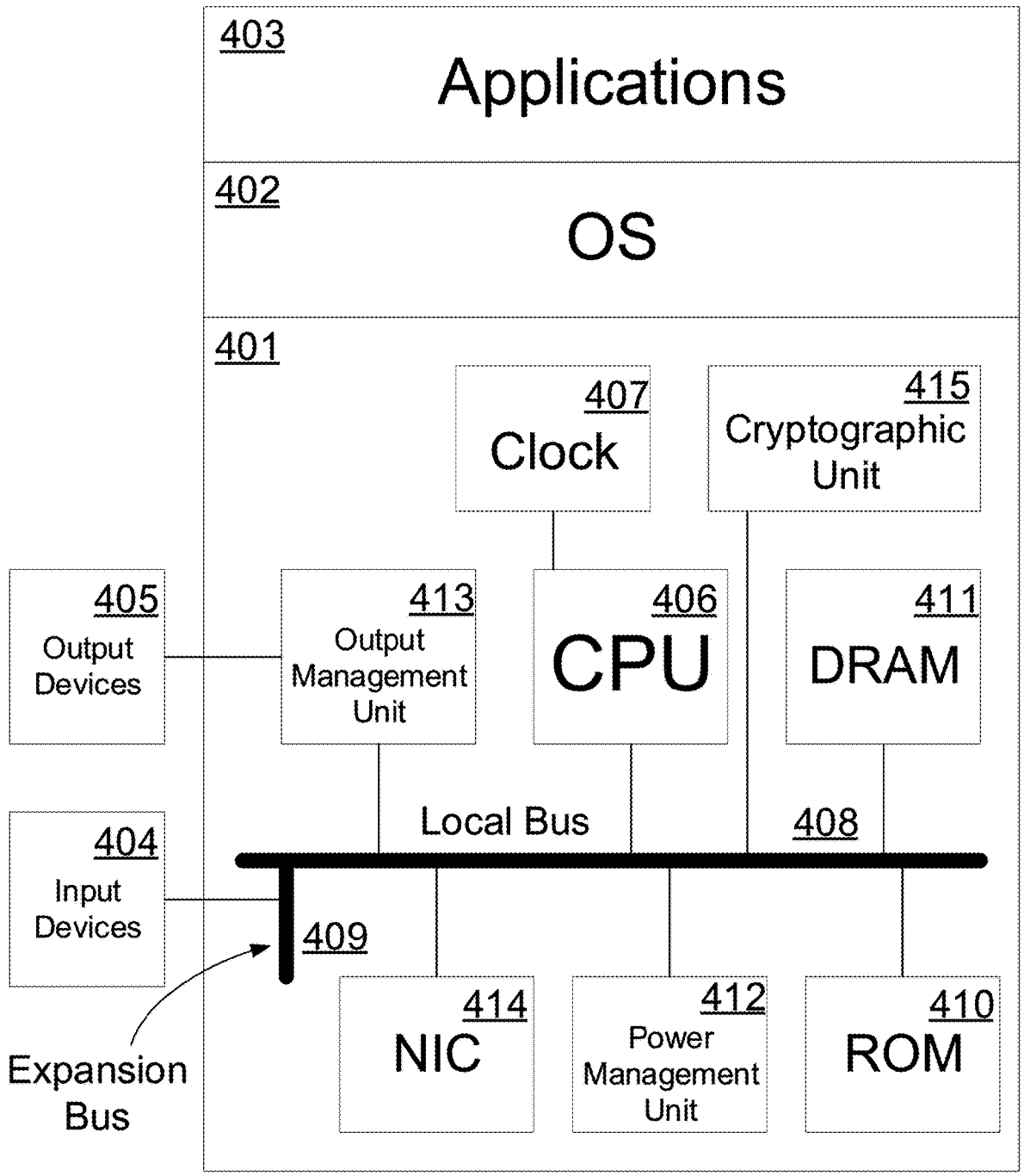
FIG. 4 illustrates a first embodiment of the technical platform for the central control system of the present invention.

FIG. 4 illustrates the key components of the CCS in a first embodiment of the apparatus and method of the present invention.

The Central Control System ("CCS") includes a number of key components including the main hardware 401, the operating system 402, software applications 403, input devices 404 and output devices 405. The operating system 402 is the interface between the applications and the hardware. It controls the execution of computer applications and provides services to those applications. The preferred embodiment of the present invention can use one of a plurality of standard commercial operating systems, such as Microsoft windows, Linux and UNIX. The applications 403 include software tools such as commercial antivirus software available from companies such as McAfee and Norton, and a browser, such as Microsoft Internet Explorer, Chrome and Firefox. The CCS also includes some unique code that implements some of its unique functions described in this disclosure, such as coordinating data interchange among the different systems illustrated in FIG. 2. This unique code is programmed using a combination of programming languages including java, javascript, PHP, HTML, C, C+, and visual basic. Input devices 404 include a plurality of commercial options such as a smartphone, keyboard, a camera, a mouse, and a microphone. Output devices include a plurality of commercial options such as a smartphone, monitor and speakers. These standard commercial input devices 404 and output devices 405 are available from a plurality of vendors such as CompUSA and Office Depot.

The main hardware 401 in the CCS is a combination of at least one conventional smartphone, personal computer and server each with sufficient memory and processing power. To one skilled in the art, it will be evident that the functionality of the CCS can be distributed over multiple inter-connected smartphones, multiple inter-connected personal computers or multiple inter-connected servers. The main hardware includes a number of key components including the central processing unit ("CPU") 406, clock 407, local bus 408, expansion bus 409, read only memory ("ROM") 410, dynamic random access memory ("DRAM") 411, power management unit 412, output management unit 413, network interface card 414 and cryptographic unit 415.

The central processing unit ("CPU") 406 is the component of the CCS that performs most of the data processing. It interprets instructions, performs logical and arithmetic operations on data, and controls input and output functions. The preferred embodiment of the present invention can use a commercial CPU from a plurality of vendors, such as a Pentium G3258 supplied by Intel and the FX-9590 supplied by AMD. The clock 407 regulates the rate at which the CPU processes instructions. The CCS also uses the clock to synchronize the operation of its key components. A CPU such as a Pentium G3258 can operate at a clock speed of 3.2 GHz. The CCS uses the local bus to inter-connect its key components. These key components exchange data via the local bus. The CCS uses the expansion bus 409 to enable expansion cards to exchange data with the CPU and memory. Examples of commercial expansion cards are sound cards and graphics cards. The expansion bus also enables input devices 404, such as a mouse, to input data that can be used by the key components of the CCS. The read only memory ("ROM") 410 includes the instructions that the CPU executes to perform its basic operations. The vendor of the computer platform that comprises the hardware component of the CCS provides the instructions that are stored in the ROM. When the CCS's power is removed then restored, the instructions in the ROM remain unchanged. The dynamic random access memory ("DRAM") 411 includes instructions that the CPU executes to perform selected tasks. The DRAM also stores the data that is used by the instructions executed by the CPU. However, when the CCS's power is removed then restored, the information in the DRAM is lost. The CCS uses the power management unit 412 to supply and regulate the power required to operate the key components of the CCS. The CCS uses the output management unit 413 to interface with output devices, such as a monitor. The CCS uses the network interface card ("NIC") 414 to interface with external networks, including an Ethernet network, public switched telephone network and a wireless network. The CCS uses the cryptographic unit 415 to support secure communications with external systems, such as the payment processor system and secure notification management system. The vendor of the computer platform, which is used by the CCS, provides the local bus, expansion bus, ROM, DRAM, power management unit, output management unit, network interface card, clock, CPU and cryptographic unit. Specific components, including the NIC, can be obtained from alternate commercial vendors including CompUSA and Office Depot.

Figure 5:
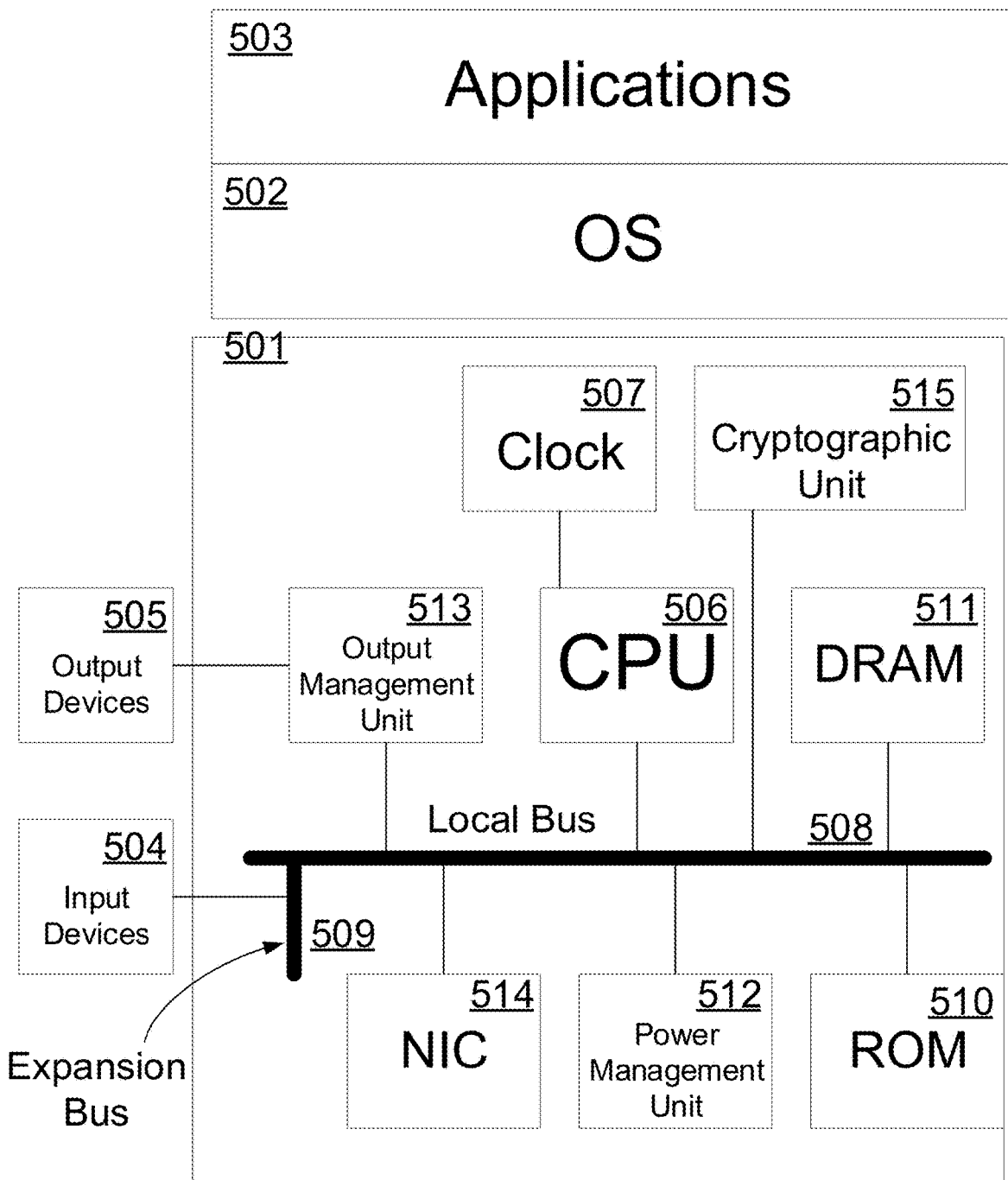
FIG. 5 illustrates a first embodiment of the user interface to the present invention.

FIG. 5 illustrates the key components of the user interface in a first embodiment of the apparatus and method of the present invention.

In a preferred embodiment of the present invention the user interface device 301 is at least one of a smartphone and conventional personal computer that includes, the main hardware 501, the operating system 502, software applications 503, input devices 504 and output devices 505. The main hardware 501 in the user interface device includes a number of key components including the central processing unit ("CPU") 506, clock 507, local bus 508, expansion bus 509, read only memory ("ROM") 510, dynamic random access memory ("DRAM") 511, power management unit 512, output management unit 513, network interface card ("NIC") 514 and cryptographic unit 515. These components are substantially the same as the similarly named components in the CCS as illustrated in FIG. 4. They also perform substantially the same functions and are available from the same vendors. The key differences are that the components in the CCS have higher performance requirements than the equivalent components in the user interface device. In addition, the user interface device includes, commercial software applications such as a word processor application and graphical design application. An example of a word processor application that can be used by the present invention is Microsoft Word. An example of a graphical design application that can be used by the present invention is Microsoft Visio. Examples of higher performance components for the CCS are a faster clock speed, a more powerful CPU and higher capacity DRAM.

Figure 6:
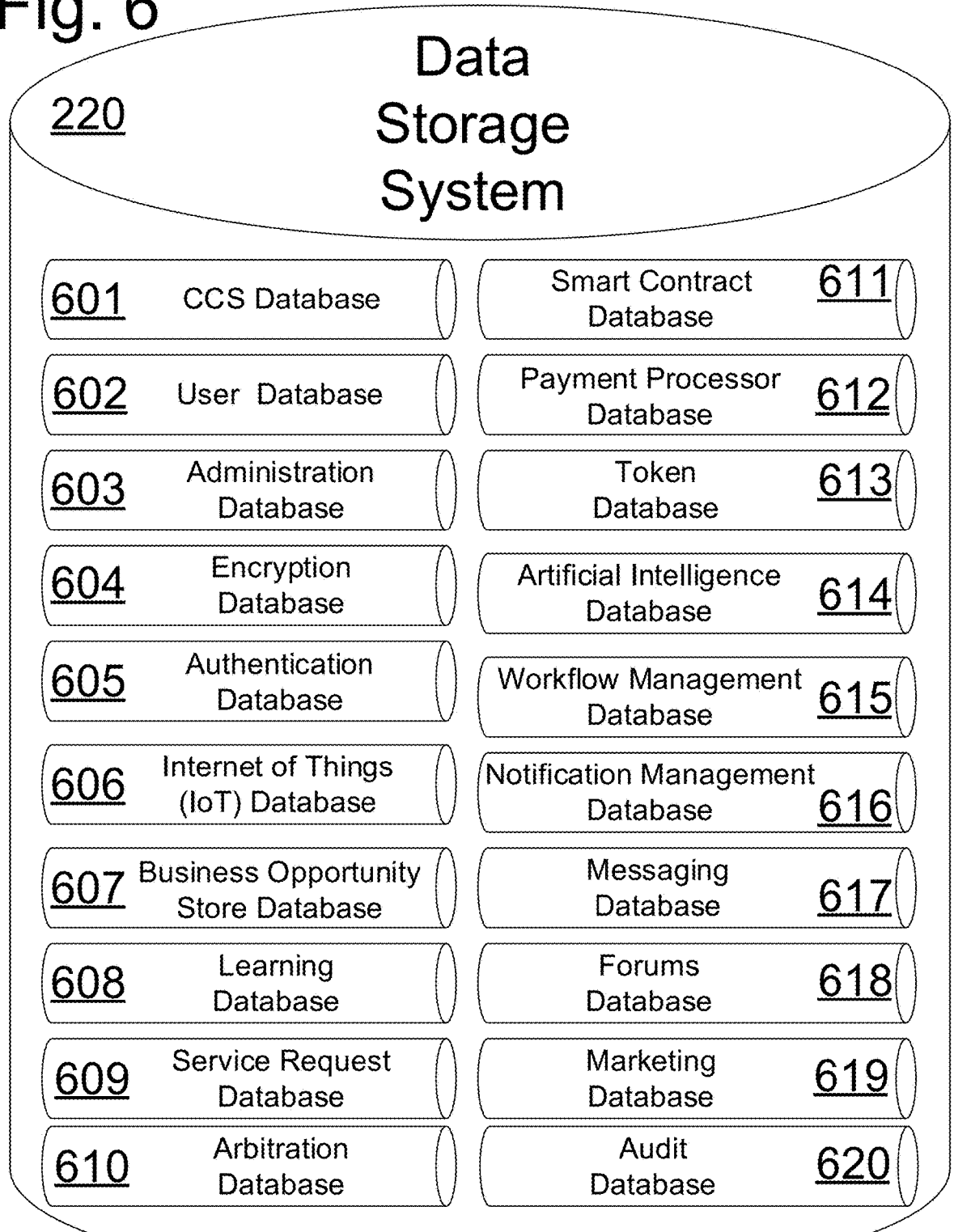
FIG. 6 illustrates a first embodiment of the data storage system ("DSS") for the present invention.

FIG. 6 illustrates the key components of the Data Storage System in a first embodiment of the apparatus and method of the present invention.

The data storage system 207 is a conventional hard disk drive that includes non-volatile, magnetic-based hard disk storage that stores digitally encoded data. The data is retained in the data storage system after power is removed then restored. A plurality of suppliers manufacture data storage systems that can be used by the present invention including EMC, Western Digital, Seagate, Maxtor, and Hitachi. The data storage system is comprised of a plurality of databases that are described below. The present invention uses a specific database system. However, one of a plurality of database systems cam meet the needs of the present invention including Oracle and SQL database systems. The CCS stores the data in the Data Storage System in an encrypted format.

The CCS uses the CCS database 601 to store information about how users are using of the CCS. The CCS database contains a plurality of fields including a unique reference key for each record in the CCS database, the unique reference key of each user who has logged into the CCS and tracking information about the functions of the CCS used by each user during each login session.

The CCS uses the user database 602 to store information about users. For each user, the user database contains a plurality of fields including a unique reference key for each record in the user database, type of user, the user's name, role, location, contact phone numbers, email address, social media account IDs, notes, qualifications, organization, type of organization, industry, target market, user authentication information and login credentials for the CCS.

The CCS uses the administration database 603 to store information about the website, the mobile website, and the mobile application for the CCS as well as information about the maintenance and support of the CCS. The administration database contains a plurality of fields including a unique reference key for each record in the administration database, the type of information, the actual information, and corresponding meta data.

The CCS uses the encryption database 604 to store information about the symmetric encryption keys, private encryption keys, and public encryption keys. The encryption database contains a plurality of fields including a unique reference key for each record, the unique reference key for each user and information about the encryption keys. This information does not give the CCS access to the actual encryption keys.

The CCS uses the authentication database 605 to store authentication information about users, systems and devices. The authentication database is distributed across a number of member computers. It stores authentication information that has been encrypted and decomposed into subcomponents. Users can use a biometric signature to initiate and reverse this secure authentication process.

The CCS uses the Internet of Things (IoT) database 606 to store information about IoT devices and their connectivity. For each IoT device, the Internet of Things (IoT) database contains a plurality of fields that include a unique reference key for each record in the Internet of Things (IoT) database, the type of device, infrastructure, identification, communications and transport, discovery, data protocols, device management, semantic and multi-layer framework.

The CCS uses the business opportunity store database 607 to store information about micro home businesses and business opportunities. For each micro home business, the business opportunity store database contains a plurality of fields that include a unique reference key for each record in the business opportunity store database, the type of micro home business, the type of business opportunity, specifications, the current status, micro home mortgage application, the curator service provider, the builder service provider, the mortgage service provider, the bridge loan service provider, the prerequisites/qualifications and requirements, the worker user, the terms and conditions, the mortgage amount, mortgage term, mortgage rate, change requests, proposals, bids, recommendations and arbitration rulings.

The CCS uses the learning database 608 to store information about its courses. For each learning option, the learning database contains a plurality of fields that include a unique reference key for each record in the learning database, the type of course, the prerequisites, duration, type of media, templates and type of test.

The CCS uses the service request database 609 to store information about its service requests and service providers. For each service request, the service request database contains a plurality of fields that include a unique reference key for each record in the service request database, the type of service request, the current status, the requestor, reviewers, approvers, the bidding service providers, the selected service providers, the proposal, the recommendation, bids received, votes, final decision and arbitration ruling.

The CCS uses the arbitration database 610 to store information about arbitration cases. For each arbitration case, the arbitration database contains a plurality of fields that include a unique reference key for each record in the arbitration database, the type of arbitration, the current status, the arbitrators, the borrower, the underwriters, the approvers, arbitration options, arbitration recommendation, votes and the arbitration ruling.

The CCS uses the smart contract database 611 to store information about its smart contracts. For each smart contract, the smart contract database contains a plurality of fields that include a unique reference key for each record in the smart contract database, the type of smart contract, the purpose of the smart contract, the input conditions, the procedure, the output conditions, terms and conditions, owner, risks, version control, language, blockchain and script.

The CCS uses the payment processor database 612 to store information about payments between users. The payment processor system has its own database. However, each payment that is submitted to the CCS is stored in the payment processor database. For each payment submitted to the CCS, the payment processor database contains a plurality of fields including a unique reference key for each record, the user's payment credentials, the amount of the payment, the payment method, the type of transaction, the date and time that the payment was submitted, whether the payment was accepted or rejected and the date and time that the payment was confirmed or rejected. Payments may be made using a plurality of methods, including fiat currency, crypto currency, digital cash, cash equivalents, credit card, debit card, prepaid card, direct debit, mobile payments, barter, debt, financing, automated buying, ACH, letter of credit, check, money orders and crowd buying.

The CCS uses the token database 613 to store information about its tokens. For each token, the token database contains a plurality of fields that include a unique reference key for each record in the token database, the type of token, the purpose of the token, the previous owner, the current owner, terms and conditions, risks, current value, language, version control, blockchain and script.

The CCS uses the artificial intelligence database 614 to store information that supports the artificial intelligence system. For each record, the artificial intelligence database contains a plurality of fields that include a unique reference key for each record in the artificial intelligence database, the worker user reference key, the micro home office reference key, the arbitrator user reference key, the requestor user reference key, the reviewer user reference key, the service provider user reference key, the approver user reference key, the learning management reference key, the proposal reference key, the bid reference key, the recommendation reference key, key for the business rules table and the notification reference key.

The CCS uses the workflow management database 615 to store information about different workflows, procedures and best practices. For each workflow, the workflow management database contains a plurality of fields including a unique reference key for each record, a name for the workflow, a description of the workflow, the steps in the workflow and the unique reference key for the type of workflow.

The CCS uses the notification management database 616 to save and archive information about notifications. The notification database also stores links to templates for the different types of notifications. A notification is a message sent to a user to inform that user that an event has occurred, such as a mortgage pre-approval. For each notification, the notification database contains a plurality of fields including a unique reference key for each record, the type of event that caused the notification (e.g., a mortgage pre-approval), the unique reference key for the event that has caused the notification (e.g., the unique reference key for a mortgage application), the type of template to use for the notification, the unique reference key for the recipient to be notified (e.g., unique reference key for the destination user or system), the date and time of the event that caused the notification, the date and time that the notification was sent, the title of the notification, the message within the notification, the unique reference key for each user who shall receive a carbon copy of the notification and the unique reference key for each user who shall receive a blind copy of each notification.

The CCS uses the messaging database 617 to save and archive messages. The messaging database also stores links to templates for the different types of messages. A message is a communication from one user to another user or a note that is saved by a user. For each message, the messaging database contains a plurality of fields including a unique reference key for each record, the unique reference key for the messaging thread (e.g., text messaging between two users), the sequence in the thread for the message, and the date and time for the message.

The CCS uses the forums database 618 to store information about forums. The forums database contains a plurality of fields including a unique reference key for each record, the name of the forum, the purpose of the forum, the topic, and the audience who can see the forum and participation rights.

The CCS uses the marketing database 619 to store information about marketing campaigns. The marketing database contains a plurality of fields including a unique reference key for each record, the name of the marketing campaign, a description for the marketing campaign, the target audience, links to information that supports the marketing campaign, the terms and conditions for the offer, the timeframe for the marketing campaign, the approved budget for the marketing campaign, the actual spend for the marketing campaign, the success criteria, the key performance indicators and the partners used to execute the marketing campaign.

The CCS uses the audit database 620 to save and archive transactional information about CCS activities such as transactions between worker users and lenders. The audit database contains a plurality of fields including a unique reference key for each record, information about each activity performed by the CCS, the time that the activity occurred, and the unique reference key of the person who initiated the activity.

FIG. 7 illustrates the key components of the Business Intelligence System in a first embodiment of the apparatus and method of the present invention.

The Business Intelligence System is operatively coupled to the CCS. Many companies supply business intelligence systems that can be used by the present invention including Microstrategy and Oracle. The CCS uses the business intelligence system to analyze data stored in the plurality of databases that comprise the data storage system. The purpose of the analysis by the business intelligence system is to identify trends, patterns and relationships that may be hidden in the data stored in the data storage system.

The present invention uses a commercial Business Intelligence System that is illustrated in FIG. 7. It includes a plurality of modules including an extract, transform and data load "ETL" module 701, a data warehouse module 702, an analytic tools module 703, a data mining module 704, a reporting tools module 705 and a presentation layer module 706. The main purpose of the business intelligence system is to capture, process and analyze vast amounts of data from a plurality of sources then identify trends, patterns and relationships that can facilitate business decision-making.

The ETL module 701 is the interface between the Business Intelligence System and the CCS. The main purpose of the ETL module is to transfer data from the CCS to the data warehouse. Using ETL tools to operatively couple a system, such as the Business Intelligence System, to the CCS is explained above in the description of FIG. 2.

The data warehouse module 702 is a database built in a commercial storage system and is substantially the same as the data storage system described in FIG. 6. The data warehouse module contains a copy of a pre-determined subset of the total data that is available in the data storage system. The system administrator user specifies the data in the data storage system that the system administrator wants to use for business analysis. The installation engineer configures the ETL module to extract that pre-determined data from the source database in the data storage system, then configures the ETL module to transform that data into a format that is compatible with the data warehouse, then configures the ETL module to load the transformed data into the pre-determined database locations in the data warehouse module. The installation engineer also configures the ETL module to repeat this extract, transform and data load procedure periodically. The present invention uses a specific data warehouse but many vendors offer commercial data warehousing solutions that can be used by the present invention including Hyperion, Microstrategy and Oracle.

The analytic tools module 703 includes standard on-line analytical processing ("OLAP") functionality. OLAP software enables users to create various views and representations of data in the data warehouse. OLAP functionality enables the system administrator user to access, analyze and model business issues and share the information that is in the data warehouse. The present invention uses a specific OLAP solution but many vendors offer commercial data warehousing and OLAP solutions that meet the needs of the present invention, including Hyperion, Microstrategy and Oracle. The OLAP council creates OLAP standards.

The data mining tools module 704 enables the system administrator user to discover trends, patterns and relationships in the data stored in the data warehouse module. Data mining software is designed to analyze large volumes of data using sophisticated data search techniques then apply statistical methods to discover trends, patterns and relationships in the data. The present invention uses a specific data mining system but many data mining options are available that can meet the needs of the present invention, including solutions from Baan Software, Oracle, SAP, Sybase and Tableau Software. The Data Mining Group is an independent, vendor led consortium that develops data mining standards.

The reporting tools module 705 enables the system administrator user to create reports that display the data stored in the data warehouse as well as information that illustrates the trends, patterns and relationships in the data stored in the data warehouse module. The present invention uses a specific reporting tools solution but many vendors offer commercial reporting software that can meet the needs of the present invention, including Business Objects, Cognos, Crystal Reports and Microstrategy.

The presentation layer module 706 includes graphics and multimedia interfaces that enable information and reports to be displayed in a user-friendly manner. The reporting tools described above all include a presentation layer module.

Figure 8:
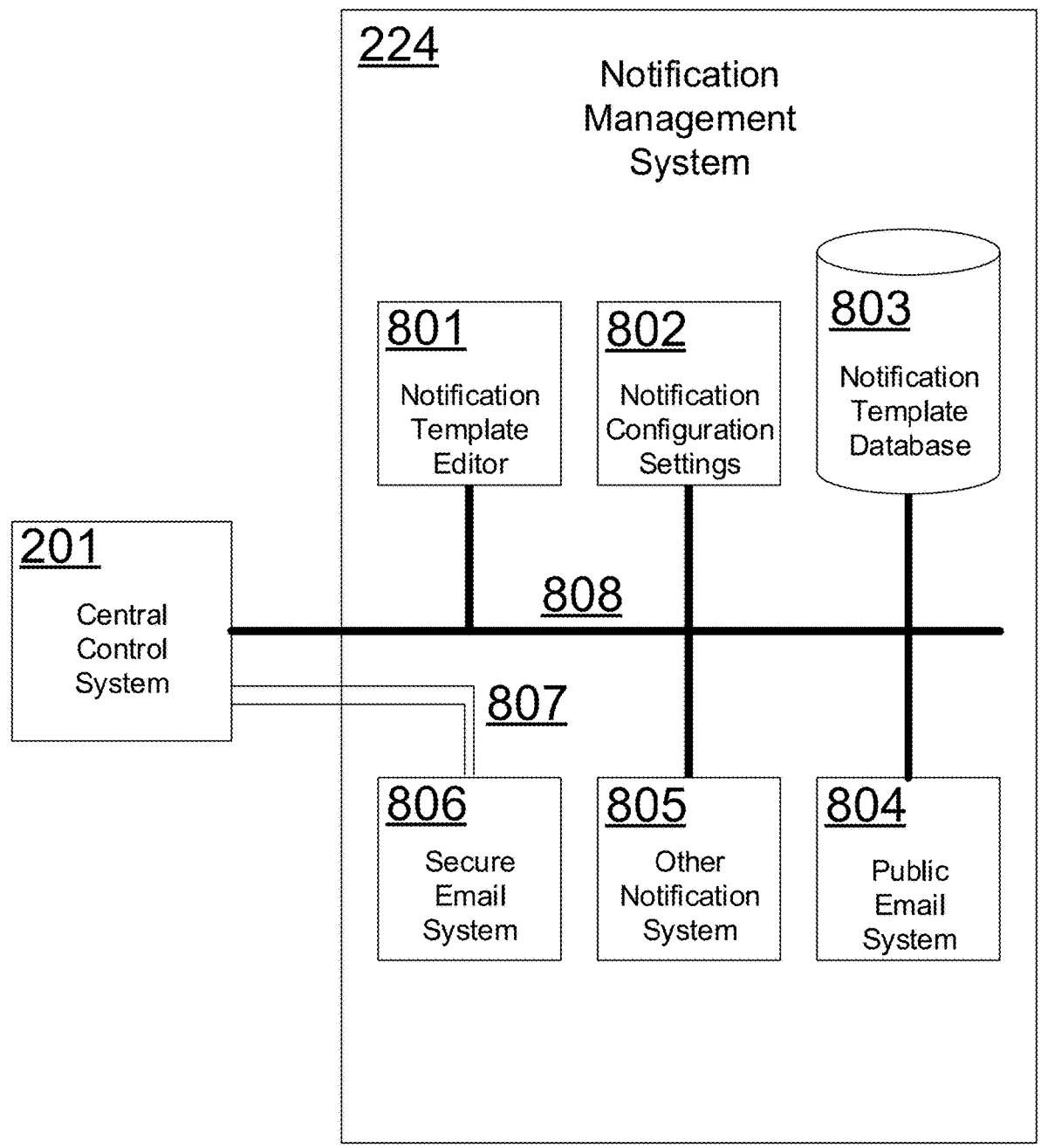
FIG. 8 illustrates a first embodiment of the notification management system ("NMS") of the present invention.

FIG. 8 illustrates the key components of the notification management system in a first embodiment of the apparatus and method of the present invention.

The notification management system 209 is operatively coupled to the CCS. The purpose of the notification management system is to send a notification whenever an event occurs that requires the attention of a user. The CCS sends a notification message via the notification management system to inform the recipient of the notification that a key event has occurred such as a payment has been made. The system administrator user configures the notification management system to monitor a plurality of other events then alert the pre-determined user when the specific event occurs. These events are linked to the key steps in the preferred embodiment of the present invention many of which are illustrated in FIG. 1, FIG. 1*a*, FIG. 1*b* and FIG. 1*c*.

FIG. 8 illustrates the Notification Management System used by the present invention. This Notification Management System includes a plurality of modules including a notification template editor 801, a notification configuration settings module 802, a notification template database 803, at least one public email system 804, at least one other notification system 805, a secure email system 806, a virtual private network (VPN) 807 and a wide area network 808.

The notification template editor 801 is a standard commercial word processor that the system administrator user can use to draft notification templates. The system administrator user then saves those templates into the notification template database 803. The system administrator inserts bookmarks into the notification template where information must be added to convert the template into an actual notification message. For example, the system administrator inserts a bookmark for the notification address (such as an email address) of the pre-determined user to whom the notification shall be sent.

The system administrator user uses the notification configuration settings module 802 to configure and enable the notifications. For example, in one embodiment of the present invention the system administrator user will configure a notification to be sent whenever a mortgage is pre-approved. The configuration information will include a plurality of information including the event (e.g., a pre-approved mortgage), the contact information for the user to be notified, the title of the notification, information about the micro home business, and related meta data.

The notification template database 803 is used to store notification templates. For each notification template, the notification template database contains a plurality of fields including a unique reference key for each record, the unique reference key for the type of event for which the notification template shall be used, the title of the event, the standard message in the notification, the unique reference key for each user who shall receive the notification, the unique reference key for each user who shall receive a carbon copy of the notification and the unique reference key for each user who shall receive a blind copy of the notification. When a predetermined event occurs, the CCS will identify the pre-determined users to whom the notification shall be addressed, the predetermined users who shall receive a copy of the notification and the predetermined users who shall receive a blind copy of the notification. The CCS passes this information and a plurality of other information, such as the predetermined template to use for the specific event, to the notification management system that extracts information from the notification management database to fill in the blanks in the predetermined notification template.

The public email system 804 enables users to receive notifications from the CCS by email. It also enables users to send emails to the CCS. A plurality of public email systems are compatible with the present invention including yahoo mail, hotmail, and gmail. When a user registers with the CCS, that user must input an email address that the CCS will use to send non-confidential notifications.

To one skilled in the art, it will be evident that the CCS can use other notification systems 805 to notify users that an event has occurred. Other possible notification systems include instant messaging, text messages, telephone service, and wireless services. When the user registers with the CCS, the user can input their contact information for their alternative notification systems.

The secure email system 806 enables users to receive secure notifications from the CCS by email. It also enables users to send secure emails to the CCS. A plurality of vendors offers secure email services that are compatible with the present invention, such as Zix mail. When a user registers with the CCS, the CCS will give that user a secure email address. The CCS is connected to the secure email system by a virtual private network (VPN) 807. Commercial telephone companies such as Verizon provide virtual private networks. These VPN circuits provide more security than a regular telephone circuit. The other components of the notification management system are interconnected by a combination of wide and local area networks 808. Such networks are described above in the discussion of FIG. 3.

When an event occurs that requires a notification that does not include sensitive information, the CCS will send the notification to the user's secure email address and also to the user's public email address. When an event occurs that requires a notification that does include sensitive information then the CCS will send the notification to the user's secure email address. The CCS will also send a non-confidential notification to the user's public email address informing that user that a secure notification message has been sent to that user's secure email address. The user will then log in to the CCS to access the secure notification.

Figure 9:
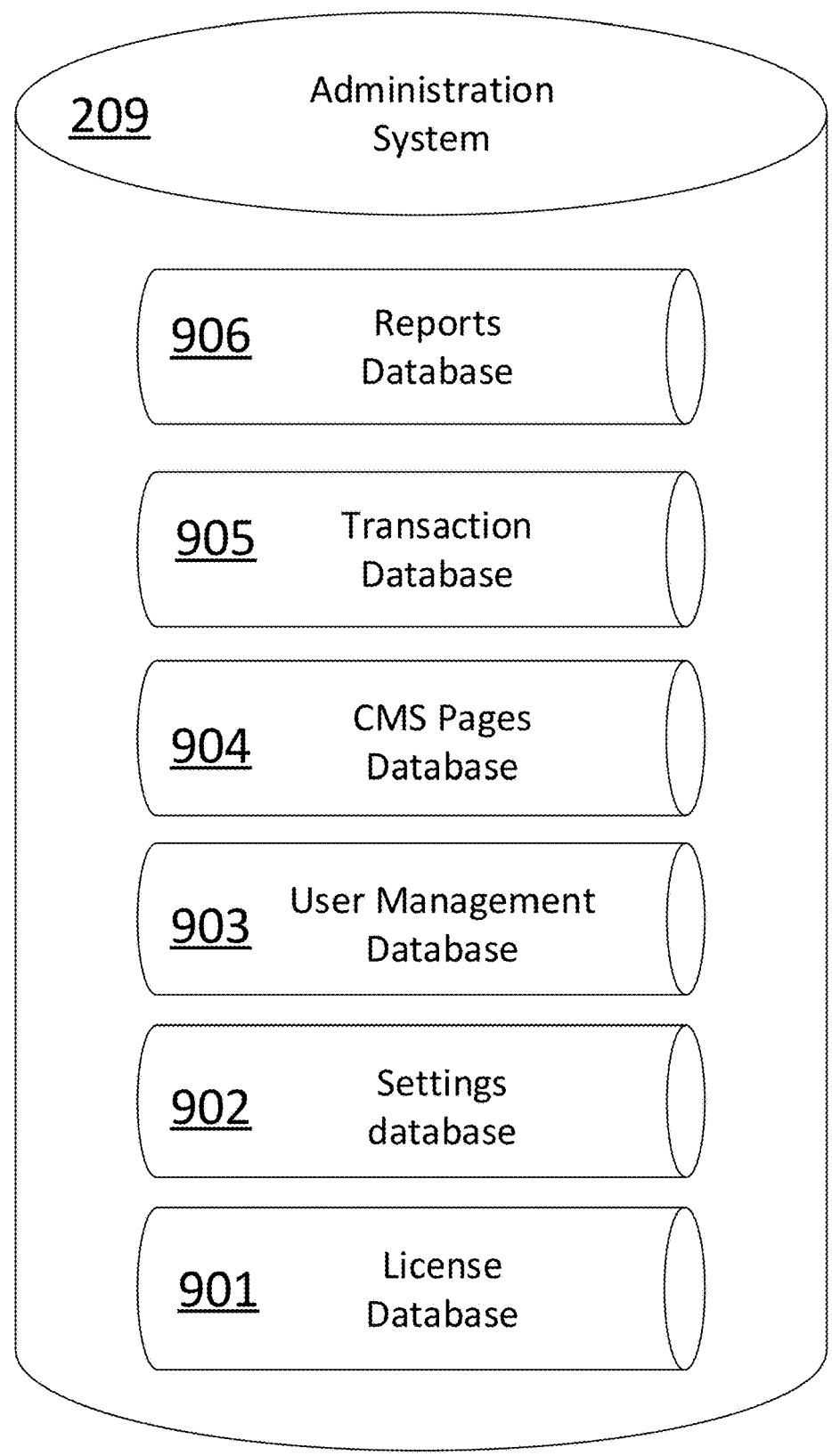
FIG. 9 illustrates a first embodiment of the administration system of the present invention.

FIG. 9 illustrates the key components of the Administration System which is operatively coupled to the Central Control System. The Administration System used by the present invention is comprised of a plurality of modules including a license database 901, a settings database 902, a user management database 903, a CMS pages database 904, a transactions database 905, and a reports database 906.

The license database 901 stores information about which users are authorized to use the present invention. The license database contains a plurality of fields including a unique reference key for each record in the license database, the unique reference key of each user, and licensing and payment information for each user.

The settings database 902 stores configuration information for the present invention.

The user management database 903 stores information about users. This information includes the type of user, contact information, and the user's status such as active or inactive.

The CMS pages database 904 stores information about the web site pages and mobile user interface for the present invention. This module enables the system administrator to edit the content on these pages. Example pages include "About Us", "Frequently Asked Questions", "Home", "privacy policy" and the "User Agreement".

The transactions database 905 stores information about system transactions in the present invention.

The reports database 906 stores information about reports in the present invention. These reports help the system administrator manage the present invention. Example reports include the amount of the available storage used, peak and average CPU utilization in system servers, and peak and average number of users.

Preferred Embodiment of the Present Invention

Figure 10:
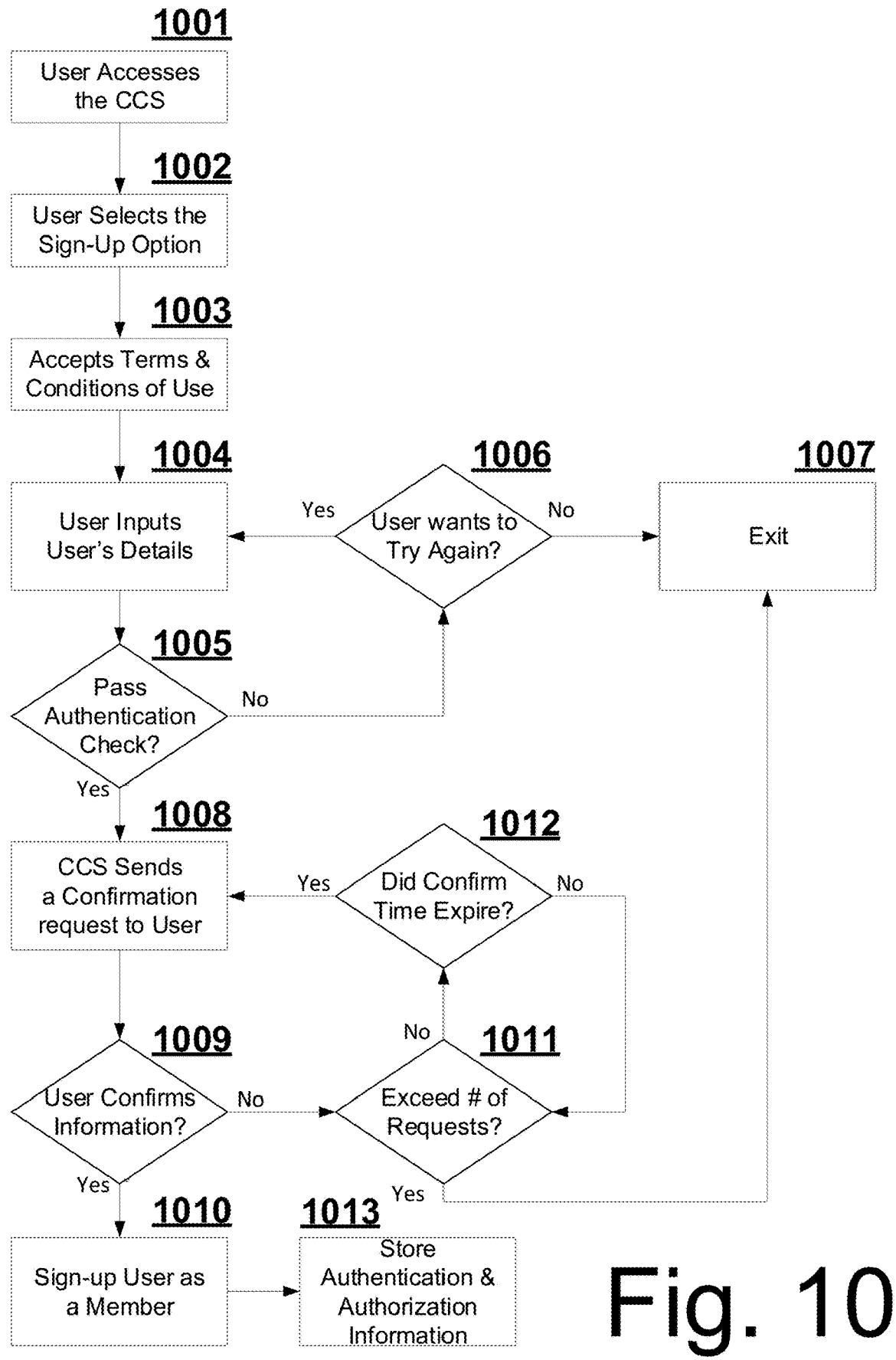
FIG. 10 illustrates a first embodiment of the sign-up procedure for the present invention.

FIG. 10 illustrates the procedure for users to sign-up in a first embodiment of the apparatus and method of the present invention.

The user accesses the CCS 1001 then selects the sign-up option 1002. The user then accepts the predetermined terms and conditions of use 1003. The user then inputs the requested user details 1004. These details include name, contact information, user name, password and the other meta data specified above for the user database illustrated in FIG. 6. When the user accesses the CCS after signing up, that user will have to input the user name and password to log into the CCS. The user can also select at least one of a plurality of multi factor authentication options, such as a biometric signature, an email confirmation or a text message to supplement, or replace, the standard login credentials. The CCS authenticates the information entered by the user at step 1004 for completeness. If the information is incomplete 1005, the CCS will offer the user the opportunity to complete the information 1006. If the user chooses to try again to complete the information, the CCS returns to step 1004. If the user chooses not to complete the sign-up information, the CCS exits the sign-up procedure 1007.

If the information entered by the user is complete 1005, the CCS sends a confirmation request to the user 1008. The CCS will send this confirmation request to the email address, or other validation option, entered by the user at step 1004. For example, the user can also select to authenticate using a text message rather than an email. The CCS asks the user to confirm receipt of this request 1009. If the user confirms receipt of the confirmation request as requested by the CCS, the CCS will sign-up the user as a member 1010. If the user does not confirm receipt of the confirmation request, the CCS will determine whether the predetermined maximum number of reminder requests have been exceeded 1011. If the CCS has already sent the predetermined maximum number of confirmation requests, then the CCS will exit the sign-up procedure 1007. If the CCS has sent fewer than the predetermined maximum number of confirmation requests, then the CCS will determine whether the predetermined wait time has been exceeded 1012 before sending another confirmation request to the user. After the predetermined wait time between reminders has been exceeded 1012, the CCS will send another confirmation request to the user 1008. This will return the CCS to step 1008 in the sign-up procedure. After a user signs up, that user is given the option to store their authentication information and authorization information in the decentralized distributed encrypted database 1013 described below.

Figure 11:
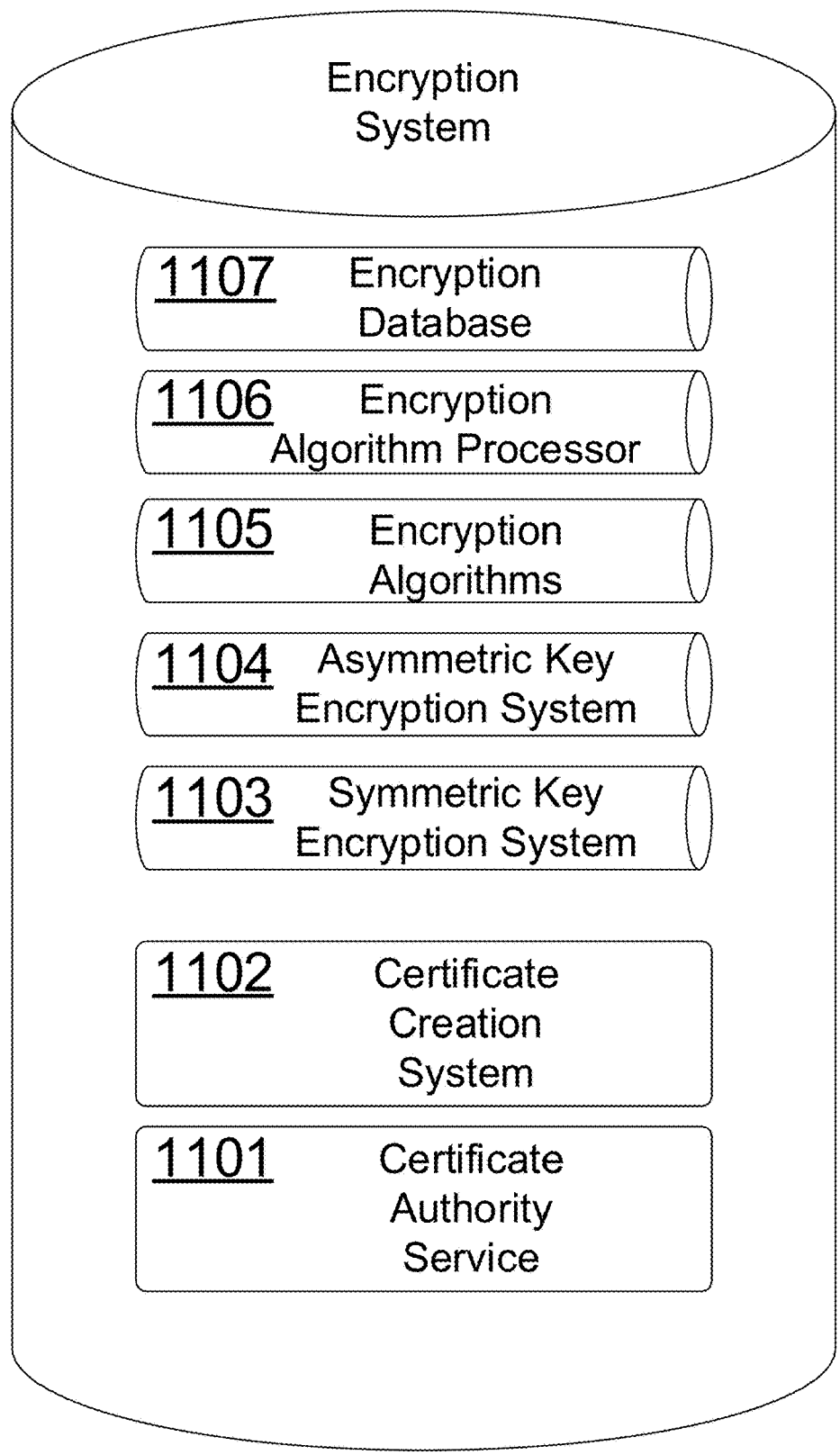
FIG. 11 illustrates a first embodiment of the encryption system of the present invention.

FIG. 11 illustrates the key components of the Encryption System which is operatively coupled to the Central Control System. The Encryption System used by the present invention is comprised of a plurality of modules including a certificate authority service 1101, a certificate creation system 1102, a symmetric encryption key encryption system 1103, an asymmetric key encryption system 1104, encryption algorithms 1105, an encryption algorithm processor 1106, and an encryption database 1107.

The certificate authority service 1101 is independent of the two users who want to communicate. However, it is a source that is trusted by both users and confirms that they both are who they say they are. In addition, the certificate authority service provides the public encryption keys to each user. In summary, the certificate authority service authenticates the users and the fact that the authorization has not been altered.

Authentication is used with encryption to create a secure communication environment. Standard authentication systems include user name and password, pass cards that use a magnetic strip similar to that on a credit card, smart cards that have an embedded chip, and digital signatures based on the Digital Signature Standard (DSS) that uses the Digital Signature Algorithm (DSA). More modern forms of encryption use biometrics for authentication. Biometrics use biological information to verify a user's identity. Biometric authentication methods include finger print scans (capacitive and ultrasonic), palm veins, palm print, hand geometry, iris scan, retina scans, facial recognition, and voice recognition. Biometric authentication eliminates many of the risks associated with not knowing who is using an authenticated input or output device. Biometric authentication therefore provides an additional level of security over device level authentication for secure personal communications.

The certificate creation system 1102 generates a certificate for each user in the form of a piece of code, or a large number, that says that the user is trusted by the certificate authority. For example, when a first user sends a secure message to a second user that first user also sends his public encryption key and certificate to the second user. This allows the second user to validate three things: 1) that the certificate comes from a trusted party; 2) that the certificate is currently valid; and 3) that the certificate has a relationship with the present invention.

The symmetric key encryption system 1103 generates a secret code for each user. The encryption system uses this secret code, or encryption key, to encrypt information. Modern encryption systems use the advanced encryption standard (AES), which uses 128-, 192- or 256-bit encryption keys. These create more than $2^{128}$ possible key combinations for the encryption key. For a hacker trying to guess the encryption key, this is like trying to find one specific grain of sand in the Sahara Desert. It would take a hacker so long to guess the correct key combination that this encryption standard is considered to be secure for the foreseeable future. For symmetric key encryption, the same key is used to encrypt and decrypt a message. The use of symmetric encryption keys and asymmetric encryption keys in the present invention is described below.

The asymmetric key encryption system 1104 generates two secret codes for each user, a public encryption key and a private encryption key. When a first user wants to send an encrypted message to a second user but does not want to risk sending the encryption key then they use the asymmetric key encryption system. The use of symmetric encryption keys and asymmetric encryption keys in the present invention is described below. For example, in the present invention, when a first user wants to send a symmetric encryption key to a second user, that first user uses the public encryption key of the selected second user to encrypt the symmetric encryption key. The second user then uses his or her private encryption key to decrypt the symmetric encryption key. This is possible because an encryption algorithm is used where the algorithm, or function "F" is such that, F(clear symmetric encryption key, first user's public encryption key)=encrypted symmetric encryption key and F(encrypted symmetric encryption key, first user's private encryption key)=clear symmetric encryption key. Therefore, by using the same algorithm ("F") a user's private encryption key can be used to decrypt the symmetric encryption key that was encrypted by the same user's public encryption key (U.S. Pat. No. 8,374,354 B2). One advantage of the present invention is that the encryption and decryption are performed at the user interface preferably initiated by biometrics. For confidential information, the present invention only has access to the encrypted version of the symmetric encryption key and cannot decrypt the symmetric encryption key. The symmetric encryption key is used to encrypt and decrypt the information. In other systems, encryption is used to secure the transmission of digital media from the user to the system. This enables confidential information to be decrypted by the system operator which creates the risk of hacking supported by corrupt employees of the system operator.

The present invention uses a specific encryption algorithm however, a number of different encryption algorithms 1105 have been created that can be used by the present invention. Symmetric key encryption algorithms include The Data Encryption Standard (DES) was adopted as a U.S. government standard in 1977 and as an ANSI standard in 1981. Triple-DES is a way to make the DES dramatically more secure by using the DES encryption algorithm three times with three different keys, for a total key length of 168 bits. Also called "3DES," this algorithm has been widely used by financial institutions and by the Secure Shell program (ssh). Blowfish is a fast, compact, and simple block encryption algorithm invented by Bruce Schneier. The algorithm allows a variable-length key, up to 448 bits, and is optimized for execution on 32- or 64-bit processors. The algorithm is unpatented and has been placed in the public domain. Blowfish is used in the Secure Shell and other programs. Asymmetric key encryption algorithms include the Rivest Shamir Adleman (RSA) public encryption key algorithm that can be used for encrypting and signing data and Elliptic Curve Cryptography (ECC) which provides similar functionality to RSA for smaller devices like cell phones. It requires less computing power than RSA. ECC encryption systems are based on the idea of using points on a curve to define the public/private encryption key pair. The present invention can use these and other standard encryption algorithms.

The encryption algorithm processor 1106 is the code that is used to encrypt and decrypt information. The present invention includes its own code for these purposes and also can use other code considered to comply with industry standards. By way of example, sample code that was published by syntx.io (http://syntx.io/basic-symmetric-encryption-example-with-java/) includes the following to encrypt a message using AES as the algorithm:

```
public static final String encrypt(final String message,
    final Key key, final IvParameterSpec iv) throws Ille-
    galBlockSizeException,
  BadPaddingException, No SuchAlgorithmException,
  NoSuchPaddingException, InvalidKeyException,
  UnsupportedEncodingException, InvalidAlgorithmPa-
    rameterException {
    Cipher     cipher=Cipher.getInstance("AES/CBC/
      PKCS5Padding");
    cipher.init(Cipher.ENCRYPT_MODE,key,iv);
    byte[ ] stringBytes=message.getBytes( )
    byte[ ] raw=cipher.doFinal(stringBytes);
    return Base64.encodeBase64String(raw);
}
```

The same example from syntx.io published the following code to decrypt the message:

```
public static final String decrypt(final String encrypted,
    final Key key, final IvParameterSpec iv) throws
    InvalidKeyException,
  NoSuchAlgorithmException, NoSuchPaddingException,
  IllegalBlockSizeException,     BadPaddingException,
    IOException, InvalidAlgorithmParameterException {
    Cipher     cipher=Cipher.getInstance("AES/CBC/
      PKCS5Padding");
    cipher.init(Cipher.DECRYPT_MODE, key,iv);
    byte[ ] raw=Base64.decodeBase64(encrypted);
    byte[ ] stringBytes=cipher.doFinal(raw);
    String clearText=new String(stringBytes, "UTF8");
    return clearText;
}
```

It will be evident to one skilled in the art that more robust algorithms are available for use, can be developed, and can be used by the present invention.

The encryption database 1107 is substantially the same as the encryption database in FIG. 6. It stores the encryption information required by the other modules described above that comprise the encryption system.

Figure 12:
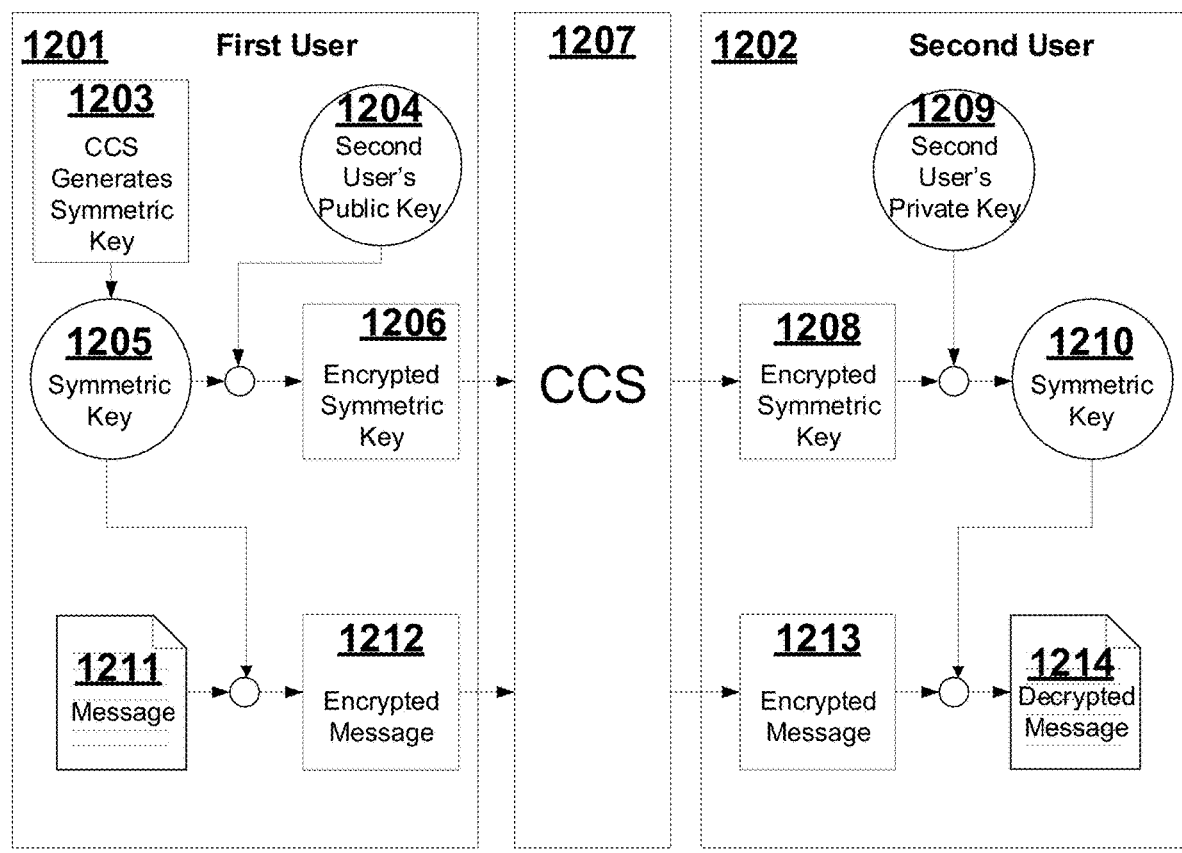
FIG. 12 illustrates a first embodiment of the high level encryption approach for the present invention.

FIG. 12 illustrates the preferred procedure to send a message from a first user 1201 to a second user 1202 through the CCS. When the first user and second user register on the system they download the CCS front end application onto their computer 301. The CCS application is created using standard programming languages such as java, javascript, PHP, HTML, C, C+, and visual basic. The CCS also gives the first user and second user their own symmetric encryption key, private encryption key and public encryption key as described above for the encryption system. The first user and the second user both use the CCS to make their public encryption keys available to other users. When the first user wants to send a message to the second user, the CCS application in the first user's computer 301 generates a new symmetric encryption key 1203 for this transaction. The CCS then uses the second user's public encryption key 1204 to encrypt the symmetric encryption key 1205 and create an encrypted symmetric encryption key 1206. The CCS 1207 then transfers the encrypted symmetric encryption key from the first user to the second user. The CCS front end application on the second user's computer receives the encrypted symmetric encryption key 1208 then uses the second user's private encryption key 1209 to decrypt the encrypted symmetric encryption key and recover the symmetric encryption key 1210 that was generated by the CCS application on the first user's computer for this transaction.

The CCS application on the first user's computer also uses the same symmetric encryption key 1205 to encrypt the target message 1211 and form an encrypted message 1212. The CCS 1207 then transfers the encrypted message from the first user to the second user. The CCS's front end application on the second user's computer receives the encrypted message 1213 then uses the second user's symmetric encryption key 1210 to decrypt the encrypted message and recover the original message 1214 that was sent by the CCS application on the first user's computer. The symmetric encryption key and message cannot be accessed by employees or partners of the CCS platform which minimizes the risk of unauthorized decryption.

Asymmetric encryption is slower than symmetric encryption. The CCS application therefore uses the public encryption key and private encryption key to encrypt and decrypt the symmetric encryption key because the symmetric encryption key is typically much smaller than the user's message. This is a secure method for the CCS to transfer the symmetric encryption key from the first user to the second user. This solution also enables the CCS application to use the faster symmetric key encryption method to encrypt and decrypt the target message that is typically much larger than the symmetric encryption key.

Figure 13:
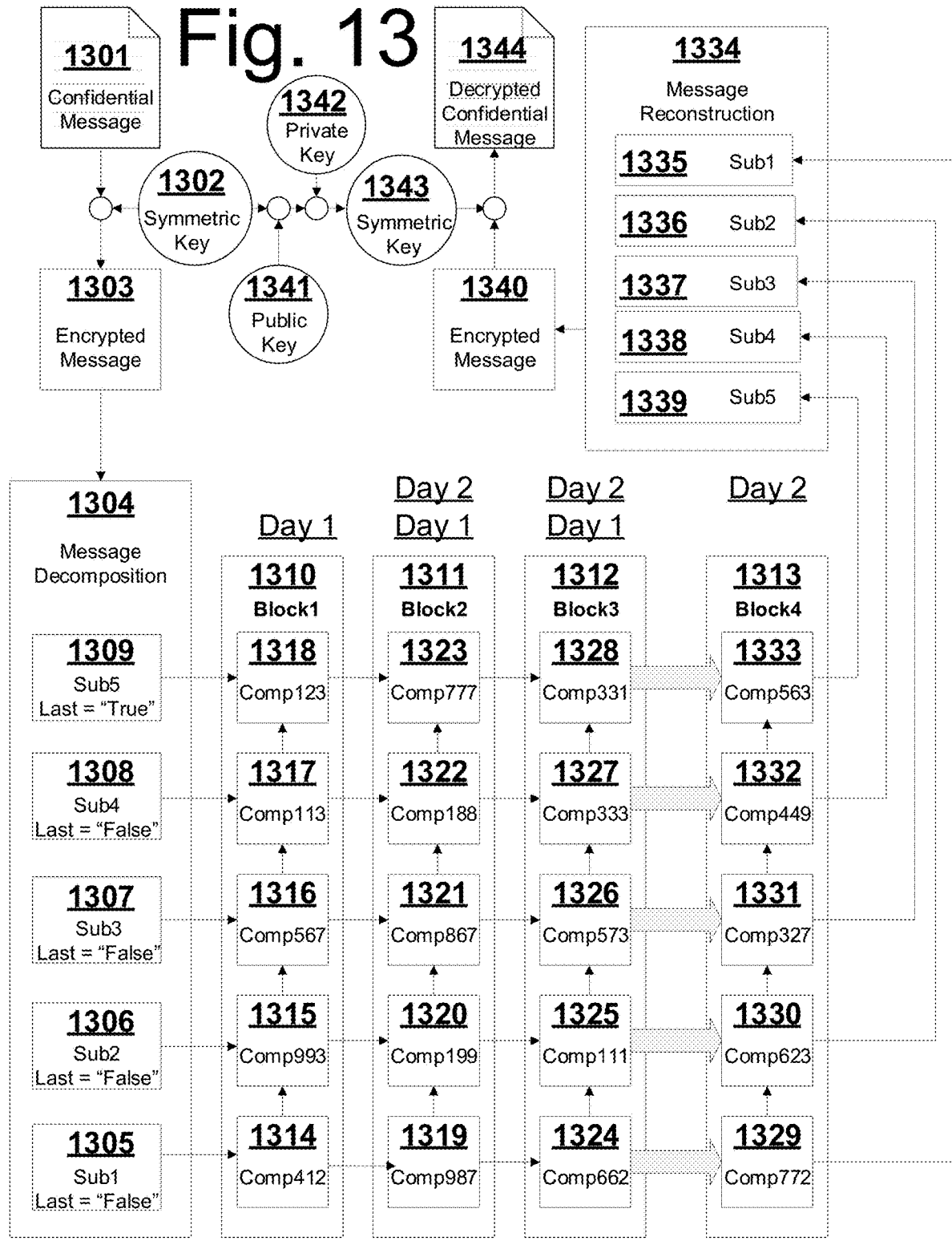
FIG. 13 illustrates a first embodiment of the high level authentication approach for the present invention.

FIG. 13 illustrates the preferred procedure for the present invention to receive a secure authorization in the form of a confidential message 1301 and output a confidential message 1344, wherein said confidential message has one of a plurality of forms including user authorization and authentication credentials such as a user name, password and multifactor authentication information. Said confidential message can also include a crypto currency blockchain address, a payment authorization, a private encryption key, an authentication certificate for digital media and a reference file for biometric authentication. This preferred procedure enables the confidential message to be received from a first user and output to that same first user or received by a first user and output to a second user. The CCS application on a first user's computer generates a unique symmetric encryption key 1302 to encrypt each confidential message 1303. The CCS front end application on the user's device generates a different symmetric encryption key for each message. The CCS application on the first user's computer then decomposes the confidential message into a number of subcomponents 1304. A number of tools are available to split a file into subcomponents, such as WinRar and HJSplit. For example, WinRar allows the user to specify the size of each subcomponent. The example in FIG. 13, decomposes the message 1304 into 5 subcomponents Sub1 1305, Sub2 1306, Sub3 1307, Sub4 1308, and Sub5 1309 in that order. It also sets the "last subcomponent flag" to "False" for Sub1 1305, Sub2 1306, Sub3 1307, and Sub4 1308 but sets the "last subcomponent flag" to "True" for Sub5 1309 because Sub5 1309 is the last subcomponent of message 1304. It also sets the counter=1 for Sub1 1305, counter=2 for Sub2 1306, counter=3 for Sub3 1307, counter=4 for Sub4 1308 and counter=5 for Sub5 1309. The CCS application on the first user's computer randomly selects three computers, Comp412 1314, Comp987 1319, and Comp682 1324, from a predetermined list of independent member computers. Each organization that wants to use this dynamic process to decompose encrypted messages can propose a computer to participate in the consortium of independent member computers. After the system administrator vets the organization and vets the proposed computer, for performance, security and other features, then the vetted computer is added to the network of independent member computers. The CCS application on the first user's computer, writes the first subcomponent 1305 of the decomposed encrypted confidential message and the counter value (e.g., 1) and the "last subcomponent flag" (e.g., "False") from subcomponent1 (Sub1) to computer 412 (Comp412) 1314. It also writes the same subcomponent1 (Sub1), counter value and "last subcomponent flag" to computer 987 (Comp987) 1319 and the same subcomponent1 (Sub1), counter value and "last subcomponent flag" to computer 662 (Comp662) 1324.

Computer 412 (Comp412) 1314 then randomly selects another computer from the predetermined list of member computers, namely computer 993 (Comp993) 1315 and remembers that next computer in sequence (Comp993). Computer 412 (Comp412) 1314 then instructs the CCS application on the first user's computer to copy subcomponent2 (Sub2), the counter value (e.g., 2) and the "last subcomponent flag" (e.g., "False") 1306 to computer 993 (Comp993) 1315. When Computer 412 (Comp412) 1314 makes this request, it increments its own counter by 1 (e.g., 1+1=2) to know which subcomponent (e.g., Sub2) to request from block 1304 to be sent to computer 993 (Comp993) 1315. Similarly, Computer 987 (Comp987) 1319 randomly selects another computer from the predetermined list of member computers, namely computer 199 (Comp199) 1320 and remembers that next computer in sequence (Comp199). Computer 987 (Comp987) 1319 then instructs the CCS application on the first user's computer to copy subcomponent2 (Sub2), the counter value (e.g., 2) and the "last subcomponent flag" (e.g., "False") 1306 to computer 199 (Comp199) 1320. Further, Computer 662 (Comp662) 1324 randomly selects another computer from the predetermined list of independent member computers, namely computer 111 (Comp111) 1325 and remembers that next computer in sequence. Computer 662 (Comp662) 1324 then instructs the CCS application on the first user's computer to copy subcomponent2 (Sub2), the counter value (e.g., 2) and the "last subcomponent flag" (e.g., "False") 1306 to computer 111 (Comp111) 1325. Computers 987 (Comp987) 1319 and 662 (Comp662) 1324 both increment their own counter+1 (e.g., 1+1=2) to determine which subcomponent (e.g., Sub2) to request from block 1304.

Computer 993 (Comp993) 1315 then randomly selects another computer from the predetermined list of independent member computers, namely computer 567 (Comp567) 1316 and remembers that next computer in sequence (Comp567). Computer 993 (Comp993) 1315 then instructs the CCS application on the first user's computer to copy subcomponent3 (Sub3), the counter value (e.g., 3) and the "last subcomponent flag" (e.g., "False") 1307 to computer 567 (Comp567) 1316. When Computer 993 (Comp993) 1315 makes this request, it uses its own counter+1 (e.g., 2+1=3) to determine which subcomponent (e.g., Sub3) to request from block 1304 to be sent to computer (Comp567) 1316. Similarly, Computer 199 (Comp199) 1320 randomly selects another computer from the predetermined list of independent member computers, namely computer 867 (Comp867) 1321 and remembers that next computer in sequence (Comp867). Computer 199 (Comp199) 1320 then instructs the CCS application on the first user's computer to copy subcomponent3 (Sub3), the counter value (e.g., 3) and the "last subcomponent flag" (e.g., "False") 1307 to computer 867 (Comp867) 1321. Further, Computer 111 (Comp111) 1325 randomly selects another computer from the predetermined list of independent member computers, namely computer 573 (Comp573) 1326 and remembers that next computer in sequence (Comp573). Computer 111 (Comp111) 1325 then instructs the CCS application on the first user's computer to copy subcomponent3 (Sub3), the counter value (e.g., 3) and the "last subcomponent flag" (e.g., "False") 1307 to computer 573 (Comp573) 1326. Computers 199 (Comp199) 1320 and 111 (Comp111) 1325 both increment their own counter+1 (e.g., 2+1=3) to determine which subcomponent (e.g., Sub3) to request from block 1304.

Computer 567 (Comp567) 1316 then randomly selects another computer from the predetermined list of independent member computers, namely computer 113 (Comp113) 1317 and remembers that next computer in sequence (Comp113). Computer 567 (Comp567) 1316 then instructs the CCS application on the first user's computer to copy subcomponent4 (Sub4), the counter value (e.g., 4) and the "last subcomponent flag" (e.g., "False") 1308 to computer 113 (Comp113) 1317. When Computer 567 (Comp567) 1316 makes this request, it uses its own counter+1 (e.g., 3+1=4) to determine which subcomponent (e.g., Sub4) to request from block 1304 to be sent to computer (Comp113) 1317. Similarly, Computer 867 (Comp867) 1321 randomly selects another computer from the predetermined list of independent member computers, namely computer 188 (Comp188) 1322 and remembers that next computer in sequence (Comp188). Computer 867 (Comp867) 1321 then instructs the CCS application on the first user's computer to copy subcomponent4 (Sub4), the counter value (e.g., 4) and the "last subcomponent flag" (e.g., "False") 1308 to computer 188 (Comp188) 1322. Further, Computer 573 (Comp573) 1326 randomly selects another computer from the predetermined list of independent member computers, namely computer 333 (Comp333) 1327 and remembers that next computer in sequence (Comp333). Computer 573 (Comp573) 1326 then instructs the CCS application on the first user's computer to copy subcomponent4 (Sub4), the counter value (e.g., 4) and the "last subcomponent flag" (e.g., "False") 1308 to computer 333 (Comp333) 1327. Computers 867 (Comp867) 1321 and 573 (Comp573) 1326 both increment their own counter+1 (e.g., 3+1=4) to determine which subcomponent (e.g., Sub4) to request from block 1304.

Computer 113 (Comp113) 1317 then randomly selects another computer from the predetermined list of independent member computers, namely computer 123 (Comp123) 1318 and remembers that next computer in sequence. Computer 113 (Comp113) 1317 then instructs the CCS application on the first user's computer to copy subcomponent5 (Sub5), the counter value (e.g., 5) and the "last subcomponent flag" (e.g., "True") 1309 to computer 123 (Comp123) 1318. When Computer 113 (Comp113) 1317 makes this request, it uses its own counter+1 (e.g., 4+1=5) to determine which subcomponent (e.g., Sub5) to request from block 1304 to be sent to computer 123 (Comp123) 1318. Similarly, Computer 188 (Comp188) 1322 randomly selects another computer from the predetermined list of independent member computers, namely computer 777 (Comp777) 1323 and remembers that next computer in sequence (Comp777). Computer 188 (Comp188) 1322 then instructs the CCS application on the first user's computer to copy subcomponent5 (Sub5), the counter value (e.g., 5) and the "last subcomponent flag" (e.g., "True") 1309 to computer 777 (Comp777) 1323. Further, Computer 333 (Comp333) 1327 randomly selects another computer from the predetermined list of independent member computers, namely computer 331 (Comp331) 1328 and remembers that next computer in sequence. Computer 333 (Comp333) 1327 then instructs the CCS application on the first user's computer to copy subcomponent5 (Sub5), the counter value (e.g., 5) and the "last subcomponent flag" (e.g., "True") 1309 to computer 331 (Comp331) 1328. Computers 188 (Comp188) 1322 and 333 (Comp333) 1327 both increment their own counter+1 (e.g., 4+1=5) to determine which subcomponent (e.g., Sub5) to request from block 1304.

Block1 1310 is a copy of the encrypted confidential message distributed across five random independent computers. Block2 1311 is a second copy of the encrypted confidential message distributed across five different random independent computers. Block3 1312 is a third copy of the encrypted confidential message distributed across five more random independent computers. None of the computers in each block know all of the other computers in the block. For example, Comp993 1315 only knows that Comp567 1316 is the next computer in the chain after itself for Block1. It does not know that Comp113 1317 is the next computer after Comp567 1316. This makes the solution more secure because a hacker would have to break into many independent computers to recover the encrypted information then that hacker would need to figure out how to reconstruct the confidential message and also figure out how to decrypt the information. This additional security is appropriate for the storage of referenceable personal identifiable information such as customer biometrics and crypto currency addresses. After a pre-determined period of time, one day say, the CCS application on the first user's computer randomly selects another computer 1329 from a predetermined list of independent member computers. The CCS application on the first user's computer, writes the first subcomponent of the decomposed encrypted confidential message from subcomponent1 (Sub1), the counter value (e.g., 1) and the "last subcomponent flag" (e.g., "False") 1305 to computer 772 1329. Similar to above, computer 772 (Comp772) 1329 randomly selects another computer from the predetermined list of member computers, namely computer (Comp623) 1330, and remembers that next computer in sequence (Comp623), then instructs the CCS application on the first user's computer to copy subcomponent2 (Sub2), the counter value (e.g., 2) and the "last subcomponent flag" (e.g., "False") 1306 to computer 623 (Comp623) 1330. Similar to above, computer 623 (Comp623) 1330 randomly selects another computer from the predetermined list of independent member computers, namely computer 327 (Comp327) 1331, and remembers that next computer in sequence (Comp327), then instructs the CCS application on the first user's computer to copy subcomponent3 (Sub3), the counter value (e.g., 3) and the "last subcomponent flag" (e.g., "False") 1307 to computer 327 (Comp327) 1331. Similar to above, computer 327 (Comp327) 1331 randomly selects another computer from the predetermined list of independent member computers, namely computer 449 (Comp449) 1332, and remembers that next computer in sequence (Comp449), then instructs the CCS application on the first user's computer to copy subcomponent4 (Sub4), the counter value (e.g., 4) and the "last subcomponent flag" (e.g., "False") 1308 to computer 449 (Comp449) 1332. Similar to above, computer 449 (Comp449) 1332 randomly selects another computer from the predetermined list of independent member computers, namely computer 563 (Comp563) 1333, and remembers that next computer in sequence (Comp563), then instructs the CCS application on the first user's computer to copy subcomponent5 (Sub5), the counter value (e.g., 5) and the "last subcomponent flag" (e.g., "True") 1309 to computer 563 (Comp563) 1333. This flag indicates that subcomponent5 is the final subcomponent that comprises the confidential message 1301.

Block4 1313 is a fourth copy of the encrypted confidential message distributed across five random computers. The CCS instructs the CCS application on the first user's computer to delete Block 0 and Block 1 1310 by discarding subcomponent1 (Sub1) from computer 412 (Comp412) 1314. Computer 412 (Comp412) 1314 then instructs Computer 993 (Comp993) 1315 to discard subcomponent2 (Sub2) from computer 993 (Comp993) 1315. Computer 993 (Comp993) 1315 then instructs Computer 567 (Comp567) 1316 to discard subcomponent3 (Sub3) from computer 567 (Comp567) 1316. Computer 567 (Comp567) 1316 then instructs Computer 113 (Comp113) 1317 to discard subcomponent4 (Sub4) from computer 113 (Comp113) 1317. Computer 113 (Comp113) 1317 then instructs Computer 123 (Comp123) 1318 to discard subcomponent5 (Sub5) from computer 123 (Comp123) 1318. In the example illustrated in FIG. 13, on Day 1 Block0, Block1, Block2 and Block3 form the original decomposed message and three copies of the decomposed message. On Day 2, Block4 is created and Block1 is deleted. In the first iteration of block creation and deletion, Block0 is also deleted. This process of creating a new block and deleting an old block continues until the user no longer needs access to the confidential message and deletes that confidential message from the decentralized distributed database. This causes the three copies of the decomposed message to keep moving dynamically throughout the network of member computers making the confidential information more difficult for a hacker to locate.

In order for the CCS application on the second user's computer (such as a pharmacist reviewing a prescription, an intellectual property user reviewing an authentication certificate, a user authenticating a biometric parameter or a user accessing the blockchain address for their digital currency) to reconstruct the confidential message, the CCS application on the first user's computer (such as the prescribing doctor or intellectual property owner of payment sender for a digital currency) sends a unique authorization identifier ("authorization ID") to the second user (pharmacist or intellectual property user or payment receiver). Alternatively, the first user (e.g., the doctor or intellectual property owner or payment sender) can give the authorization identifier to the patient or intellectual property reseller or payment receiver who can forward it to the pharmacist or intellectual property user or keep it for themselves. The pharmacist or intellectual property user or payment receiver uses the unique authorization identifier to request the authorization (e.g., request the prescription or authentication certificate or blockchain address). For additional security, the present invention can use the recipient's public encryption key to encrypt the authorization identifier. The present invention will then enable the recipient to use their private encryption key to decrypt the authorization identifier which the present invention uses to locate the correct confidential message in the decentralized distributed database. The present invention enables a user to associate multiple confidential messages with a single authorization identifier or biometric signature. The present invention achieves this by enabling a user to associate meta data with each authorization identifier. For example, a user may use a single biometric signature to access 3 different web sites. In this case, the present invention allows the user to add the URL of each website, or some other meta data, with each authorization identifier.

The present invention enables the user who stores the confidential message (e.g., storer user) and the user who retrieves the confidential message (e.g., retriever user) to be the same person for applications, such as warm storage for a crypto currency blockchain address or for password access to a system. The CCS verifies the unique authorization identifier, which can be a biometric signature if user 1 and user 2 are the same person, then copies subcomponent1 (Sub1) from computer 772 (Comp772) 1329 to the second user's computer 1335. Similarly, computer 772 (Comp772) 1329 knows that computer 623 (Comp623) 1330 is the next computer in Block4 and instructs computer 623 (Comp623) 1330 to write subcomponent2 (Sub2) to the second user's computer 1336. Similarly, computer 623 (Comp623) 1330 knows that computer 327 (Comp327) 1331 is the next computer in Block4 and instructs computer 327 (Comp327) 1331 to write subcomponent3 (Sub3) to the second user's computer 1337. Similarly, computer 327 (Comp327) 1331 knows that computer 449 (Comp449) 1332 is the next computer in Block4 and instructs computer 449 (Comp449) 1332 to write subcomponent4 (Sub4) to the second user's computer 1338. Similarly, computer 449 (Comp449) 1332 knows that computer 563 (Comp563) 1333 is the next computer in Block4 and instructs computer 563 (Comp563) 1333 to write subcomponent5 (Sub5) to the second user's computer 1339. Computer 563 (Comp563) 1333 knows that it is the final computer in the chain because its "last subcomponent flag" is set to "True" indicating that subcomponent5 is the final subcomponent that comprises the confidential message 1301. The second user can alternatively reconstruct the message from the computers in Block3 or Block2 in addition to Block4. For more robust applications, the present invention can be configured to recover all three versions of the message and take a consensus of the three copies to minimize even further the possibility of data corruption impacting the results.

The CCS application on the second user's computer then uses the same decomposition application, such as WinRar or HJSplit, to reconstruct the encrypted confidential message 1340 from the linked subcomponents in block 1334. The CCS application on the first user's computer uses the second user's public encryption key 1341 to encrypt the symmetric encryption key 1302. The first user then uses the CCS to send the encrypted symmetric encryption key to the second user. The CCS application on the second user's computer then uses her private encryption key 1342 to decrypt the symmetric encryption key 1343. The CCS application on the second user's computer then uses the symmetric encryption key 1343 to decrypt the confidential message 1344.

The example in FIG. 13, illustrates three copies of the authorization message one in each of Block1 1310, Block2 1311 and Block3 1312. In the present invention, the number of replicated messages can be reduced to 1 or 2 or increased to more than 3 to provide more or less redundancy in order to match the specific needs of each business requirement. In addition, the encrypted message can be decomposed into fewer than 5 subcomponents or more than 5 subcomponents. Also, user 1 and user 2 can be the same user, such as in the case of warm storage of a crypto currency address. In this case, the user can use a biometric signature to initiate the encryption and decomposition process then use their biometric signature to initiate the reconstruction and decryption process. Steps 1341 and 1342 could be eliminated because the symmetric key in step 1302 could be seeded from user 1's biometric signature and the symmetric key in step 1343 could be seeded from user 2's biometric signature but user 1 and user 2 are the same person.

FIG. 13 illustrates the unique solution that secures confidential information by encrypting that information, decomposing it into subcomponents then distributing those subcomponents across a network of independent member computers. This works well when all of the member computers are mostly available for intercommunication. However, a second embodiment of the present invention, supports a situation where a computer may become isolated from the network of independent member computers. Each computer in the network of independent member computers can replicate the antihacking solution described in FIG. 13 within its own database. To achieve this, each computer's database is configured as a plurality of independent, logical partitions. U.S. Pat. No. 8,271,545B2 teaches a method to partition a database. Each partition in a database plays the role of an independent member computer, or more precisely a member computer's database, as illustrated in FIG. 13. Each database partition has its own independent access security and hardware level encryption just like the database for a separate independent computer. A hacker would have to hack into each individual database partition separately to reconstruct the message. This a substantial enhancement to data security over the prior art.

Similar to FIG. 13, the confidential message is encrypted using a symmetric key then decomposed into a block of linked subcomponents. That block of linked subcomponents is distributed randomly across a plurality of database partitions. In addition, the same block of linked subcomponents is replicated across a number of other random partitions, just like in FIG. 13. Periodically, a new block of linked subcomponents is created and the oldest block of linked subcomponents is deleted. This moves the confidential message dynamically throughout the database partitions. Similar to FIG. 13, the confidential message is recombined from is linked subcomponents then decrypted using the same symmetric key. Just like in FIG. 13, the storer user can use a biometric signature to submit the confidential message into the dynamic decentralized distributed decomposed encrypted database partitions and a retriever user can use a biometric signature to retrieve the confidential message from said dynamic decentralized distributed decomposed encrypted database partitions. The storer user can be the retriever user or they can be different people. This process makes a database that is isolated from the network much more difficult to hack. It also secures the database against physical theft of, or changes to, the confidential message. However, the present invention further enhances protection against physical hacking when compared with the prior art by decomposing the encrypted authorization message into sub components that are distributed randomly across a plurality of database partitions. This solution makes physical theft and direct recovery of a confidential message from the disk drive practically impossible. The administrator user can adjust the number of subcomponents that comprise each block, the number of replicated copies of each block, and the dynamic time to create a new block and delete the oldest block.

Computer level encryption and decomposition into linked subcomponents works in concert with partition level encryption and decomposition into linked subcomponents. In one embodiment of the present invention, a user can choose computer level enhanced security for a confidential message or partition level enhanced security depending on whether that user expects their computer to become disconnected from the network of member computers.

To further reduce the computer level risk associated with a computer becoming unavailable, the administrator user can configure the present invention to increase the number of replicated blocks. For example, if this variable is increased from 3 (in the example illustrated in FIG. 13) to 10 concurrent copies of the confidential message replicated across 10 blocks (instead of 3 blocks) then at least one computer in each of 10 blocks would have to be unavailable to prevent the storage or recovery of a confidential message. This is highly unlikely for a network of vetted high performance independent computers.

The present invention uses the authorization identifier as a file name. In the example illustrated in FIG. 13*b*, box 13*b*01, illustrates the encryption and decomposition of a secure authorization (e.g., confidential message), such as a password. In this example, the value of the password is "12345" 13*b*02. The present invention encrypts this password 13*b*03. For simplicity, let's assume the encrypted form is "ABCDE 13*b*04. The present invention decomposes 13*b*05 the encrypted secure authorization into five subcomponents. Again, for simplicity, let's assume these five subcomponents are "A". "B", "C", "D" and "E" 13*b*06. Box 13*b*07 illustrates that the present invention reconstructs or recombines 13*b*09 the decomposed subcomponents "A". "B", "C", "D" and "E" 13*b*08 into the encrypted version of the secure authorization "ABCDE 13*b*10. The present invention then decrypts 13*b*11 the secure authorization into its original form "12345" 13*b*12.

Figure 13B:
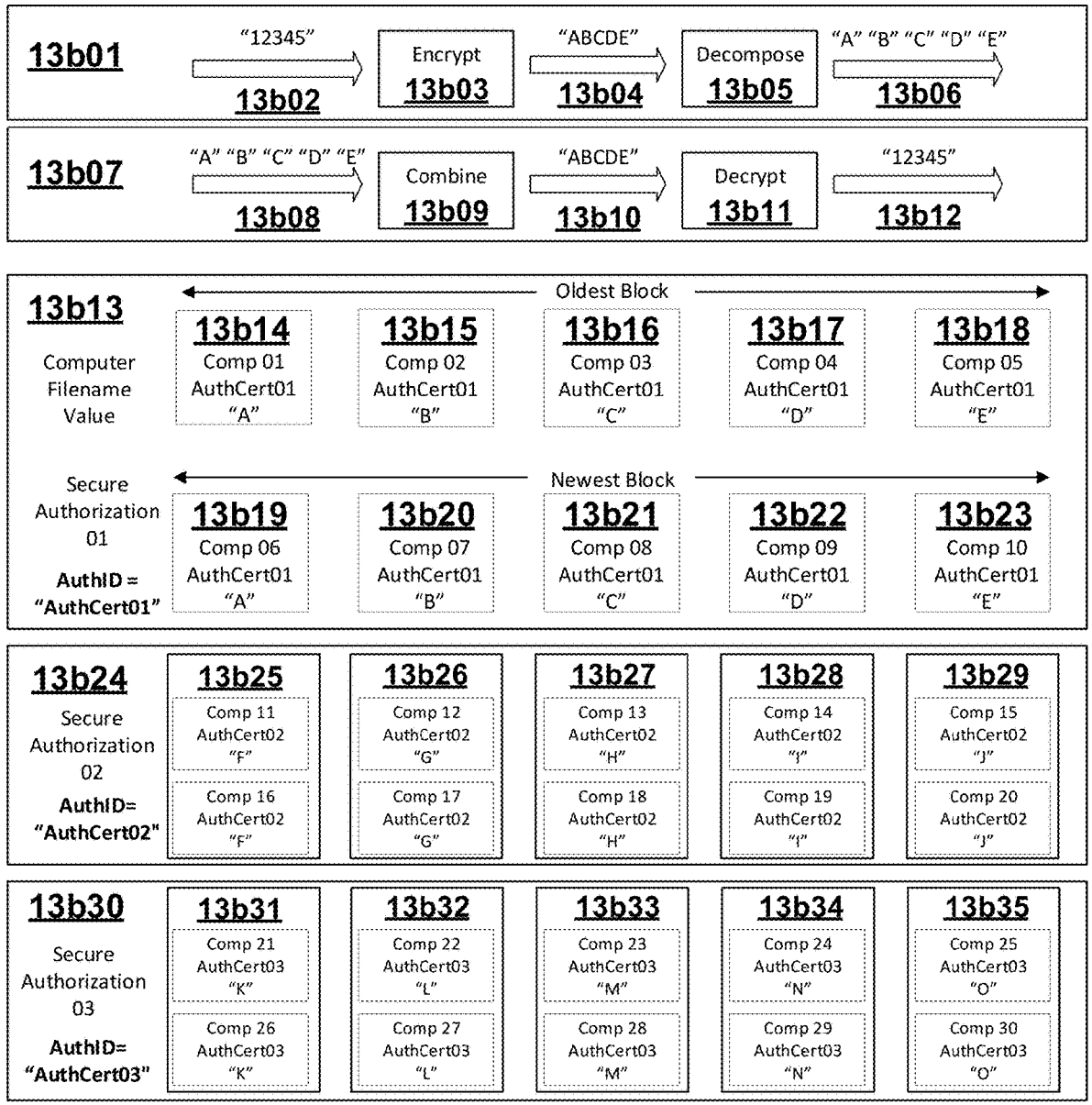
FIG. 13b illustrates the use of the authorization identifier as a file name for individual subcomponents.

Box 13*b*13 illustrates how the present invention uses the authorization identifier as a file name for each individual subcomponent and a distributed file name for the linked subcomponents that comprise an encrypted secure authorization. In this example, the value of the authorization identifier (e.g., "AuthID") is AuthCert01. Let's assume the first computer that is selected randomly by the present invention is computer 01 (e.g., "Comp 01"). In this example, the present invention uses the filename "AuthCert01" to write the first subcomponent "A" to computer 01 (e.g., "Comp 01") 13*b*14. The present invention then uses the same filename "AuthCert01" to write the second subcomponent "B" to computer 02 (e.g., "Comp 02") 13*b*15, wherein computer 02 (e.g., "Comp 02") is selected randomly by computer 01 (e.g., "Comp 01"). The present invention then uses the same filename "AuthCert01" to write the third subcomponent "C" to computer 03 (e.g., "Comp 03") 13*b*16, wherein Computer is selected randomly by Computer 02. The present invention then uses the same filename "AuthCert01" to write the fourth subcomponent "D" to computer 04 (e.g., "Comp 04") 13*b*17, wherein Computer 04 is selected randomly by Computer 03. The present invention then uses the same filename "AuthCert01" to write the fourth subcomponent "E" to computer 05 (e.g., "Comp 05") 13*b*18, wherein Computer 05 is selected randomly by Computer 04. The present invention sets the LastSubcomponent Flag to "True" for Computer 05 but sets the LastSubcomponent Flag to "False" for Computer 04, Computer 03, Computer 02 and Computer 01. All of the computers in FIG. 13*b* are selected randomly from the plurality of member computers.

Periodically, the present invention creates a new block of subcomponents then deletes the oldest block. In the example, in block 13*b*13 the present invention uses the filename AuthCert01 to write the first subcomponent "A" to computer 06 (e.g., "Comp 06") 13*b*19, to write the second subcomponent "B" to computer 07 (e.g., "Comp 07") 13*b*20, to write the third subcomponent "C" to computer 08 (e.g., "Comp 08") 13*b*21, to write the fourth subcomponent "D" to computer 09 (e.g., "Comp 09") 13*b*22, and to write the fifth subcomponent "E" to computer 10 (e.g., "Comp 10") 13*b*23.

The present invention enables the same user to store a second secure authorization (e.g., "Secure Authorization 02") as illustrated in box 13*b*24. In this example, the value of the authorization identifier is "AuthCert02". The present invention uses the filename "AuthCert02" to write the first subcomponent, of the second secure authorization, "F", to computer (e.g., "Comp 11"), then periodically to computer 16 (e.g., "Comp 16") 13*b*25. The present invention also uses the same filename "AuthCert02" to write the second subcomponent, of the second secure authorization, "G", to computer 12 (e.g., "Comp 12"), then periodically to computer 17 (e.g., "Comp 17") 13*b*26. The present invention also uses the same filename "AuthCert02" to write the third subcomponent, of the second secure authorization, "G", to computer 13 (e.g., "Comp 13"), then periodically to computer 18 (e.g., "Comp 18") 13*b*27. The present invention also uses the same filename "AuthCert02" to write the fourth subcomponent, of the second secure authorization, "H", to computer 14 (e.g., "Comp 14"), then periodically to computer 19 (e.g., "Comp 19") 13*b*28.

The present invention also uses the same filename "AuthCert02" to write the fifth subcomponent, of the second secure authorization, "I", to computer 15 (e.g., "Comp 15"), then periodically to computer 20 (e.g., "Comp 20") 13*b*29.

The present invention enables the same user to store a third secure authorization (e.g., "Secure Authorization 03") as illustrated in box 13*b*30. In this example, the value of the authorization identifier is "AuthCert03". The present invention uses the filename "AuthCert03" to write the first subcomponent, of the third secure authorization, "K", to computer 21 (e.g., "Comp 21"), then periodically to computer 26 (e.g., "Comp 26") 13*b*31. The present invention also uses the same filename "AuthCert03" to write the second subcomponent, of the third secure authorization, "L", to computer 22 (e.g., "Comp 22"), then periodically to computer 27 (e.g., "Comp 27") 13*b*32. The present invention also uses the same filename "AuthCert03" to write the third subcomponent, of the third secure authorization, "M", to computer 23 (e.g., "Comp 23"), then periodically to computer 28 (e.g., "Comp 28") 13*b*33. The present invention also uses the same filename "AuthCert03" to write the fourth subcomponent, of the third secure authorization, "N", to computer 24 (e.g., "Comp 24"), then periodically to computer 29 (e.g., "Comp 29") 13*b*34. The present invention also uses the same filename "AuthCert03" to write the fifth subcomponent, of the third secure authorization, "O", to computer 25 (e.g., "Comp 25"), then periodically to computer 30 (e.g., "Comp 30") 13*b*35.

The example in FIG. 13*b* illustrates that the present invention can store a plurality of secure authorizations for each user in an encrypted dynamic distributed decomposed database. The present invention uses the authorization identifier is a file name for each individual subcomponent, as a distributed file name for linked subcomponents and as a reference identifier for each record in the database of secure authorizations.

Each member computer includes an operating system. Standard operating systems like Windows, Linux and UNIX include a file system. A file system or filesystem, controls how data is stored and retrieved. U.S. Pat. No. 8,156,090 B1 Curles 4/10/2012 teaches "a computer system comprises an operating system that provides a file system for storage of objects . . . the compile manager automatically creates the repository within the file system with a unique file name based at least in part on an object name". See the Abstract. The file system provided by the operating system enables a user to use a file name to save and retrieve files from memory and storage devices. The present invention transforms a conventional file system, provided by a conventional operating system, into a distributed database that relocates confidential messages randomly and dynamically among a plurality of member computers to prevent robo hacking of critical information. The problem solved is computer vulnerability to hacking. The solution is therefore rooted in computer technology rather than being a computer implementation of human behavior. Robo hacking does not apply to human memory. In addition, this solution is a technological improvement over convention computer file systems that are vulnerable to robo hacking devices. It converts a standard static file system into a dynamic randomized distributed database that prevents hackers from locating confidential messages.

Each client organization can use their own naming convention for the authorization identifier. For example, a first organization may have a first user, named John Smith. John Smith can use a confidential message as a password to login to a system, such as a website or enterprise system. John Smith may have a unique ID such as an email address like John Smith_22@xyz.org. John Smith may have created a password to access the ABC document management system on Jun. 21, 2016 at 2:20 pm (14:20 PDT). In this example, a client can configure the present invention to create the following file name to store a password for John Smith that will enable access to the document management system Org0001 AuthID_Pword_JohnSmith_22_xyz.org_ABC_Doc_Man_2016_06_21_14_20_PDT_0001_sub0001. The present invention will store that file name in the authorization identifier. If the same user creates another password on the next day at 3:36 pm (6/22/2016 at 15:36 PDT) to access the same system then the authorization identifier will be Org0001_AuthID_Pword_JohnSmith_22_xyz.org_ABC_Doc_Man_2016_06_22_1 36_PDT_0002_sub0001. The date and time component of the file name has changed. The client can configure the present invention to construct the authorization identifier based on the system access specified by the user. In this case, "Org0001" indicates client organization and the "AuthID_Pword" indicates that this authorization identifier is a password. The next component of the authorization identifier "JohnSmith_22_xyz.org" indicates that this password is used by John Smith. The next component of the authorization identifier "ABC_Doc_Man" indicates that this is the user's password to access the ABC Document Management system. The next component of the authorization identifier indicates the date and time that John Smith created the password "2016_06_22_15_36_PDT". The next component of the authorization identifier "0002" indicates that this is the second password that has been setup for John Smith to access the ABC Document Management system. The last component of the filename shown above "sub0001" indicates the subcomponent of the decomposed confidential message. This last component is not included in the authorization identifier. This naming convention is exemplary. Each client can specify their own naming convention after the organization component (Org0001). One of ordinary skill in the art will recognize that the present invention can use the authorization identifier to support many other possible naming conventions. Moreover, the present invention can store the meta data, such as the date and time or user ID, in a lookup table rather than configuring it into the file name. Also, the present invention can use different meta data to construct the authorization identifier. For example, instead of including the user's name in the authorization identifier, a unique reference ID can be used for each user. In this case, if a user changes her name the reference ID will remain the same so the name change will not impact the authorization identifier.

For additional security, the present invention can be configured to recover the password, or other confidential message, from multiple blocks. For example, in FIG. 13, the present invention can recover the password from each of Block2, Block3 and Block4 then compare the outputs. They should all be the same "ABCDE". However, if the output from one block is corrupted then two out of three will be correct which would enable the system to overcome the corruption by using the predominant decrypted value for the password or by retrying until all decrypted values are the same. If a client wants to protect against permanent corruption then that client can configure the present invention to use the predominant value. If a client wants to protect against corruption caused by intermittent transmission errors then that client can configure the present invention to use the retry option.

The present invention also enables a first user to send a confidential message to a second user. For example, if the first user wants to send bitcoin to a second user, the first user can input the blockchain address for that bitcoin into the present invention's warm storage distributed database. The first user can send the authorization identifier to the second user securely. For example, the first user's computer can use the second user's public cryptographic encryption key to encrypt the authorization identifier then the second user's computer can use the second user's private cryptographic encryption key to decrypt the authorization identifier.

The present invention also enables a first user to present a confidential message to a second user. A third user can authenticate the confidential message then store the confidential message in the warm storage distributed database with an authenticated signature. A second user can then access the confidential message and validate that the confidential message has been authenticated by the third user. For example, the first user may have a birth certificate, or a University Degree, or a citizenship certification, or a social security number, or some other official document. A second user may be a potential employer, for example, who wants access to a validated version of the official document. The first user will take the official document to a third user who is a validation authority, such as a notary public. That third user will validate the official document then upload an electronic version as a confidential message to the warm storage distributed database. In this case, the present invention uses the third user's (e.g., notary public) private encryption key to encrypt the confidential message 1301. The first user (e.g., job candidate) will send the authorization identifier and the third user's (e.g., notary public) public encryption key to the second user (e.g., employer). The second user will use the authorization identifier to reconstruct then decrypt the university degree. In this embodiment, the present invention performs an additional function at step 1301 in FIG. 13 where the confidential message is encrypted by the third user's private encryption key. Consequently, at step in FIG. 13, the present invention will use the third user's public encryption key to decrypt the first user's university degree. Since the confidential message is encrypted by the third user's private encryption key, the second user knows that the university degree has been validated and signed cryptographically by the notary public.

When the computers depicted in FIG. 13 communicate with each other they use service accounts. Patent U.S. Ser. No. 10/044,756B2 discloses a method that enables computers to interoperate via a public cloud. This is a standard concept that is used by internet computers, blockchain computers and enterprise computers to interoperate over pubic networks. To secure the communication channel between any two member computers, the source member computer can use the public cryptographic encryption key of the destination member computer to encrypt the transmission. The destination member computer then uses its private cryptographic encryption key to decrypt the incoming information.

A first user can use a biometric signature to initiate the process to enter confidential information into the warm storage distributed database taught herein. First the user must register each biometric signature with the present invention, such as fingerprints, retina scans and voice prints. US patent application US 2019/0013931 A1 Benini teaches a biometric solution that meets the biometric requirements of the present invention. Benini teaches the comparison of biometric templates to verify the identity of a user (see the detailed description on page 2). When the first user navigates to a website or an enterprise system, such as a document management system, that system displays its login page. The first user can use a device, such as a fingerprint reader, to enter a biometric signature. The present invention will verify the biometric signature against the registered biometric signature for the first user then locate the password in the warm storage distributed database then login the user into to the document management system. The user must also enable biometric login for that system, such as a document management system. This enables a user to log into the document management system from any device by using his registered biometric signature to retrieve the secure password from the warm storage distributed database taught herein.

Also a first user can register at least one biometric signature in the present invention. Similarly, a second user can register at least one biometric signature with the present invention. The first user can then use a biometric signature to initiate the storage of a confidential message, such as a blockchain address for bitcoin, or other currency, in the warm storage distributed database taught herein. In FIG. 13, the present invention will use the second user's public key 1341 and private key 1342 in the encryption and decryption process for the confidential message (e.g., blockchain address for bitcoin). The present invention also enables the first user to encrypt the authorization identifier, send it to the second user then the present invention enables the second user to decrypt the authorization identifier. The present invention then enables the second user to use a pre-registered biometric signature to initiate the decryption of the confidential message (e.g., blockchain address for bitcoin). This enables the second user to access and spend the currency associated with that blockchain address. For security purposes, the user should not use that bitcoin address again. The most secure approach is to create a new bitcoin address and repeat the process. To one skilled in the art, it will be evident that this enhanced security process has applications beyond crypto currency authentication to include any application where an authentication code, or critical data string, or other confidential message, requires enhanced security.

Figure 14:
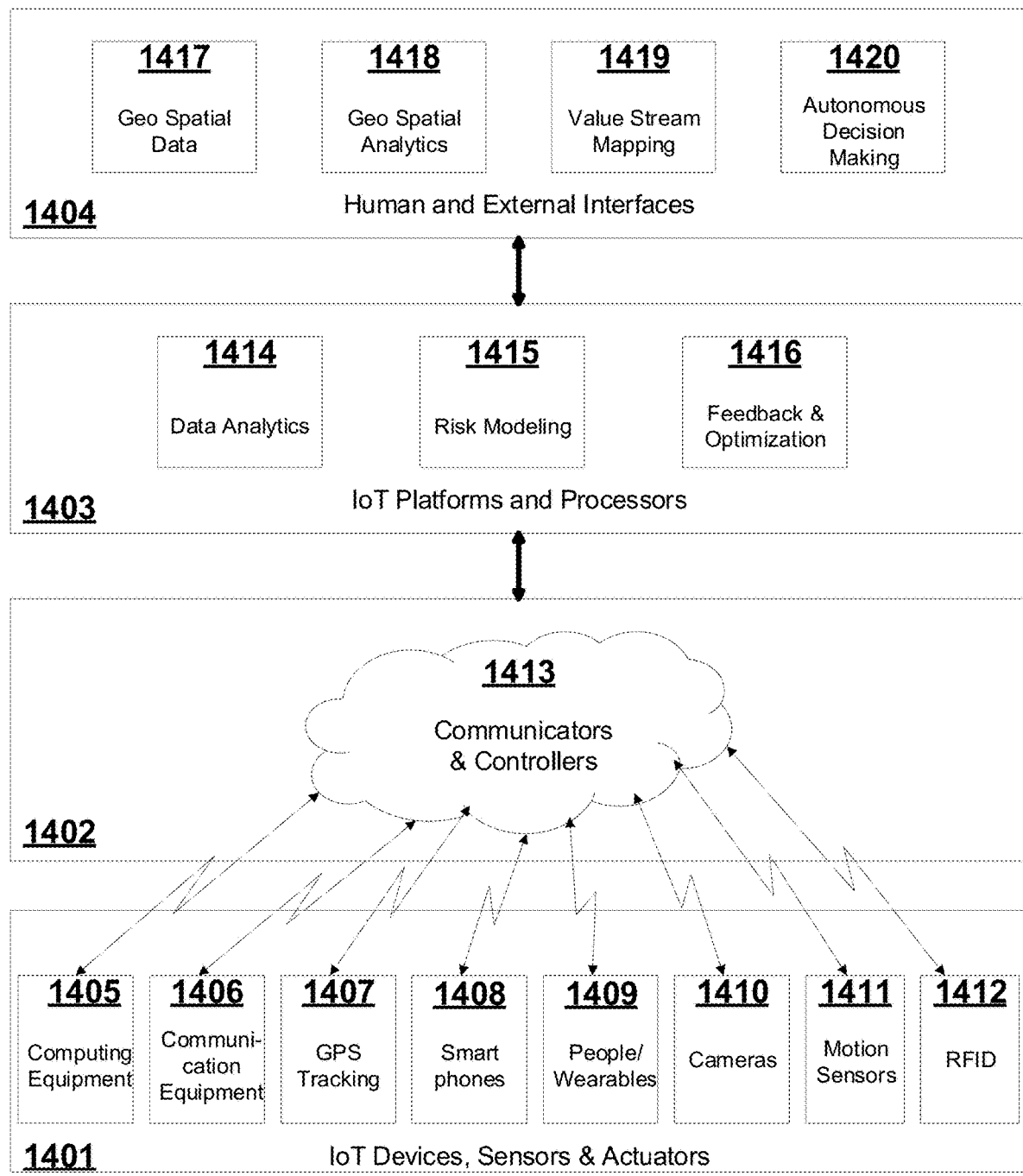
FIG. 14 illustrates a first embodiment of the internet of things system for the present invention.

FIG. 14 illustrates the internet of things architecture for a first embodiment of the apparatus and method of the present invention.

The Internet of Things (IoT) is a fairly nascent technology enabled by the convergence of data, connectivity and analytics. The objective is to deliver the right data, at the right time, to the right people to drive the right business outcomes. In the case of a decentralized autonomous organization, like the present invention, the objective is to deliver the right data, at the right time, to the right systems to automate the right business actions. The IoT is the connection of objects such as computing machines, embedded devices, equipment, appliances, and sensors to the Internet for access, processing and decision making by analytical tools and management. The technology involves connecting devices and equipment based on radio frequency identification devices (RFID) and sensor technologies.

The present invention uses the IoT to automate the maintenance and operations of equipment and transition from preventive to predictive maintenance.

In a first embodiment of the present invention, IoT devices 1401 include sensors that capture data from their surroundings and IoT actuators that initiate actions in their surroundings, such as control mechanical and electronic devices. The IoT automatically receives and transfers this data over a network of communicators and controllers 1402 without requiring human intervention. This data is transformed into useful information by the IoT platforms and processors 1403. The human and external interfaces 1404 layer, transforms this IoT information into knowledge to support decision making and autonomous actions. This data management and analytics infrastructure provides a number of benefits including predictive maintenance and automated decision support.

The IoT devices 1401 enable remote monitoring of operations which helps to optimize efficiency, improve safety, decrease variability and reveal performance issues. For example, IoT sensors are used to monitor the computing equipment 1405 and communication equipment 1406 that comprise the present invention. As equipment performance indicators move toward the outer range of their acceptable limits, the system generates alerts. For example, a computer processor may be performing slower than expected or memory usage may be exceeding design guidelines. These types of alerts indicate a requirement for proactive maintenance which can be provided under the service provider model described in FIG. 1b. Predictive analytics enable the present invention to predict failures before they occur. This enables spare parts to be ordered well in advance which avoids downtime and express shipping costs. IoT sensors are also available to monitor the location of a user's assets through GPS tracking 1407, a user's smart phone 1408, and a user's wearable devices 1409. Wearable devices help monitor a user's vital signs for health purposes and their location for security purposes. A worker user can also use IoT devices to capture information from security cameras 1410 and motion detectors 1411. This further enhances security for their businesses. The broad range of IoT devices in FIG. 14 is exemplary and should not be considered as limiting. However, they help each worker user better manage his or her business assets. In turn, this helps increase the return on investment for their micro home business.

Radio frequency identification ("RFID") 1412 is the identification technology for IoT sensors and actuators. Each device has a unique RFID that enables the IoT network to distinguish it.

The IoT communicators and controllers 1402 include a plurality of networks including, satellite, ethernet, wireless area network, personal area network and the global system for mobile radio. In a preferred embodiment of the present invention, the key components of the IoT communicators and controllers layer include, IoT Routers, IoT gateways and IoT switches.

Each IoT gateway is a physical device and software program that serves as the connection point between the cloud and the plurality of controllers, sensors and intelligent devices. In a first embodiment of the present invention, each gateway transfers and interprets data between IoT systems. These gateways, also known as protocol converters, use encryption to increase network security. They also aggregate, summarize and analyze data at the edge of the cloud. This functionality minimizes the volume of data that is transferred to the cloud. Reducing the data in the cloud improves network response times and reduces network transmission costs.

IoT routers are similar to gateways. However, in the present invention, routers provide an interface between two dissimilar networks. The IoT routers enable network level interoperability whereas the IoT gateways are used as a bridge between similar networks. Moreover, the IoT routers are network layer devices that route data packets based on their IP addresses. They interconnect LANs and WANs.

Conversely, the present invention uses a plurality of IoT switches in the data link layer to perform error checking before forwarding any data. Each IoT switch is a multi-port bridge with a buffer that improves performance.

The IoT platforms and processors 1403 filter the large volumes of raw data into critical data then transforms this critical data into useful information. The data analytics module 1414 examines these IoT data sets then draws conclusions about the information they contain. This helps users make more-informed business decisions often by verifying or disproving models, theories and hypotheses. Data analytics methodologies include exploratory data analysis (EDA), which aims to find patterns and relationships in data, and confirmatory data analysis (CDA), which applies statistical techniques to determine whether a hypothesis about a data set is true or false. The present invention also separates data analytics into quantitative data analysis and qualitative data analysis. The former involves analysis of numerical data with quantifiable variables that can be compared or measured statistically. The qualitative approach is more interpretive and focuses on understanding the content of non-numerical data like text, images, audio and video, including common phrases, themes and points of view. The present invention also supports more advanced types of data analytics including data mining, which involves sorting through large data sets to identify trends, patterns and relationships; predictive analytics, which seeks to predict user behavior, equipment failures and other future events; and machine learning, which is an artificial intelligence technique that uses automated algorithms to churn through data sets more quickly than data scientists can do via conventional analytical modeling. The present invention uses big data analytics to apply data mining, predictive analytics and machine learning tools to sets of big data that often contain unstructured and semi-structured data. In general, data analytics initiatives help increase revenues, improve operational efficiency, optimize marketing campaigns and customer service efforts, respond more quickly to emerging market trends and gain a competitive edge. The risk modeling module 1415 examines a number of uncertain factors to predict the likelihood of each possible outcome. For example, there is uncertainty about whether each worker user will make their micro home business profitable. This will lead to uncertain reserves to fund other micro home businesses. In this case, a service provider user can use the risk modeling module 1415 to estimate the value of each micro home business taking into account the profit and cash flow probability.

The feedback and optimization module 1416 collects and interprets data, then applies models to gain insight before making actionable recommendations that improve success probabilities for the micro home business and also improves equipment failure probabilities. The results are measured by the IoT sensors and then fed back into the feedback and optimization module 1416. This is a continuous improvement process aimed at optimizing a specific goal for the micro home business, such as return on investment.

The IoT processors also use encryption techniques to secure the data. The key components include, data processing, device configuration, data analytics, risk modeling, optimization via feedback loops, data security and SCADA. Features include, automated enrollment and provisioning of gateways and endpoints, over-the-air lifecycle management, dynamic and customizable dashboards, device inventory, configuration management, network management for constrained bandwidth, network troubleshooting, Role Based Access Control ("RBAC") user management, rich APIs for integration with third party applications, active monitoring and alerts for critical events, real-time location tracking of assets and geofencing, and rich Geographic Information System ("GIS") map overlays. Geofencing creates a virtual geographic boundary around the area covered by the decentralized autonomous organization, using GPS and RFID technology. The present invention uses a specific commercial off the shelf solution that includes the features listed above. However, the present invention can use any one of a plurality of commercial off the shelf solution options including, Cisco IoT Field Network Director, Ericsson IoT Accelerator and the Pelion IoT Platform from Arm. Other options include SymBot® from Symboticware, which is a monitoring and data solution that delivers standardized information-based technology that enhances the productivity, safety and efficiency of mobile and fixed assets. Synertrex® technology collects critical data to provide operators with insight into equipment functionality.

The IoT human and external interfaces 1404 use intelligent computing technologies such as cloud computing, fuzzy recognition, data mining and semantic. This enables integrated remote-control centers, promotes compliance with safety and environmental regulations, and facilitates management decision making.

The geospatial data module 1417 intelligently and automatically transforms geographic data into information and then synthesizes geographic knowledge. The goal is to extract useful information from massive amounts of data to support decision-making. The geospatial data module extracts new, insightful information embedded within large heterogeneous databases to formulate knowledge. The process for knowledge discovery in databases includes data warehousing, target data selection, data cleansing, preprocessing, transformation and reduction, data mining, model selection, evaluation and interpretation, and then consolidation and use of the extracted knowledge. The geospatial analytics module 1418 is designed to gather, display, and manipulate imagery, GPS, satellite photography and historical data. It describes this data explicitly in terms of geographic coordinates or implicitly, in terms of a street address and postal code, or forest stand identifier. The geospatial analytics module applies this data to geographic models. Spatial analysis allows users to solve complex location-oriented problems and better understand where and what is occurring. In the present invention, spatial analysis lends new perspectives to decision-making. It uses statistical analysis to help worker users determine if visual patterns are significant. This spatial analysis also helps users determine relationships, understand and describe locations and events, detect and quantify patterns, make predictions and find the best locations and paths. Although the present invention uses a specific commercial off the shelf geospatial information system, for geospatial data and geospatial analytics, any one of a number of commercial off the shelf geospatial information systems can meet the needs of the present invention, such as Simple GIS Software, ArcGIS and QGIS. The value stream mapping module 1419 is designed to transform geospatial knowledge into a story, or journey map. For example, a story may explain the motion patterns of workers or equipment over time. This helps worker users optimize supply and distribution paths to facilitate the free flow of workers, equipment and other assets. This increases efficiency, reduces costs and can also increase revenues. Patent application US 2008/0195433 A1 teaches value stream mapping. Although the present invention uses a specific commercial off the shelf IoT value mapping solution, any one of a number of commercial off the shelf platforms can meet the needs of the present invention, such as SmartDraw, LucidChart and eDraw. The value stream maps are the optimal paths that maximize return on investment. The autonomous decision-making module 1420 assesses the optimal value stream maps then decides the optimal value stream for each inventory asset to navigate.

The IoT infrastructure is a practical integration of the present invention with IoT devices that enhances decision making for worker users who can run their businesses more efficiently and more effectively which increases return on investment. This practical integration of the present invention with IoT devices also helps eliminate human intervention in the management of the decentralized autonomous organization by automatically monitoring performance of the infrastructure then proactively initiating maintenance and service activities that improve performance and avoid the failure of components that comprise the infrastructure. The benefits include higher return on investment probabilities and lower equipment failure probabilities which improves profitability and makes more money available for more micro home businesses. Also, the IoT routers enable the interconnection of different decentralized autonomous organizations. This enables a plurality of decentralized autonomous organizations to be managed automatically in order to leverage economies of scale. Also, this IoT infrastructure enables a parent decentralized autonomous organization to be configured to manage the plurality of interconnected decentralized autonomous organizations.

Figure 15:
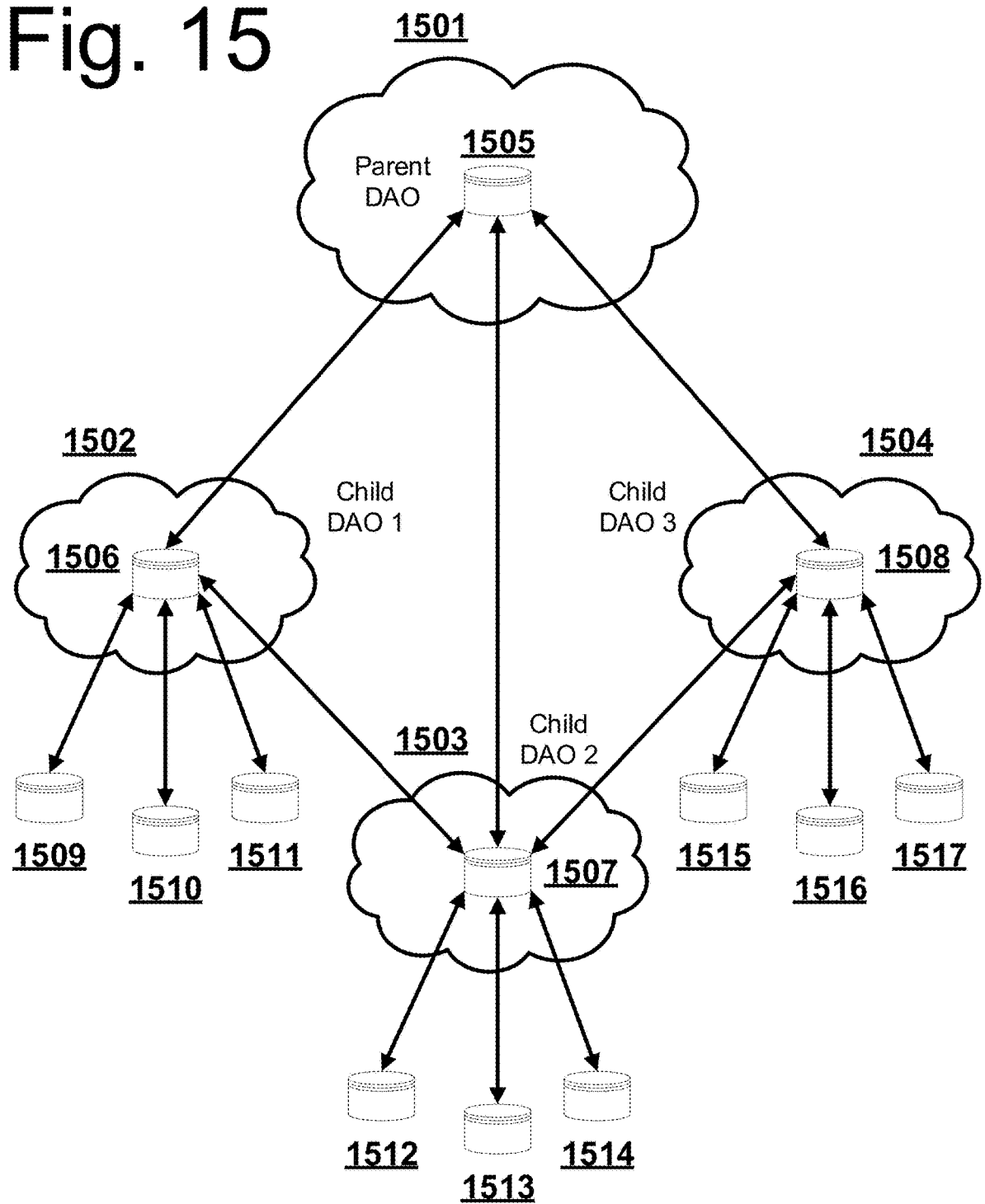
FIG. 15 illustrates a first embodiment of the inventory management system for the present invention.

FIG. 15 illustrates a parent decentralized autonomous organization (parent DAO) 1501 interoperating with a plurality of child decentralized autonomous organizations 1502 (child DAO 1), 1503 (child DAO 2) and 1504 (child DAO 3). The parent decentralized autonomous organization includes a virtual node 1505 that interoperates with each child decentralized autonomous organization. Each child decentralized autonomous organization is a virtual node in the parent decentralized autonomous organization 1506, 1507 and 1508. Each child decentralized autonomous organization is comprised of a number of real nodes. In FIG. 15, the first child decentralized autonomous organization (child DAO 1) has three nodes 1509, 1510 and 1511. The second child decentralized autonomous organization (child DAO 2) also has three nodes 1512, 1513 and 1514. In addition, the third child decentralized autonomous organization (child DAO 3) also has three nodes 1515, 1516 and 1517. Each user's terminal, such as a micro home business, is a node in a child decentralized autonomous organization.

Each parent decentralized autonomous organization operates like a child decentralized autonomous organization ("DAO"). Like the child DAO, the operating method for the parent DAO is summarized in FIG. 1, FIG. 1a, FIG. 1b and FIG. 1c. When each child DAO is setup, at least one initial child DAO representative is assigned to that child DAO. Users can take courses to qualify to become a child DAO representative just like they can take courses to qualify to be an underwriter, a system administrator, a supplier, a reviewer or any other role in accordance with the procedure illustrated in FIG. 1c. Any user who has completed the required courses to be a child DAO representative can then apply to become a child DAO representative. The existing child DAO representatives review the application then vote whether to approve or reject the application. Each child DAO can decide the number of votes required for approval and the number of child DAO representatives that are required to make a quorum. For example, if a first child DAO can decide that a quorum is comprised of 3 child DAO representatives. That first child DAO may have one initial child DAO representative. After the first two applications are approved for child DAO representatives then that first child DAO will have three child DAO representatives in total including the initial child representative. This represents a quorum as decided by that first child DAO. When the next application is approved for a child DAO representative then the initial child DAO representative will be removed. This process will continue to maintain the quorum of elected child DAO representatives. In this example, the quorum is one if there is only one child DAO representative, two if there are only two child DAO representatives otherwise the quorum is three. There must be at least one child DAO representative.

Referring back to FIG. 1b, users can request global changes that will benefit all child DAOs. These changes will be reviewed by the group of child DAO representatives that represent the group of child DAOs. This group of child DAO representatives collaborate to create a proposal. In FIG. 1b, the group of child DAO representatives play the role of the reviewers. Qualified suppliers will review the proposal and each qualified supplier can submit a bid. The child DAO representative for each child DAO will assess and score the bids then collaborate to make a recommendation. Each child DAO representative then is responsible for getting approval for the recommendation from their child DAO. They do this by distributing the recommendation for approval within their child DAO in accordance with steps 115b, 116b and 117b in FIG. 1b. The parent DAO has a consensus mechanism that determines how many child DAOs must approve a recommendation for it to be awarded to a bidder. In another embodiment of the present invention, each child DAO gives its child DAO representatives authority to vote for recommendations on behalf of the child DAO. This parent DAO process promotes consistency across child DAOs and drives down unit costs, which promotes economies of scale. It also leverages the wisdom of the crowd by getting input from diverse child DAOs.

Referring back to FIG. 1, which illustrates a high-level summary of the preferred embodiment of the present invention, the following is a summary of how the key components of the present invention enable its functionality.

When setting up a new decentralized autonomous organization, the workflow & document management system 224 (also "document management system" or "workflow management system") is used to document the initial specifications for micro home businesses, the specifications for the initial business opportunities, the requirements to own a micro home business and the default mortgage templates. The workflow & document management system is also used to list all relevant jurisdictions that may impact a micro home business and also list the laws, regulations, moral obligations and policies that apply to each micro home business and to each jurisdiction. These jurisdictions include continents, countries, states, counties, cities, towns, villages and other municipalities as well as other supranational, national, regional and local jurisdictions. These lists are accessible by the CCS 201 which is operatively coupled to the document management system. The other systems, that comprise the present invention, such as the business intelligence system, also have access to this information via the CCS. The document management system is also used to manage all of the default contracts, such as the default construction contract, the default maintenance contract, the default mortgage contract as well as a plurality of default service provider contracts. A number of business rules are configured into the business intelligence system. One example is the set of rules that determine the requirements a worker user must meet in order to own a specific type of micro home business. Another set of business rules determines which users are qualified to submit, filter and categorize business opportunities. The payment processor system 218 captures the initial pool of funds (e.g., the initial investment) into an account for the decentralized autonomous micro home business system.

The CCS enables new users to request access to the system 101. The CCS enables the authentication process for users 102. The CCS also enables the authorization process for users, which determines the features they can access 102. The CCS also enables users to setup a user profile 103 and login to the system 104. The CCS enables each user to update their user profile during subsequent logins. Each time the user logs in, the CCS re-authenticates and re-authorizes the user 105.

The workflow management system executes the process to determine which users are qualified to own which type of micro home business. When a user sets up their profile the CCS allows them to specify the micro home business that they would like to own. The CCS also allows the user to input their qualifications that match each requirement to own the selected micro home business. The workflow management system compares the predetermined requirements for that micro home business and mortgage with the qualifications that are listed in the profile of the worker user. The workflow management system ensures the user can only see and select the micro home businesses that he or she is qualified to own.

The CCS authenticates users to grant them access to the system and then controls their access to the system's functionality. The CCS only authorizes authenticated users to access the features that they are entitled to use. For example, the members of the initial selection committee are configured as selection committee members in their profile. The CCS authorizes these selection committee users to access selection committee features. Similarly, initial arbitrator users are configured as arbitrator users in their profile. The CCS authorizes these arbitrator users to access arbitrator features. The CCS also authorizes service provider users to access services provider features and authorizes lender users to access lender features. This list is exemplary and is not intended to be limiting. One skilled in the art will recognize that the CCS grants, authenticated users, access to the system features that those authenticated users require to perform the roles configured in their user profile. In one embodiment of the present inventions, the CCS enables the system administrator to specify which features require low-level authorization, medium level authorization and high-level authorization. The CCS then allows the system administrator to assign single-factor authentication to low-level features, two-factor authentication to medium-level features, and three-factor authentication to high-level features.

Users can store their confidential information, including authentication and authorization information for users and payments, in a secure decentralized, distributed, encrypted, decomposed and dynamic database described in FIG. 13. In one embodiment of the present invention users input a biometric signature to initiate the storage and retrieval of their confidential information in the secure decentralized, distributed, encrypted, decomposed and dynamic database.

The workflow management system qualifies the service provider users who are permitted to submit, filter and categorize business opportunities 106. The workflow management system compares a plurality of business rules, that are configured in the business intelligence system 222, with the qualifications of a service provider user, that are entered in that service provider user's profile. This comparison enables the workflow management system to determine which users are qualified to submit business opportunities, which users are authorized to filter those business opportunities, and which users are authorized to categorize those business opportunities for each type of decentralized micro home business.

The workflow management system enables service provider users to submit, filter and categorize business opportunities 107. The payment processor system 218 enables payments to be made to service provider users for services rendered. In one embodiment of the present invention at least one service provider is paid in a fiat currency or digital cash, for submitting, filtering or categorizing business opportunities. In another embodiment of the present invention, at least one service provider user is paid in curator tokens for submitting, filtering or categorizing business opportunities. In this case, the token system 219 enables curator tokens to be created and managed. The token exchange 220 enables users to trade curator tokens and the smart contract system 217 enables payments to be transferred automatically for services rendered and accepted. In one embodiment of the present invention, service providers are volunteers so are not compensated for these business opportunities. In another embodiment of the present invention, service providers are paid a percentage of the revenue generated by each business opportunity that they curate.

The workflow management system enables the system to receive and qualify 109 the business opportunities. The workflow management system inter-operates with the CCS, the document management system and the business intelligence system to qualify each business opportunity. This includes qualifying that the compensation requested by the service provider falls within predetermined limits and the business opportunity complies with a predetermined list of legal, regulatory, moral and policy guidelines. The workflow management system displays each curated business opportunity, with any meta data provided by the service provider, in the curated business opportunity store 216. The meta data includes sales, marketing, operational and technical information. The workflow management system enables workers to view curated business opportunities, and their meta data, in the curated business opportunity store then select and subscribe to their preferred curated business opportunities 110. The workflow management system filters the information so worker users only see business opportunities that match the worker user's skill set, match the micro home business, and comply with the laws, regulations, moral guidelines and policies of the local jurisdiction. The workflow management system inter-operates with the CCS and business intelligence system to apply the business rules that validate the worker user's selection for a micro home business and business opportunities 111.

The workflow management system receives information from the worker user and the worker user's profile to populate the worker user's mortgage application. The workflow management system forward's the worker user's micro home business selections and mortgage application to the lender user for pre-approval 112. The workflow management system enables the lender user to pre-approve the mortgage or negotiate changes with the worker user until the application qualifies for pre-approval. The workflow management system inter-operates with the CCS and the payment processor system to transfer a bridge loan 113 from a second lender user to the system's general account. The second lender user may be the same person or organization as the first lender user who provides the pre-approval.

The workflow management system receives the pre-approval from the lender user and validates funding 114. The workflow management system inter-operates with the CCS and business intelligence system to ensure the predetermined business rules are applied in order to validate funding.

The workflow management system collates the specifications for the micro home business and business opportunities in the document management system 115. The workflow management system publishes these specifications in the curated business opportunity store. The curated business opportunity store enables qualified services provider users to review the specifications and the workflow management system enables them to submit a bid 116 to supply a micro home business and receives those bids 117. The workflow management system inter-operates with the CCS and the business intelligence system to apply the predetermined rules to ensure the bid meets the specifications and complies with legal and regulatory requirements. The workflow management system then forwards the qualified bids to the vendor selection committee 118. The workflow management system does this by generating an event when it forwards the bids. This event triggers an alert in the notification management system 225 which sends a notification to the public email address of each member of the vendor selection committee. This first notification notifies the members that they have a second message in their secure email address. The workflow management system also sends a corresponding confidential message to the secure email address of each member of the vendor selection committee. This secure message includes the details of each bid.

The workflow management system enables the members of the vendor selection committee to review the confidential bids and select a vendor 118. The workflow management system inter-operates with the notification management system and the secure email system to notify the winning bidder who was selected to build the micro home business 119. This includes sending a non-confidential notification to a public email address of the winning bidder and a confidential email to the secure email address of the winning bidder. It also includes transferring a payment from the system's general financial account to the account of the winning bidder. This may be a one-time payment in advance, a plurality of deliverable based payments or a one-time payment at the end after acceptance. The workflow management system inter-operates with the CCS and payment processor system to transfer these payments. In one embodiment of the present invention, a smart contract is used to transfer these payments. In this case, the workflow management system also inter-operates with the smart contract system. The selected builder completes the construction 120 and negotiates acceptance with the worker user, selected service providers and the selection committee 121. The workflow management system receives the acceptance from the worker user 122.

The workflow management system captures the worker user's signature on the mortgage application then sends the fully executed mortgage application to the lender user 123. The workflow management system interoperates with the notification management system and the secure email system to send a first notification to the lender user's public email address and a second message containing the confidential fully executed mortgage application to the lender user's secure email address. The lender user reviews and funds the mortgage 124. The workflow management system interoperates with the payment processor system to receive the funds 125 and distributes any compensation payments to relevant service provider users 126. This includes the repayment of the bridge loan that was used to finance the construction of the micro home business and profit shares that are due to service provider users who curated the business opportunities. The workflow management system also interoperates with the payment processor system to help service the loan 127 by extracting interest and principle payments from the worker user's account 127 and by enabling the worker user to validate the interest and principle payments 128.

The workflow management system enables the worker user to suggest improvements 129 which the workflow management system forwards to the members of the vendor selection committee 130. The members of the vendor selection committee will review and implement any suggestions that they approve 131.

Referring back to FIG. 1*a*, which is an overview of the arbitration process for the decentralized autonomous organization, the following is a summary of how the key components of the present invention enables this functionality.

The arbitration process starts when a requestor user submits a change request 101*a* that is optionally initiated by a dispute that requires a ruling by an arbitrator. The workflow management system enables a requestor user to submit a change request that that includes the requestor user's preferred resolution to the dispute. The CCS receives the change request 102*a* via the workflow management system then displays it in the curated business opportunity store. This is the main method to distribute the change request 103*a* to the selection committee users. However, this event also triggers the notification management system to send a notification message to the public email address of each member of the selection committee and also send a confidential message to the secure email address of each member of the selection committee. The confidential message includes the change request. The workflow management system enables each member of the selection committee to review the change request 104*a* in the curated business opportunity store. The secure email system also enables each member of the selection committee to review the change request in the secure email system. The role of the selection committee is to agree a response. The workflow management system enables the lead selection committee user to submit feedback and a counter offer 105*a*. The workflow management system inter-operates with the CCS and document management system to receive this feedback and combine it with the change request 106*a*.

The workflow management system then distributes these documents as a case to the arbitrator users 107*a*. The workflow management system inter-operates with the CCS to display this information in the curated business opportunity store. This is the main method to distribute the change request 107*a* to the arbitrator users. However, this event also triggers the notification management system to send a notification message to the public email address of each arbitrator user and also send a confidential message to the secure email address of each arbitrator user. The confidential message includes the case documents. The workflow management system enables the arbitrator users to assess the case documents and determine options 108*a*. The secure email system enables each arbitrator user to review the case documents in the secure email system. The role of the arbitrator users is to present the options to the impacted users and recommend a solution. The workflow management system enables the arbitrator users to agree a response. The workflow management system, the messaging system 226 and the forum system 227 enable the lead arbitrator user to negotiate the options with the impacted users 109*a* then agree an option 110*a*. The workflow management system enables the arbitrator users to vote on and submit the agreed options 111*a* and final recommendation, which is the arbitration ruling. The workflow management system inter-operates with the CCS, the business intelligence system and the document management system to receive and validate the impact of the arbitration ruling 112*a* in order to ensure the resultant changes comply with all relevant predetermined rules configured in the business intelligence system.

The workflow management system inter-operates with the CCS to display the arbitration ruling in the curated business opportunity store 113*a*. This creates an event that also causes the workflow management system to inter-operate with the CCS, the notification management system and the secure email system to notify the impacted users 114*a* by sending a non-confidential message to the public email address of each impacted user and also by sending a confidential message to the secure email address of each impacted user. The workflow management system then ratifies the decision 114*a* by inter-operating with the CCS and other components of the present invention to implement the changes.

For approved arbitrator rulings, any change required is implemented by a selected service provider user as described in FIG. 1*b*.

Referring back to FIG. 1*b*, which is an overview of the maintenance process for the decentralized autonomous organization, the following is a summary of how the key components of the present invention enables this functionality.

The maintenance process starts when a requestor user drafts and submits a service request 101*b*, which may be initiated by an arbitration ruling. The workflow management system receives that service request 102*b*. The workflow management system then distributes this service request to the selection committee 103*b*. The workflow management system inter-operates with the CCS to display this information in the curated business opportunity store. This is the main method to distribute the service request 103*b* to the selection committee. However, this event also triggers the notification management system to send a notification message to the public email address of each member of the selection committee and also send a confidential message to the secure email address of each member of the selection committee. The confidential message includes the service request.

The workflow management system enables the selection committee to review and approve the service request 104*b*. The secure email system enables each member of the selection committee to review and approve the service request in the secure email system. The role of the selection committee is to create and submit a proposal 105*b* for the approved service request. The workflow management system inter-operates with the CCS to receive the proposal 106*b* then publish the proposal 107*b* in the curated business opportunity store. This event triggers the notification management system and secure email system to send a non-confidential notification to the public email address of each eligible service provider and a confidential email to the secure email address of each eligible service provider. The confidential email contains the proposal. Each eligible service provider can review the proposal 108*b* and submit a bid 109*b*. The workflow management system inter-operates with the CCS to receive the bid 110*b* and also enable a service provider to submit the bid.

The workflow management system then distributes the bid to the selection committee 111*b*. The workflow management system inter-operates with the CCS to display this information in the curated business opportunity store. This event also triggers the notification management system to send a non-confidential notification message to the public email address of each member of the selection committee and also send a confidential message to the secure email address of each member of the selection committee. The confidential message includes the bid. The workflow management system enables the selection committee to assess each bid 112*b* then score each bid and submit a recommendation 113*b*. The workflow management system inter-operates with the CCS to receive the scores and recommendation 114*b*.

The workflow management system then distributes the recommendations to the worker users 115*b*. The workflow management system inter-operates with the CCS to display this information in the curated business opportunity store. This event also triggers the notification management system to send a non-confidential notification message to the public email address of each worker user and also send a confidential message to the secure email address of each worker user. The confidential message includes the recommendation. The workflow management system enables the worker users to assess the recommendation then vote to approve or reject the service request 116*b*. The workflow management system inter-operates with the CCS to validate the decision 117*b*. The workflow management system inter-operates with the CCS to display this information in the curated business opportunity store. This event also triggers the notification management system to send a non-confidential notification message to the public email address of each impacted user and also send a confidential message to the secure email address of each impacted user 118*b*.

For approved service requests, the work is conducted by the selected service provider user and accepted by the selection committee.

Referring back to FIG. 1*c*, the workflow management system enables the user to request a course 101*c*. The workflow management system also enables the system to receive that request from the user 102*c* and display courses that are available to the user in the business opportunity store 103*c*. The workflow management system enables the user to take the course 104*c* and take a test 105*c* after completing the course. The workflow management system inter operates with the CCS and the business intelligence system to score the test 106*c* and generate feedback 107*c*. This feedback includes scores, predetermined automated statements that explain the correct answer when the user inputs an incorrect answer and a pass or fail result 108*c*. The workflow management system enables the user to retake the test 105*c* or confirm the feedback 109*c* and accept the certification if the user passes the test. The workflow management system inter operates with the CCS, the business intelligence system and the document management system to certify the user's qualification 110*c* then the workflow management system updates the user's profile 111*c*.

The workflow management system inter operates with the CCS, the business intelligence system and the document management system to configure the rules that specify which courses a user must pass to qualify for each type of micro business. The courses are classified in the business opportunity store based on the user needs they address including physiological needs 112*c*, safety needs 113*c*, belonging needs 114*c*, esteem needs 115*c* and self-actualization needs 116*c*.

The present invention has a plurality of potential revenue streams including a percentage of revenues from business opportunities, a percentage of revenues from the sale of micro home loans, servicing fees for the mortgage, advertising fees, subscription fees, licensing fees and the sale of trend information generated by the business intelligence system. Payments can be made using a plurality of methods including credit cards, debit cards, electronic funds transfer, digital cash, cash, crypto currencies, checks and barter. In addition, a plurality of options exist for the timing of payments. It will be evident to one skilled in the art that one or more of the steps in the preferred procedure can be eliminated in specific situations without affecting the usefulness of the present invention.

Anyone skilled in the art will also recognize that the method and apparatus of the present invention has many applications and advantages, and that the present invention is not limited to the representative examples and variations disclosed herein. In addition, the scope of the present invention covers conventional variations and modifications, to the components of the present invention, which are known to those who are skilled in the art.

I claim:

1. A computer implemented method for managing a micro business in a decentralized autonomous organization configured to use a secure communication environment, said method comprising:

monitoring, in the secure communication environment, a location of a worker user's computer, based on at least one of an IoT device and an IP Address associated with said computer;

qualifying, in the secure communication environment, at least one curated business opportunity, for at least one of passive and active income, by ensuring said at least one opportunity complies with a predetermined list of legal, regulatory, moral and policy guidelines associated with the location's jurisdiction;

receiving, in the secure communication environment, a design for said micro business that includes an estimated construction cost, an estimated construction timeframe and a plurality of facilities and equipment to operate said at least one opportunity;

receiving, in the secure communication environment, from said worker user, a loan application to purchase said micro business based on said design where said loan application includes a profile of said worker user and a plurality of loan terms and conditions;

receiving, in the secure communication environment, from a lender, an approval of said loan application based on said design and said loan application;

transferring, in the secure communication environment, a bridge loan for a construction of said micro business, from a loan account to a construction account based on the loan approval;

receiving, in the secure communication environment, from a construction user, a confirmation that a construction of said micro business is complete based on said design and said bridge loan;

receiving, from said worker user, an acceptance of said micro business based on said confirmation;

receiving, from said worker user, a record of completion of at least one deliverable associated with said at least one opportunity, based on the micro business acceptance;

receiving, from a client user, an acceptance of said at least one deliverable;

transferring automatically, and periodically, from a client account associated with said client user to a worker account associated with said worker user, a revenue payment associated with said at least one opportunity, based on said deliverable acceptance and a plurality of opportunity terms and conditions;

transferring automatically, and periodically, from said worker account to said loan account, an interest and principal payment associated with said loan application, based on said plurality of loan terms and conditions; and closing said loan account, after transferring a final interest payment and a final principal payment, from said worker account to said loan account, based on said plurality of loan terms and conditions, where the secure communication environment is generated by downloading a CCS application, from a central control system (CCS), which includes at least one processor and memory configured to store computer program code instructions, to the computers of users of the decentralized autonomous organization, the CCS application generating secure authentication messages between the users and the CCS, the secure authentication messages implementing authentication with encryption that perform the steps of:

storing securely, on a sender's computer, a plurality of authentication and authorization information, based on using at least one of a cryptographic public encryption key and a cryptographic symmetric encryption key in a process that encrypts a secure authentication message;

decomposing, by the CCS application running on the sender's computer, an encrypted version of said secure authentication message into a block of linked and ordered subcomponents that are stored randomly across a first plurality of member computers that are selected from a predetermined list of participating computers, a final subcomponent in the link of subcomponents flagged as a last subcomponent;

randomly selecting, by the CSS application running on the sender's computer, three member computers on which to copy a first subcomponent of the secure authentication message;

randomly selecting, by each of the three computers which have a copy of the first subcomponent of the secure authentication message, a member computer for which to copy a second subcomponent of the secure authentication message, and repeating the process of randomly selecting a member computer to copy the next ordered subcomponent of the secure authentication message by the computer that copied the ordered subcomponent that immediately precedes the next ordered subcomponent, until the final subcomponent of the block which is flagged as the last subcomponent has been copied, which generates three copies of blocks of linked and ordered subcomponents of the secure authentication message, where each computer which stores a copy of a subcomponent knows only of the computer which was randomly selected by that computer;

periodically, by the computer storing a newest copy of the first subcomponent of the secure authentication message, randomly selecting a member computer for which to copy the first subcomponent of the secure authentication message and generating a new block of linked and ordered subcomponents of the secure authentication message;

deleting an oldest block of linked and ordered subcomponents of the secure authentication message after generating the new block of linked and ordered subcomponents of the secure authentication message;

recombining, on a receiver's computer, the encrypted version of the secure authentication message from the new block of linked and ordered subcomponents of the secure authentication message after verifying, by the receiver's computer, a unique authorization identifier transmitted by the sender's computer; and recovering said secure authentication message, based on using at least one of a cryptographic private encryption key and said cryptographic symmetric encryption key in a process that decrypts said encrypted version of said secure authentication message, where said cryptographic private encryption key matches said cryptographic public encryption key.

2. The method according to claim 1, where:

encrypting said secure authentication message is based on receiving a first biometric signature from a first user; and recombining said encrypted version of said secure authentication message is based on receiving a second biometric signature from a second user.

3. The method according to claim 1, where said method further comprises:

receiving a change request from a requestor user, wherein said change request includes a change to said decentralized autonomous organization;

receiving, from a plurality of worker users, a first plurality of change votes based on said change request; and approving said change request when a first number of approval votes exceeds a predetermined change threshold.

4. The method according to claim 1, where said method further comprises:

receiving a service request from a requestor user, where said service request describes a requirement for at least one of a service activity and a maintenance activity for said decentralized autonomous organization;

receiving, from a committee user, a request for proposal associated with said service request;

receiving, from at least one service provider user, at least one bid based on said request for proposal;

receiving, from said committee user, a recommended service request based on said at least one bid;

receiving, from a plurality of worker users, a second plurality of votes based on said recommended service request; and approving said recommended service request when a second number of approval votes exceeds a predetermined service threshold.

5. The method according to claim 1, where said method further comprises:

receiving, from a requestor user, an arbitration request, where said arbitration request includes a request to amend at least one of a change request, a service request and said loan terms and conditions;

receiving, from an arbitration user, a summary adjudication of said arbitration request and a recommended amendment to at least one of said change request, said service request and said loan terms and conditions;

receiving, from a plurality of worker users, a third plurality of votes based on said recommended amendment; and approving said recommended amendment when a third number of approval votes exceeds a predetermined arbitration threshold.

6. The method according to claim 1, where:
transferring automatically, said bridge loan, based on said plurality of loan terms and conditions, includes using a bridge loan smart contract to:
retrieve said loan amount from said loan account; then pay said loan amount into said construction account;
transferring periodically, and automatically, said interest payment and said principal payment, based on said plurality of loan terms and conditions, includes using a loan repayment smart contract to:
retrieve said interest payment and said principal payment from said worker account; then
pay said interest payment and said principal payment into said loan account; and
closing said loan account automatically, based on said plurality of terms and conditions, includes using a closure smart contract to:
retrieve said final interest payment and said final principal payment from said worker account; then pay said final interest payment and said final principal payment into said loan account.

7. The method according to claim 1, where said decentralized autonomous organization further comprises:
receiving a plurality of diagnostic data from at least one sensor configured to monitor at least one performance parameter of at least one infrastructure component that comprises said decentralized autonomous organization; and
predicting a service need for said at least one infrastructure component based on said plurality of diagnostic data,
whereby a service request is received from a requestor user based on the prediction before said service need causes a system failure.

8. A system for managing a micro business in a decentralize autonomous organization using a secure communication environment, comprising:
at least one memory configured to store computer program code instructions; and at least one processor configured to execute said computer program code instructions to:
monitor, in the secure communication environment, a location of a worker user's computer, based on at least one of an IoT device and an IP Address associated with said computer;
qualify, in the secure communication environment, at least one curated business opportunity, for at least one of passive and active income, by ensuring said at least one opportunity complies with a predetermined list of legal, regulatory, moral and policy guidelines associated with the location's jurisdiction;
receive, in the secure communication environment, a design for said micro business that includes an estimated construction cost, an estimated construction timeframe and a plurality of facilities and equipment to operate said at least one opportunity;
receive, in the secure communication environment, from said worker user, a loan application to purchase said micro business based on said design where said loan application includes a profile of said worker user and a plurality of loan terms and conditions;
receive, in the secure communication environment, from a lender, an approval of said loan application based on said design and said loan application;
transfer, in the secure communication environment, a bridge loan for a construction of said micro business, from a loan account to a construction account based on the loan approval;
receive, in the secure communication environment, from a construction user, a confirmation that a construction of said micro business is complete based on said design and said bridge loan;
receive, from said worker user, an acceptance of said micro business based on said confirmation;
receive, from said worker user, a record of completion of at least one deliverable associated with said at least one opportunity, based on the micro business acceptance;
receive, from a client user, an acceptance of said at least one deliverable;
transfer automatically, and periodically, from a client account associated with said client user to a worker account associated with said worker user, a revenue payment associated with said at least one opportunity, based on said deliverable acceptance and a plurality of opportunity terms and conditions;
transfer automatically, and periodically, from said worker account to said loan account, an interest and principal payment associated with said loan application, based on said plurality of loan terms and conditions; and
close said loan account automatically, after a transfer of a final interest payment and a final principal payment, from said worker account to said loan account, based on said plurality of loan terms and conditions,
where the secure communication environment is generated by downloading a CCS application, from a central control system (CCS), which includes at least one processor and memory configured to store computer program code instructions, to the computers of users of the decentralized autonomous organization, the CCS application generates secure authentication messages between the users and the CCS, the secure authentication messages implement authentication with encryption that:
store securely, on a sender's computer, a plurality of authentication and authorization information, based on a use of at least one of a cryptographic public encryption key and a cryptographic symmetric encryption key in a process that encrypts a secure authentication message;
decompose, by the CCS application running on the sender's computer, an encrypted version of said secure authentication message into a block of linked and ordered subcomponents that are stored randomly across a first plurality of member computers that are selected from a predetermined list of participating computers, a final subcomponent in the link of subcomponents flagged as a last subcomponent;
randomly select, by the CSS application running on the sender's computer, three member computers on which to copy a first subcomponent of the secure authentication message;
randomly select, by each of the three computers which have a copy of the first subcomponent of the secure authentication message, a member computer for which to copy a second subcomponent of the secure authentication message, and repeat the process that randomly selects a member computer to copy the next ordered subcomponent of the secure authentication message by the computer that copied the ordered subcomponent that immediately precedes the next ordered subcomponent, until the final subcomponent of the block which is flagged as the last subcomponent has been copied, which generates three copies of blocks of linked and ordered subcomponents of the secure authentication message, where each computer which stores a copy of a subcomponent knows only of the computer which was randomly selected by that computer;

periodically, by the computer that stores a newest copy of the first subcomponent of the secure authentication message, select randomly a member computer for which to copy the first subcomponent of the secure authentication message and generate a new block of linked and ordered subcomponents of the secure authentication message;

delete an oldest block of linked and ordered subcomponents of the secure authentication message after the generation of the new block of linked and ordered subcomponents of the secure authentication message;

recombine, on a receiver's computer, the encrypted version of the secure authentication message from the new block of linked and ordered subcomponents of the secure authentication message after a verification, by the receiver's computer, of a unique authorization identifier transmitted by the sender's computer; and recover said secure authentication message, based on the use of at least one of a cryptographic private encryption key and said cryptographic symmetric encryption key in a process that decrypts said encrypted version of said secure authentication message, where said cryptographic private encryption key matches said cryptographic public encryption key.

9. The system according to claim 8, where said at least one processor is further configured to:
encrypt said secure authentication message is based on receiving a first biometric signature from a first user; and
recombine said encrypted version of said secure authentication message is based on receiving a second biometric signature from a second user.

10. The system according to claim 8, where said at least one processor is further configured to:
receive a change request from a requestor user, wherein said change request includes a change to said decentralized autonomous organization;
receive, from a plurality of worker users, a first plurality of votes based on said change request; and
approve said change request when a first number of approval votes exceeds a predetermined change threshold.

11. The system according to claim 8, where said at least one processor is further configured to:
receive, a service request from a requestor user, where said service request describes a requirement for at least one of a service activity and a maintenance activity for said decentralized autonomous organization;
receive, from a committee user, a request for proposal associated with said service request;
receive, from at least one service provider user, at least one bid based on said request for proposal;
receive, from said committee user, a recommended service request based on said at least one bid;
receive, from a plurality of worker users, a second plurality of votes based on said recommended service request; and
approve said recommended service request when a second number of approval votes exceeds a predetermined service threshold.

12. The system according to claim 8, where said at least one processor is further configured to:
receive, from a requestor user, an arbitration request, where said arbitration request includes a request to amend at least one of a change request, a service request and said loan terms and conditions;
receive, from an arbitration user, a summary adjudication of said arbitration request and a recommended amendment to at least one of said change request, said service request and said loan terms and conditions;
receive, from a plurality of worker users, a third plurality of votes based on said recommended amendment; and
approve said recommended amendment when a third number of approval votes exceeds a predetermined arbitration threshold.

13. The system according to claim 8, where said at least one processor is configured to:
transfer automatically, said bridge loan, based on said plurality of loan terms and conditions, includes using a bridge loan smart contract to:
retrieve said loan amount from said loan account; then
pay said loan amount into said construction account;
transfer periodically, and automatically, said interest payment and said principal payment, based on said plurality of loan terms and conditions, includes using a loan repayment smart contract to:
retrieve said interest payment and said principal payment from said worker account; then
pay said interest payment and said principal payment into said loan account; and
close said loan account automatically, based on said plurality of terms and conditions, includes using a closure smart contract to:
retrieve said final interest payment and said final principal payment from said worker account; then
pay said final interest payment and said final principal payment into said loan account.

14. The system according to claim 8, where said at least one processor is further configured to:
receive a plurality of diagnostic data from at least one sensor configured to monitor at least one performance parameter of at least one infrastructure component that comprises said decentralized autonomous organization; and
predict a service need for said at least one infrastructure component based on said plurality of diagnostic data, whereby a service request is received from a requestor user based on the prediction before said service need causes a system failure.

15. A non-transitory computer storage medium storing computer-executable instructions that, when executed, cause a processor to perform a computer-implemented operation for managing a micro business in a decentralized autonomous organization configured to use a secure communication environment, comprising:
monitoring, in the secure communication environment, a location of a worker user's computer, based on at least one of an IoT device and an IP Address associated with said computer;
qualifying, in the secure communication environment, at least one curated business opportunity, for at least one of passive and active income, by ensuring said at least one opportunity complies with a predetermined list of legal, regulatory, moral and policy guidelines associated with the location's jurisdiction;

receiving, in the secure communication environment, a design for said micro business that includes an estimated construction cost, an estimated construction timeframe and a plurality of facilities and equipment to operate said at least one opportunity;

receiving, in the secure communication environment, from said worker user, a loan application to purchase said micro business based on said design where said loan application includes a profile of said worker user and a plurality of loan terms and conditions;

receiving, in the secure communication environment, from a lender, an approval of said loan application based on said design and said loan application;

transferring, in the secure communication environment, a bridge loan for a construction of said micro business, from a loan account to a construction account based on the loan approval;

receiving, in the secure communication environment, from a construction user, a confirmation that a construction of said micro business is complete based on said design and said bridge loan;

receiving, from said worker user, an acceptance of said micro business based on said confirmation;

receiving, from said worker user, a record of completion of at least one deliverable associated with said at least one opportunity, based on the micro business acceptance;

receiving, from a client user, an acceptance of said at least one deliverable;

transferring automatically, and periodically, from a client account associated with said client user to a worker account associated with said worker user, a revenue payment associated with said at least one opportunity, based on said deliverable acceptance and a plurality of opportunity terms and conditions;

transferring automatically, and periodically, from said worker account to said loan account, an interest and principal payment associated with said loan application, based on said plurality of loan terms and conditions; and closing said loan account automatically, after transferring a final interest payment and a final principal payment, from said worker account to said loan account, based on said plurality of loan terms and conditions, where the secure communication environment is generated by downloading a CCS application, from a central control system (CCS), which includes at least one processor and memory configured to store computer program code instructions, to the computers of users of the decentralized autonomous organization, the CCS application generating secure authentication messages between the users and the CCS, the secure authentication messages implementing authentication with encryption that perform the steps of:

storing securely, on a sender's computer, a plurality of authentication and authorization information, based on using at least one of a cryptographic public encryption key and a cryptographic symmetric encryption key in a process that encrypts a secure authentication message;

decomposing, by the CCS application running on the sender's computer, an encrypted version of said secure authentication message into a block of linked and ordered subcomponents that are stored randomly across a first plurality of member computers that are selected from a predetermined list of participating computers, a final subcomponent in the link of subcomponents flagged as a last subcomponent;

randomly selecting, by the CSS application running on the sender's computer, three member computers on which to copy a first subcomponent of the secure authentication message;

randomly selecting, by each of the three computers which have a copy of the first subcomponent of the secure authentication message, a member computer for which to copy a second subcomponent of the secure authentication message, and repeating the process of randomly selecting a member computer to copy the next ordered subcomponent of the secure authentication message by the computer that copied the ordered subcomponent that immediately precedes the next ordered subcomponent, until the final subcomponent of the block which is flagged as the last subcomponent has been copied, which generates three copies of blocks of linked and ordered subcomponents of the secure authentication message, where each computer which stores a copy of a subcomponent knows only of the computer which was randomly selected by that computer;

periodically, by the computer storing a newest copy of the first subcomponent of the secure authentication message, randomly selecting a member computer for which to copy the first subcomponent of the secure authentication message and generating a new block of linked and ordered subcomponents of the secure authentication message;

deleting an oldest block of linked and ordered subcomponents of the secure authentication message after generating the new block of linked and ordered subcomponents of the secure authentication message;

recombining, on a receiver's computer, the encrypted version of the secure authentication message from the new block of linked and ordered subcomponents of the secure authentication message after verifying, by the receiver's computer, a unique authorization identifier transmitted by the sender's computer; and recovering said secure authentication message, based on using at least one of a cryptographic private encryption key and said cryptographic symmetric encryption key in a process that decrypts said encrypted version of said secure authentication message, where said cryptographic private encryption key matches said cryptographic public encryption key.

16. The non-transitory computer storage medium of claim 15, further comprising:

receiving a change request from a requestor user, wherein said change request includes a change to said decentralized autonomous organization;

receiving, from a plurality of worker users, a first plurality of votes based on said change request; and approving said change request when a first number of approval votes exceeds a predetermined change threshold.

17. The non-transitory computer storage medium of claim 15, further comprising:

receiving a service request from a requestor user, where said service request describes a requirement for at least one of a service activity and a maintenance activity for said decentralized autonomous organization;

receiving, from a committee user, a request for proposal associated with said service request;

receiving, from at least one service provider user, at least one bid based on said request for proposal;

receiving, from said committee user, a recommended service request based on said at least one bid;

receiving, from a plurality of worker users, a second plurality of votes based on said recommended service request; and approving said recommended service request when a second number of approval votes exceeds a predetermined service threshold.

18. The non-transitory computer storage medium of claim 15, further comprising:

receiving, from a requestor user, an arbitration request, where said arbitration request includes a request to amend at least one of a change request, a service request and said loan terms and conditions;

receiving, from an arbitration user, a summary adjudication of said arbitration request and a recommended amendment to at least one of said change request, said service request and said loan terms and conditions;

receiving, from a plurality of worker users, a third plurality of votes based on said recommended amendment; and approving said recommended amendment when a third number of approval votes exceeds a predetermined arbitration threshold.

19. The non-transitory computer storage medium of claim 15, further comprising:

transferring automatically, said bridge loan, based on said plurality of loan terms and conditions, includes using a bridge loan smart contract to:

retrieve said loan amount from said loan account; then pay said loan amount into said construction account;

transferring periodically, and automatically, said interest payment and said principal payment, based on said plurality of loan terms and conditions, includes using a loan repayment smart contract to:

retrieve said interest payment and said principal payment from said worker account; then pay said interest payment and said principal payment into said loan account; and closing said loan account automatically, based on said plurality of terms and conditions, includes using a closure smart contract to:

retrieve said final interest payment and said final principal payment from said worker account; then pay said final interest payment and said final principal payment into said loan account.

20. The non-transitory computer storage medium of claim 15, further comprising:

receiving a plurality of diagnostic data from at least one sensor configured to monitor at least one performance parameter of at least one infrastructure component that comprises said decentralized autonomous organization; and predicting a service need for said at least one infrastructure component based on said plurality of diagnostic data, whereby a service request is received from a requestor user based on the prediction before said service need causes a system failure.

* * * * *